United States Patent [19]

Inoue

[11] Patent Number: 4,964,699

[45] Date of Patent: Oct. 23, 1990

[54] DISPLAY DEVICE

[75] Inventor: Hiroshi Inoue, Yokohama, Japan

[73] Assignee: Canon Kabushiki Kaisha, Tokyo, Japan

[21] Appl. No.: 174,980

[22] Filed: Mar. 29, 1988

[30] Foreign Application Priority Data

Mar. 31, 1987 [JP] Japan ................................ 62-076357

[51] Int. Cl.[5] .......................... G02F 1/13; G09G 3/36

[52] U.S. Cl. ................................ 350/332; 350/350 S; 340/784

[58] Field of Search ............................ 350/332, 350 S; 340/784, 765

[56] References Cited

U.S. PATENT DOCUMENTS

| | | | |
|---|---|---|---|
| 4,356,483 | 10/1982 | Fujita et al. | 350/332 X |
| 4,511,926 | 4/1985 | Grossland et al. | 350/332 X |
| 4,693,563 | 9/1987 | Harada et al. | 350/350 S |
| 4,748,444 | 3/1988 | Arai | 340/784 |
| 4,758,069 | 7/1988 | Knothe et al. | 350/332 |
| 4,778,260 | 10/1988 | Okada et al. | 350/350 S |
| 4,799,057 | 1/1989 | Takeda et al. | 340/784 |
| 4,830,467 | 5/1989 | Inoue et al. | 350/332 |

*Primary Examiner*—Stanley D. Miller
*Assistant Examiner*—Huy K. Mai
*Attorney, Agent, or Firm*—Fitzpatrick, Cella, Harper & Scinto

[57] ABSTRACT

A display control unit is combined with a display device having a display element having a memory function. The display control unit includes a unit for discriminating the presence/absence of an image data input from an image data source and a control unit for driving the display device in accordance with a discrimination result.

13 Claims, 40 Drawing Sheets

DISPLAY DEVICE

BACKGROUND OF THE INVENTION:

1. Field of the Invention

The present invention relates to a display device and, more particularly, to a display device having a memory function, e.g., a display device using a ferroelectric liquid crystal element.

2. Related Background Art

A known liquid crystal element using a liquid crystal compound comprises scanning and signal electrodes arranged in a matrix form, and a liquid crystal compound filled between the electrodes to constitute a large number of pixels, thereby displaying image information.

According to a conventional time-divisional method of driving such a display element, voltage signals are sequentially and periodically applied to the scanning electrodes, and predetermined information signals are parallely applied to the signal electrodes in synchronism with the scanning electrode operations. According to the above-mentioned display element and its driving method, it is difficult to increase both the pixel density and the screen size.

The most popular liquid crystal element is a TN (twisted nematic) element since it has a relatively short response time among the liquid crystal materials and low power consumption. In a state when no electric field is applied, twisted nematic liquid crystal molecules having positive dielectric anisotropy have a twisted structure (helical structure) in a direction of thickness of a liquid crystal layer, as shown in FIG. 41A. The liquid crystal molecules of the respective molecular layers are twisted and parallel to each electrode surface between the upper and lower electrodes. However, as shown in FIG. 41B, in an electric field, the nematic liquid crystal molecules having positive dielectric anisotropy are oriented in the direction of the electric field, thereby causing optical modulation. When a display element is arranged in a matrix electrode structure by using such a liquid crystal material, a signal voltage higher than a threshold value required for orienting the liquid crystal molecules in a direction perpendicular to each electrode surface is applied to a selected area (i.e., a selected point) as an intersection between the corresponding scanning and signal electrodes. The signal voltage is not applied to non-selected intersections (non-selected points) between the non-selected scanning and signal electrodes. Therefore, in these points, the liquid crystal molecules are twisted and parallel to each electrode surface. When linear polarizers in a relationship of crossed nicols are arranged on the upper and lower surface of this liquid crystal cell, light is not transmitted at the selected point(s), but light is transmitted at the non-selected point(s) due to the twist structure of the liquid crystal and an optical rotary power, thereby providing an imaging element.

With a matrix electrode structure, a limited electric field is applied to an area (so-called "semi-selected point") where the scanning electrode is selected and the signal electrode crossing this scanning electrode is not selected, and vice versa. If a difference between the voltage applied to the selected point and the voltage applied to the semi-selected point is sufficiently large, and a voltage threshold required for vertically aligning the liquid crystal molecules with respect to the electrode surface can be set to an intermediate value between the above voltages, the display element can be normally operated.

When the number (N) of scanning lines is increased in the above system, a duration (i.e., a duty ratio) for which an effective electric field is applied to one selected point during scanning of one frame is decreased at a rate of 11/N. For this reason, a difference between voltages, i.e., effective values, applied to the selected and non-selected points upon repetition of the scanning cycle is decreased when the number of scanning lines is increased. As a result, a decrease in image contrast and a crosstalk phenomenon cannot be avoided.

The above phenomena inevitably occurs when a liquid crystal without a bistable state (i.e., liquid crystal molecules are stably oriented in a direction parallel to the electrode surface and their orientation is changed in a direction perpendicular to the electrode surface during an effective application of the electric field) is driven by utilizing an accumulation effect as a function of time (i.e., scanning is repeated). In order to solve this problem, various driving schemes such as a voltage averaging scheme, a 2-frequency driving scheme, and a multiple matrix scheme are proposed. However, none of these conventional schemes are satisfactory. Therefore, a large screen and a high packing density of a display element cannot be obtained since the number of scanning lines cannot be sufficiently increased.

In order to solve the above problem, the present applicant filed a U.S. Ser. No. 598,800 (Apr. 10, 1984) entitled as a "Method of Driving Optical Modulation Device". In this prior art, the present applicant proposed a method of driving a liquid crystal having a bistable state with respect to an electric field. An example of the liquid crystal which can be used in the above driving method is preferably a chiral smectic liquid crystal, and more preferably a chiral smectic C-phase (SmC*) or H-phase (SmH*).

The SmC* has a structure in which liquid crystal molecular layers are parallel to each other, as shown in FIG. 42. A direction of a major axis of each molecule is inclined with respect to the layer. These liquid crystal molecule layers have different inclination directions and therefore constitute a helical structure.

The SmH* has a structure in which the molecular layers are parallel to each other, as shown in FIG. 43. A direction of a major axis of each molecule is inclined with respect to the layer, and the molecules constitute a six-direction filled structure on a plane perpendicular to the major axis of the molecule.

The SmC* and SmH* have helical structures produced by the liquid crystal molecules, as illustrated in FIG. 44.

Referring to FIG. 44, each liquid crystal molecule e3 has electrical bipolar moments e4 in a direction perpendicular to the direction of the major axis of the molecule e3. The molecules e3 move while maintaining a predetermined angle $\theta$ with respect to the Z-axis perpendicular to a layer boundary surface e5, thereby constituting a helical structure. FIG. 44 shows a state when a voltage is not applied to the liquid crystal molecules. If a voltage exceeding a predetermined threshold voltage is applied to the X direction, the liquid crystal molecules e3 are orientated such that the electrical bipolar moments e4 are parallel to the X-axis.

The SmC* or SmH* phase is realized as one of the phase transition cycles caused by changes in temperatures. When these liquid crystal compounds are used, a proper element must be selected in accordance with the operating temperature range of the display device.

FIG. 45 shows a cell when a ferroelectric liquid crystal (to be referred to as an FLC hereinafter) is used. Substrates (glass plates) el and el' are coated with transpatent electrodes comprising $In_2O_2$, $SnO_2$ or ITO (indium-tin oxide). An SmC*-phase liquid crystal is sealed between the substrates el and el' such that liquid crystal molecular layers e2 are oriented in a direction perpendicular to the substrates el and el'. The liquid crystal molecules e3 represented by thick lines have bipolar moments e4 in directions perpendicular to the corresponding molecules e4. When a voltage exceeding a predetermined threshold is applied between the substrates el and el', the helical structure of the liquid crystal molecules e3 is changed such that the directions of orientation of the liquid crystal molecules e3 are aligned with the direction of the electric field. Each liquid crystal molecule e3 has an elongated shape and exhibits refractive anisotropy in the major and minor axes. For example, when polarizers having a positional relationship of crossed nicols with the orientation direction are arranged on the upper and lower surfaces of the upper and lower glass plates, it is readily understood that there is provided a liquid crystal optical modulation device having optical characteristics which change in accordance with the polarities of the applied voltage.

When the thickness of the liquid crystal cell is sufficiently small (e.g., 1 μm), the helical structure of liquid crystal molecules cannot be established even if an electric field is not applied thereto, and the bipolar moment P or P' is directed upward or downward, as shown in FIG. 46. When an electric field E or E' (the fields E and E' having different polarities) exceeding the predetermined threshold value is applied to this cell for a predetermined period of time, the bipolar moment is directed upward or downward so as to correspond to the electric field vector of the electric field E or E'. Therefore, the liquid crystal molecule is oriented in a first stable state f3 or a second stable state f3'.

Use of such an FLC in an optical modulation element has the following two advantages. First, the resultant optical modulation element has a very short response time (1 usec to 100 μsec), and second, the liquid crystal molecule orientation has a bistable state.

The second point will be described with reference to FIG. 46. When the electric field E is applied to the liquid crystal molecules e3, the liquid crystal molecules e3 are oriented in the first stable state f3. This state is kept stable even if the electric field is withdrawn. When the electric field E' having a polarity opposite to that of the electric field E is applied, the liquid crystal molecules e3 are orientated in the second stable state f3'. This state is kept unchanged even if the electric field E' is withdrawn. Therefore, the liquid crystal molecules e3 have a memory function. If the level of the electric field E does not exceed the predetermined threshold value, the orientation state of the molecule is maintained.

In order to obtain a short response time and an effective memory function, the thickness of the cell is preferably minimized, generally, to 0.5 μm to 20 μm and, more preferably, to 1 μm to 5 μm.

A method of driving the FLC will be described with reference to FIGS. 47 to 49D.

FIG. 47 is a cell arrangement having a matrix electrode structure containing an FLC compound (not shown) therein. The cell arrangement includes scanning electrodes com and signal electrodes seg. An operation when the scanning electrode coml is selected will be described.

FIGS. 48A and 48B show scanning signals, in which FIG. 48A shows an electrical signal applied to the scanning electrode com1 and FIG. 48B shows an electrical signal applied to other scanning signals (i.e., the non-selected scanning electrodes) com2, com3, com4, . . . . FIGS. 48C and 48D show information signals, in which FIG. 48C shows an electrical signal applied to the selected signal electrodes seg1, seg3, and seg5, and FIG. 48D shows an electrical signal applied to the non-selected signal electrodes seg2 and seg4.

Time is plotted along the abscissa in each chart of FIGS. 48A to 48D and FIGS. 49A to 49D and voltage values are plotted along the ordinate in each chart of FIGS. 48A to 49D. For example, when a motion image is to be displayed, the scanning electrodes com are sequentially and cyclically selected. If a threshold voltage for giving the first stable state in a liquid crystal cell having bistable characteristics with respect to a predetermined applied voltage time Δt1 or Δt2 is given as −Vth1, and a threshold current voltage for giving the second stable state therein is given as +Vth2, the electrode signal applied to the selected scanning electrode com (coml) is an alternating voltage which is set at 2 V in a phase (time) Δt1 and −2 V in a phase (time) Δt2 as shown in FIG. 48A. When electrical signals having a plurality of phase intervals and different voltage levels are applied to the selected scanning electrode, an immediate change occurs between the first stable stage corresponding to the optically "dark" (black) state and the second stable state corresponding to the optically "bright" (white) state.

As shown in FIG. 48B, the scanning electrodes com2 to com5, . . . are set at an intermediate potential of the cell applied voltage, i.e., a reference potential (e.g., a ground state). The electrical signal applied to the selected signal electrodes seg1, seg3, and seg5 is given as V, as shown in FIG. 48C. The electrical signal applied to the non-selected signal electrodes seg2 and seg4 is given as −V, as shown in FIG. 48D. Therefore, the above voltage values are set to be desired values satisfying the following conditions:

$$V < V_{th2} < 3V$$

$$-3V < -V_{th1} < -V$$

Waveforms of voltages applied to pixels A and B (FIG. 47) of the pixels applied with the above electrical signals are shown in FIGS. 49A and 49B, respectively. As is apparent from FIGS. 49A and 49B, a voltage 3V exceeding the threshold value Vth2 is applied in the phase Δt2 to the pixel A located on the selected scanning line. A voltage −3V exceeding the threshold value −Vth1 is applied in the phase −t1 to the pixel B on the same selected scanning line. Therefore, when the signal electrode on the selected scanning line is selected, the liquid crystal molecules are oriented in the first stable state. However, when the signal electrode on the selected scanning line is not selected, the liquid crystal molecules are oriented in the second stable state.

As shown in FIGS. 49C and 49D, the voltage applied to all pixels on the non-selected scanning line is V or −V. In either case, the voltage does not exceed the corresponding threshold voltage. The liquid crystal molecules in each pixel excluding the ones on the selected scanning line do not change their orientation state and are kept in the state established by the previous scanning cycle. In other words, when the scanning line is selected, one-line signal write is performed. The signal state is kept unchanged until the next selection is started upon completion of one frame. Therefore, even if the number of scanning electrodes is increased, the selection time/line is not almost changed, and a decrease in contrast does not occur.

As has been described above, in order to solve the problems posed by the conventional display elements using a TN liquid crystal, an FLC which has a bistable effect with respect to an electric field and allows an arrangement of a display element for maintaining the stable state is proposed. Regarding drive control of a display element using an FLC, some problems on characteristics still remain unsolved.

SUMMARY OF THE INVENTION:

It is an object of the present invention to provide a display control unit for performing optimal drive control while effectively utilizing characteristics of a ferroelectric liquid crystal element having a memory function when the element is used to arrange a display device.

It is another object of the present invention to provide a display control unit combined with a display device constituted by a display element with a memory function, the display control unit being provided with means for discriminating the presence/absence of an image data input from an image data source and a control means for driving the display device in accordance with a discrimination result.

It is still another object of the present invention to provide a display control unit which waits for an image data input from an image data source and starts driving of a display device in accordance with the input, so that not only continuous refresh driving as in a display device having a display element without a memory function can be performed regardless of whether the display contents are changed or not, but also intermittent driving can be performed wherein display data is updated only when the display contents are required to be changed According to the present invention as described above, since the means for waiting for the image data input from the host device and starting its operation in response to this input is arranged, not only continuous refresh driving as in a display device having a display element without a memory function can be performed regardless of whether the display contents are changed or not, but also intermittent driving can be performed wherein display data is updated only when the display contents are required to be changed. Since refresh driving can be performed, the technical specifications of the existing host device need not be modified. In addition, since intermittent driving can be performed, power consumption can be reduced. Since the host device can only send image data if screen updating is required, software and hardware load on the host side can be reduced Optimal drive control can be achieved while effectively utilizing the characteristics of the FLC element.

DETAILED DESCRIPTION OF THE PREFERRED EMBODIMENT:

The present invention will now be described in detail with reference to the accompanying drawings.

The present invention will be described in the following order:

(1) General Description of Device
(2) Arrangement of Display Unit
(3) General Description of Display Control
  (3.1) Frame of Display Unit
  (3.2) Drive Waveform of Display Element
  (3.3) Drive Voltage of Display Element
  (3.4) Temperature Compensation
  (3.5) Drive Method of Display Unit
  (3.6) Display Screen Clearing
(4) Arrangement of Respective Components in Display Control Unit
  (4.1) Main Symbols
  (4.2) Controller
  (4.3) Memory Space
  (4.4) Data Output Unit
  (4.5) A/D Conversion Unit
  (4.6) D/A Conversion Unit and Power Controller
  (4.7) Frame Drive Unit
  (4.8) Display Drive Unit
    (4.8.1) Segment Drive Unit
    (4.8.2) Common Drive Unit
  (4.9) Drive Waveform
(5) Display Control
  (5.1) General Description of Control Sequence
  (5.2) Detailed Description of Control Sequence
    (5.2.1) Power-ON (Initialization)
    (5.2.2) Block Access
    (5.2.3) Line Access
    (5.2.4) Power-OFF
(6) Effect of Embodiment
  (6.1) Effect of Frame Formation
  (6.2) Effect of Temperature Compensation
  (6.3) Effect of Control in Response to Image Data Input
  (6.4) Effect of Display Drive Unit Arrangement
  (6.5) Effect of Screen Forcible Clearing
  (6.6) Effect of Power Controller Arrangement
(7) Modification
  (7.1) Frame Arrangement
  (7.2) Temperature Compensation Timing and Partia Rewrite
  (7.3) One-Horizontal Scanning Period and Drive Voltage Value
  (7.4) Waveform Setting
  (7.5) Selection of Block Access or Line Access
  (7.6) Number of Scanning Lines
  (7.7) Erasure of Effective Display Area
  (7.8) Position of Temperature Sensor
  (7.9) Display Unit, Display Control Unit, and Wordprocessor

(1) General Description of Device

Figure 1:
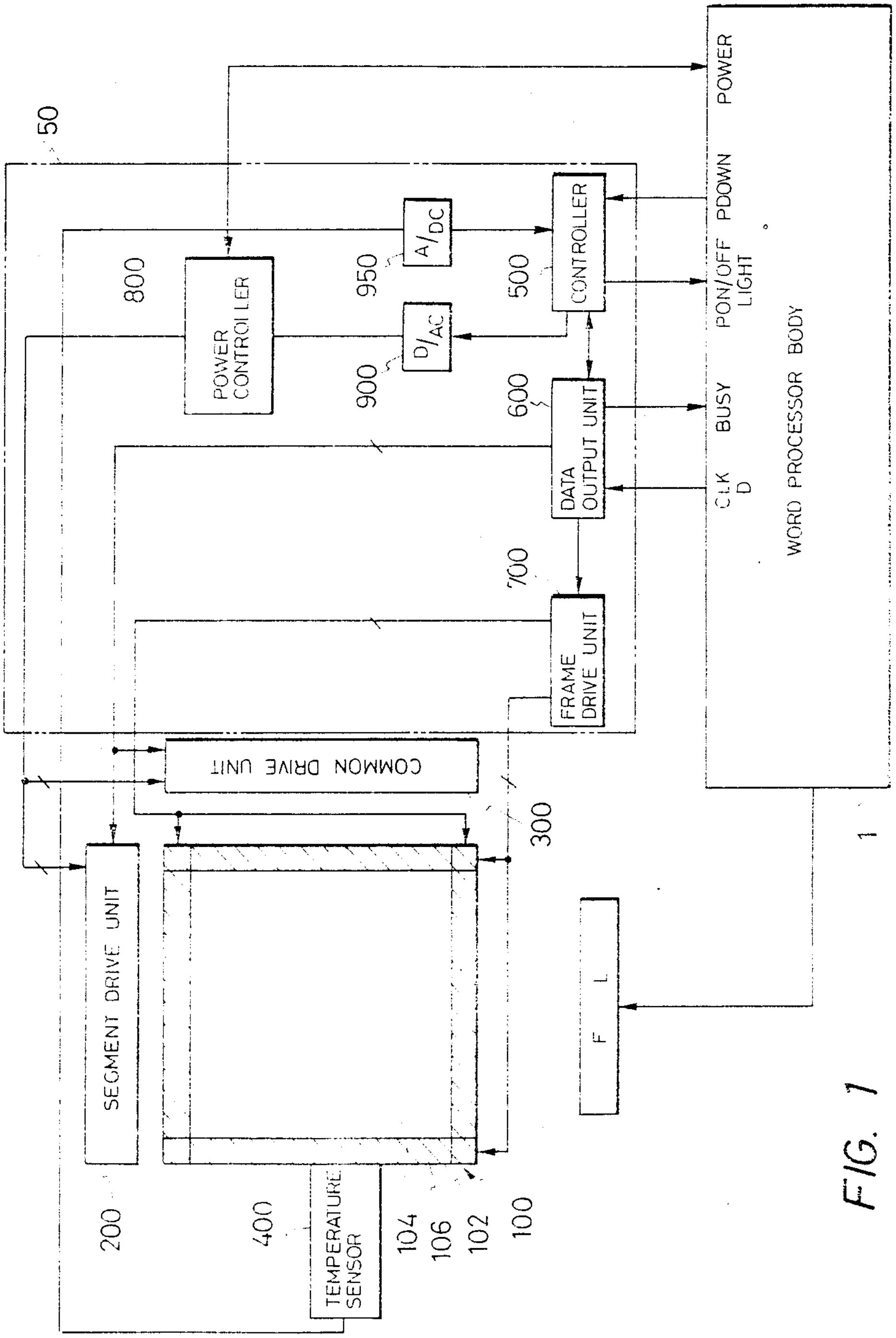
FIG. 1 is a block diagram showing an arrangement of a display device and a control system according to an embodiment of the present invention.

FIG. 1 shows an embodiment of the present invention. A wordprocessor 1 serves as a host device and supplies image data to a display unit of this embodiment. A display control unit 50 receives display data supplied from the wordprocessor 1 and controls driving of a display unit 100 in accordance with various conditions (to be described later). The display unit 100 is arranged using an FLC. Segment and common drive units 200 and 300 respectively drive signal and segment electrodes arranged in the display unit 100 in accordance with drive data supplied from the display control unit 50. A temperature sensor 400 is arranged at a proper position (e.g., a portion at an average temperature) of the display unit 100.

The display unit 100 includes a display screen 102, an effective display area 104 in the display screen, and a frame unit 106 defining the effective display area 104 in the display screen 102. In this embodiment, an electrode corresponding to the frame unit 106 is arranged on the display unit 100 and is driven to form a frame on the display screen 102.

The display control unit 50 includes a controller 500 (to be described later with reference to FIG. 11) for controlling exchange of various data with the display unit 100 and the wordprocessor 1. A data output unit 600 initializes driving of the drive units 200 and 300 on the basis of data from the controller 500 in accordance with the display data supplied from the wordprocessor 1 and data setting of the controller 500. The data output unit 600 will be described later with reference to FIG. 16. A frame drive unit 700 generates the frame unit 106 on the display screen 102 on the basis of data output from the data output section 600.

A power controller 800 properly transforms a voltage signal from the wordprocessor 1 and generates a voltage applied to the electrodes through the drive units 200 and 300 under the control of the controller 500. A D/A conversion unit 900 is arranged between the controller 500 and the power controller 900 and converts digital data from the controller 500 into analog data which is then supplied to the power controller 800. An A/D conversion unit 950 is arranged between the temperature sensor 400 and the controller 500. The A/D conversion unit 950 converts analog temperature data from the display unit 100 into digital data. This digital data is supplied to the controller 500.

The wordprocessor 1 has a host device function serving as a source for supplying display data to the display unit 100 and the display control unit 50. The wordprocessor 1 can be replaced with any other host device such as a computer or an image reading apparatus. In this embodiment, the wordprocessor 1 can exchange various data. The data to be supplied to the display control unit 50 are as follows:

D: A signal including address data and a horizontal sync signal for designating display positions of image data and other data. The address data for accessing a display address (corresponding to the display device on the effective display area 104) of the image data can be output as address data without modifications if the host device is the one having a VRAM corresponding to the effective display area 104. In this embodiment, the wordprocessor 1 superposes the signal D on the horizontal sync signal or a retrace (flyback) erase signal and supplies the composite signal to the data output unit 600.

CLK: A transfer clock for image data PD0 to PD3, which is supplied to the data output unit 600.

PDOWN: A signal for acknowledging a system power-off state, which is supplied as a nonmaskable interrupt signal (NMI) to the controller 500.

Data supplied from the display control unit 50 to the wordprocessor 1 are as follows:

PON/OFF: A status signal for acknowledging the end of rising/falling of the display control unit 50 in the system power-on/-off operation, which status signal is output from the controller 500.

Light: A signal for designating an ON/OFF operation of a light source FL combined with the display unit 100, which is output from the controller 500.

Busy: A sync signal for instructing the wordprocessor 1 so as to wait for transfer of the signal D or the like in order to perform various setting operations in initialization and display operation of the display control unit 50. That is, the signal Busy is received by the wordprocessor 1 and is output from the controller 500 through the data output unit 600.

(2) Arrangement of Display Unit

Figure 2:
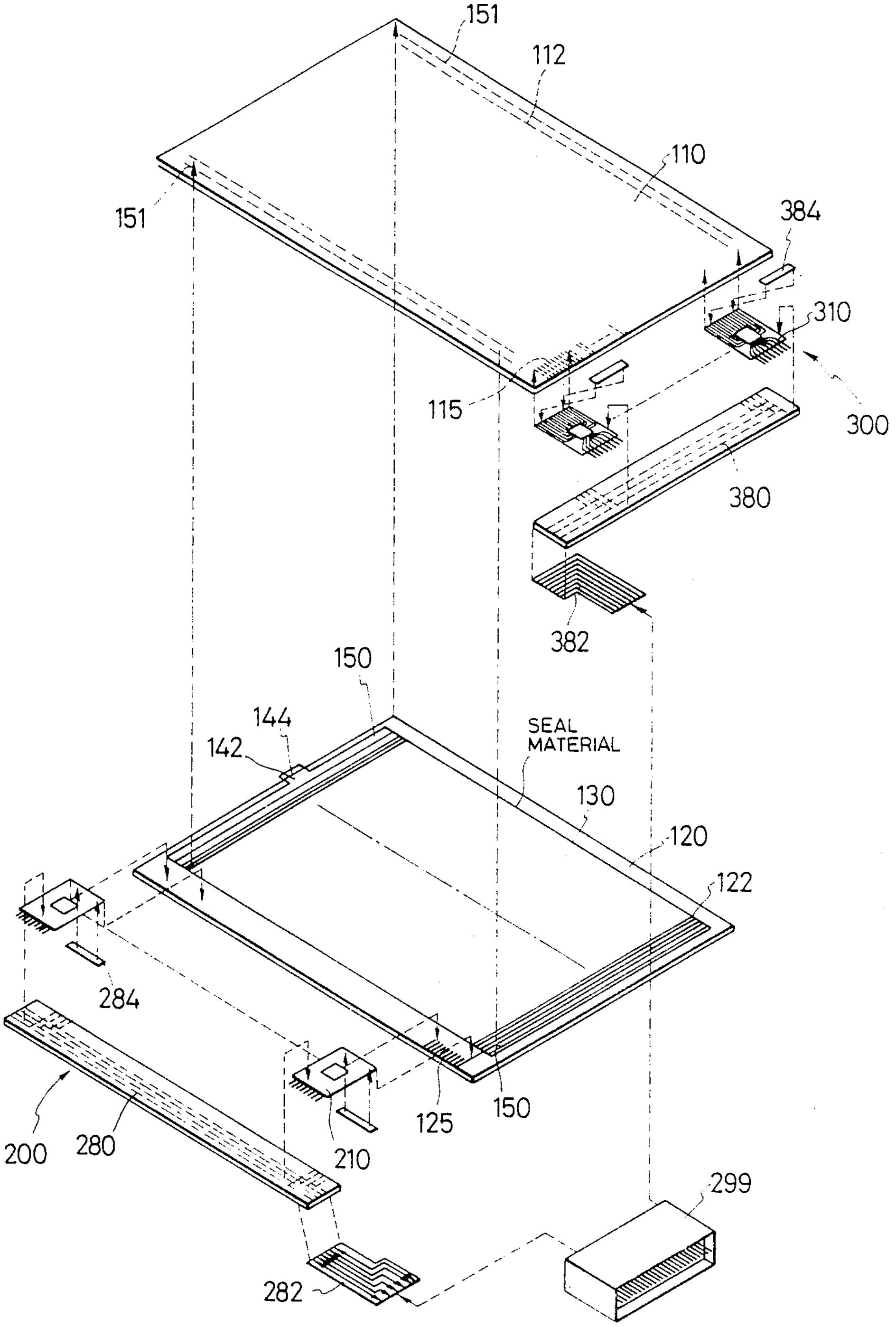
FIGS. 2 and 3 are an exploded perspective view and a sectional view, respectively, showing an arrangement of the display unit of the device shown in FIG. 3.
Figure 3:
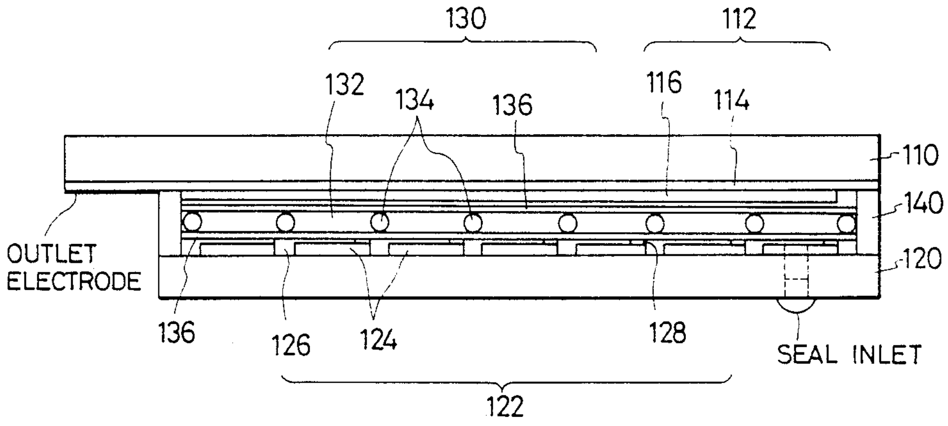

FIGS. 2 and 3 are an exploded perspective view and a sectional view, respectively, showing an arrangement of the display unit 100 using an FLC. Referring to FIGS. 2 and 3, the display unit 100 includes upper and lower glass plates or substrates 110 and 120. Polarizers are arranged in a relationship of crossed nicols with respect to the orientation of the FLC element. A wiring unit 122 is arranged on the inner surface of the lower glass substrate 120 and comprises transparent electrodes 124 of, e.g., ITO and an insulating film 126. A metal layer 128 is formed on the transparent electrodes 124 if the resistances of the electrodes must be low. The metal layer 128 can be omitted when the display device is compact. A wiring unit 112 is formed on the upper glass substrate 110 and comprises transparent electrodes 114 and an insulating layer 116 in the same manner as those in the wiring unit 122 on the lower glass substrate 120.

The direction of the wiring unit 122 is perpendicular to that of the wiring unit 122. For example, if the long side of the A5-size effective display area 104 is used as a horizontal scanning direction and has a resolution of 400×800 dots, 400 or 800 transparent electrodes are formed in the wiring unit corresponding to the effective display area. In this embodiment, the horizontal scanning direction serves as a common electrode side. 400 transparent electrodes 114 are formed in the upper wiring unit 112, while 800 transparent electrodes 124 are formed in the lower wiring unit 122. Transparent electrodes 150 and 151 are formed at an inner portion of the display screen 102 which corresponds to the outer portion of the effective display area 104. The transparent electrodes 150 and 151 are formed in the same shape as or a shape different from that of the data display transparent electrodes 124 and 114.

Figure 44:
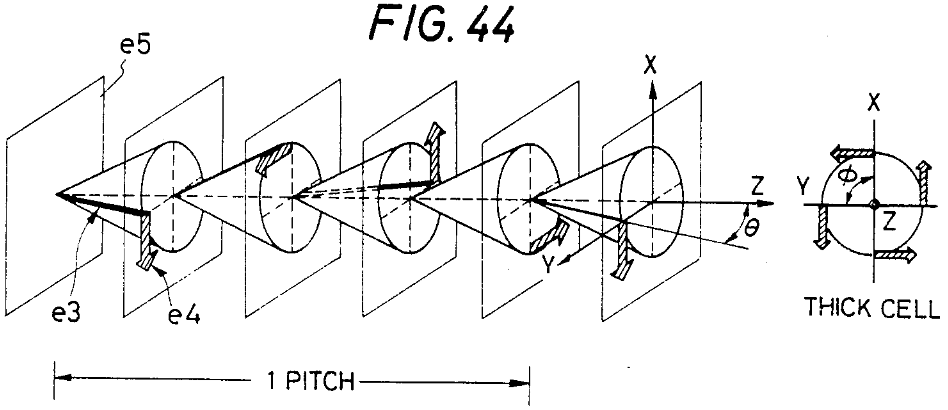
FIG. 44 is a view for explaining a structure of FLC molecules.
Figure 45:
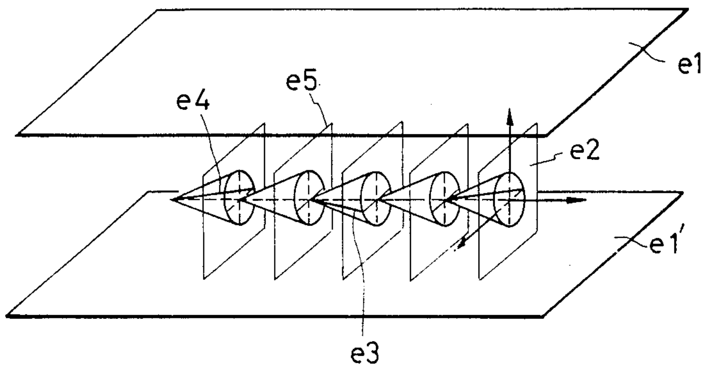
FIG. 45 is a view for explaining a display element using an FLC.
Figure 46:
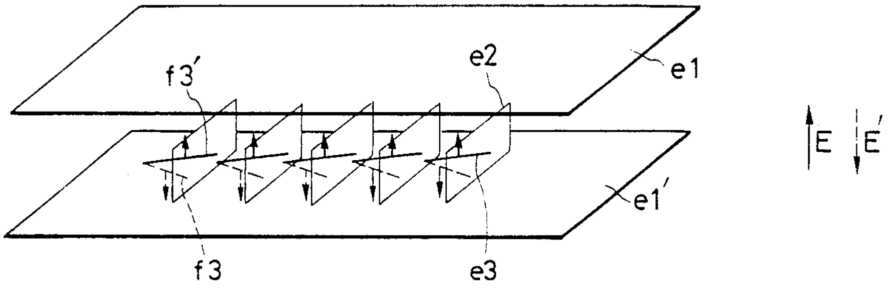
FIG. 46 is a view showing an FLC display element which is applicable to the present invention.

A seal member 130 for an FLC 132 comprises a pair of orientation films 136 for aligning an axis (i.e., Z-axis in FIG. 44) of the FLC element, a spacer 134 for defining a distance between the pair of orientation films 136 so as to establish the first or second stable state shown in FIG. 46. A seal material 140 such as an epoxy resin is used to seal the FLC 132. A filling port 142 is used to fill the FLC 132 into the seal member 130. A filling port seal member 144 seals the filling port 142 after the FLC 132 is filled.

Segment and common drive elements 210 and 310 serve as elements constituting the segment drive unit 200 and the common drive unit 300, respectively. In this embodiment, 10 and 5 ICs each for driving 80 transparent electrodes are arranged for the segment and common drive units 200 and 300, respectively. The segment drive elements 210 are formed on a substrate 280, and the common drive elements 310 are formed on a substrate 380. Flexible cables 282 and 382 are connected to the substrates 280 and 380, respectively. A connector 299 connects the flexible cables 282 and 383 to the display drive unit 50 shown in FIG. 1.

Outlet electrodes 115 and 125 are formed continuously with the transparent electrodes 114 and 124 and are connected to the drive elements 310 and 210 through film-like conductive members 384 and 284, respectively.

In this embodiment, light is emitted from the light source FL from the outer surface of the lower glass substrate 120, and the FLC elements are selectively driven in the first or second stable state, thereby displaying information.

(3) General Description of Display Control

When the display unit shown in FIGS. 2 and 3 is used, the following problems associated with the characteristics of the FLC element are presented. By paying attention to these characteristics, an appropriate arrangement of the display unit 100 using the FLC element and its appropriate drive control are realized.

(3.1) Frame of Display Unit

When the display unit 100 is arranged, as shown in FIGS. 2 and 3, the area of the display screen 102 corresponding to the range of the matrix constituted by the common transparent electrodes 114 and the segment transparent electrodes 124 serves as an actual image data display area, i.e., the effective display area 104. However, an area including at least part of the inner area of the seal member 140 and falling outside the matrix constituted by the common and segment transparent electrodes is preferably used as the display screen 102 so as to perfectly use the effective display area 104.

However, when the common and segment transparent electrodes are arranged in the matrix form, only common or segment transparent electrodes run through the part of the inner area of the seal member 140. Therefore, the FLC in this part cannot be sufficiently driven for image data display and therefore is held in a floating state. In this state, the FLC can be set in the first or second stable state. Therefore, a light-transmitting area (white) and a non-light-transmitting area (black) are mixed in such an area corresponding to the above part in the display screen 102. As a result, clear display cannot be performed, and the effective display area 104 cannot be clearly defined, so that the operator may be confused with the unclear display area.

In order to prevent the above phenomenon, the transparent electrodes 151 and 150 (to be referred to as frame transparent electrodes) crossing the common and segment transparent electrodes are arranged outside the effective display area 104. By properly driving the frame transparent electrodes 151 and 150, the frame unit 106 is properly defined. For example, 16 electrodes 151 and 16 electrodes 150 are arranged at each side of the common transparent electrodes 114 on the upper glass substrate 110 and each side of the segment transparent electrodes 124 on the lower glass substrate 120, respectively. For illustrative convenience, only one electrode represents the electrodes in each of the glass substrates 120 and 110 in FIG. 2.

(3.2) Drive Waveform of Display Element

One of the functions of the FLC display element is a memory function. A problem associated with drive waveforms and caused by applied time dependency of a threshold value (to be described later) and its solution will be described with reference to FIG. 4.

Figure 47:
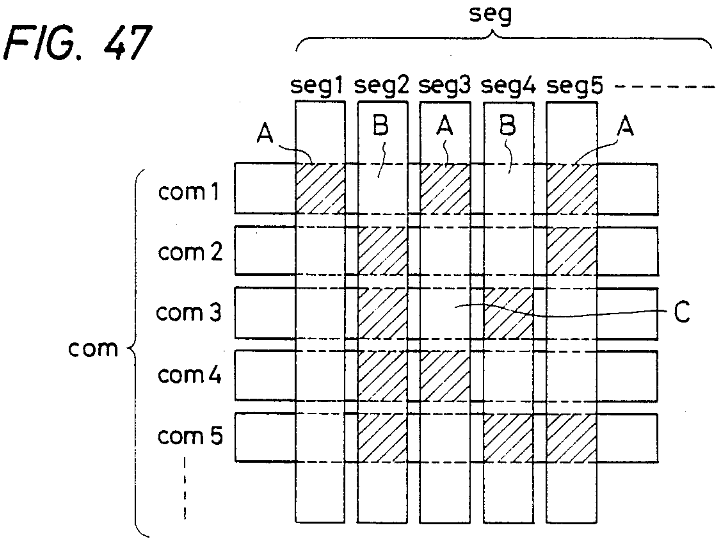
FIG. 47 is a view showing a cell arrangement having a matrix electrode structure, which is applicable to the present invention.
Figure 48A:
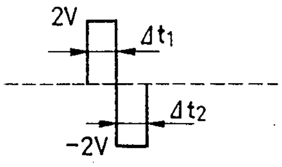
FIGS. 48A to 48D and FIGS. 49A to 49D are charts showing waveforms of voltages applied to the FLC element.
Figure 48B:
Figure 48C:
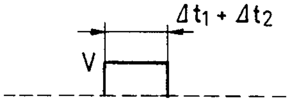
Figure 48D:
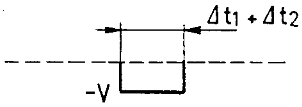
Figure 49A:
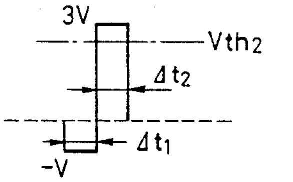
Figure 49B:
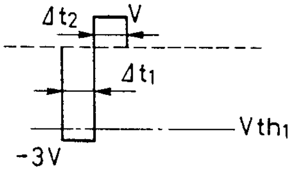
Figure 49C:
Figure 49D:

Referring to FIG. 47, of pixels constituted by intersections between scanning electrodes coml . . . , com 5, . . . and signal electrodes seg1 . . . ,seg5, . . . , each hatched pixel corresponds to a "bright" (white) state and a hollow pixel corresponds to a "dark" (black) state. These states correspond to the first and second stable states of the FLC, respectively. A display state on the signal electrode seg1 in FIG. 47 is taken into consideration. Pixels A corresponding to the scanning electrode coml are set in the "bright" state, while all other pixels B are set in the "dark" state.

Figure 5B:
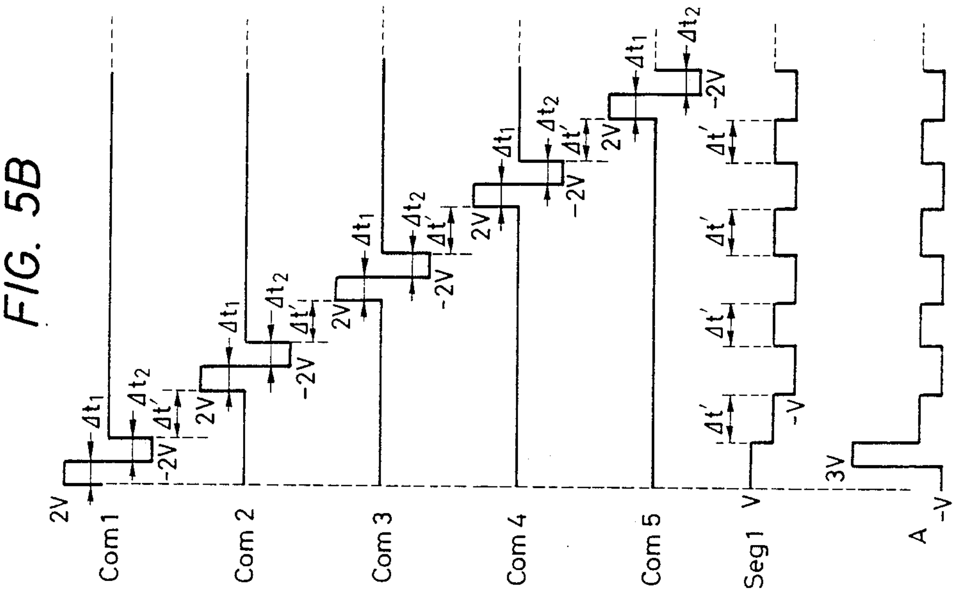
FIGS. 5A and 5B and FIG. 6 are timing charts for explaining drive waveforms of an FLC element.
Figure 5A:
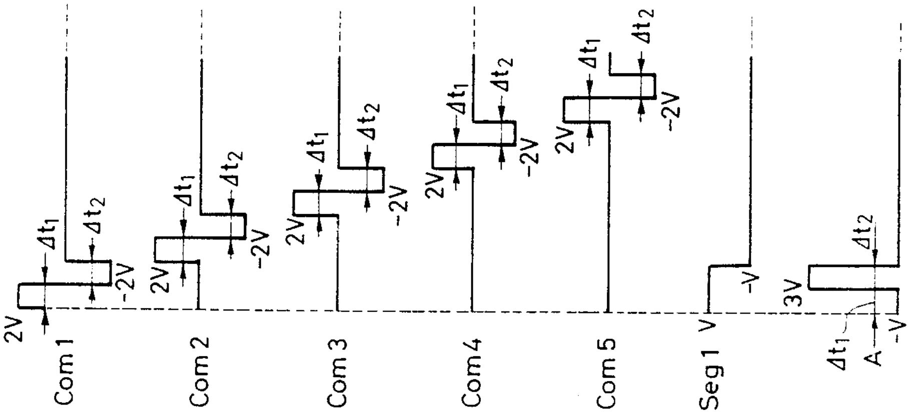

FIG. 5A shows a time sequence of a scanning signal, an information signal applied to the signal electrode seg1, and a voltage applied to the pixel A.

When driving is performed, as shown in FIG. 5A, and the scanning electrode coml is scanned, a voltage V3 exceeding a threshold value Vth is applied to the pixel A in time Δt1, and the pixel A is set in one stable state, i.e., the "bright" state regardless of the previous state. Thereafter, during scanning of the electrodes com2, . . . , com5, . . . , the voltage −V is continuously applied to the pixel A since the voltage does not exceed the threshold voltage −Vth, as shown in FIG. 5A. In this case, the pixel A maintains the "bright" state.

When one type of signal (corresponding to the "dark" state in this case) is continuously applied to one signal line, a display state is degraded by a large number of scanning lines during high-speed driving.

Figure 4:
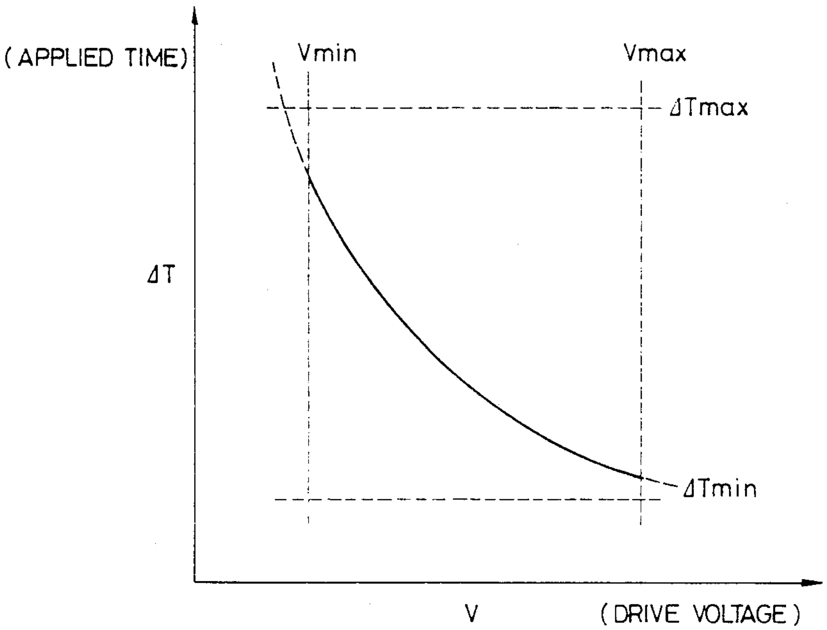
FIG. 4 is a graph for explaining the relationship between the drive voltage and an applied time.

The above drawback is typically illustrated in FIG. 4. The drive voltage V is plotted along the abscissa and the pulse width ΔT (applied time) is plotted along the ordinate. As is apparent from FIG. 4, the threshold voltage Vth (drive voltage) depends on the applied time. The shorter the applied time becomes, the steeper the drive voltage curve becomes. Assume that the drive waveform shown in FIG. 5A is used, a large number of scanning lines are used, and a high-speed element is driven. Since the voltage −V is continuously applied during com2 and subsequent scanning cycles although the state is changed into the "bright" state during coml scanning, the state can be changed by a low threshold value by an integration of the applied time until the scanning electrode com1 is scanned again. Therefore, the pixel A may be changed to the "dark" state.

In order to prevent this, the waveforms shown in FIG. 5B are used. According this method, the scanning and information signals ar not continuously supplied. A predetermined time interval Δt' is provided as an auxiliary signal application interval. During this interval, an auxiliary signal is applied to set the signal electrode at a ground potential. While the auxiliary signal is applied, the scanning electrodes are also grounded. The voltage applied across the scanning and signal electrodes is the reference voltage, thereby substantially eliminating voltage applied time dependency of the threshold voltage for the FLC, as shown in FIG. 4. Therefore, a change from the "bright" state to the "dark" state of the pixel A can be prevented. This is also applicable to other pixels.

Figure 6:
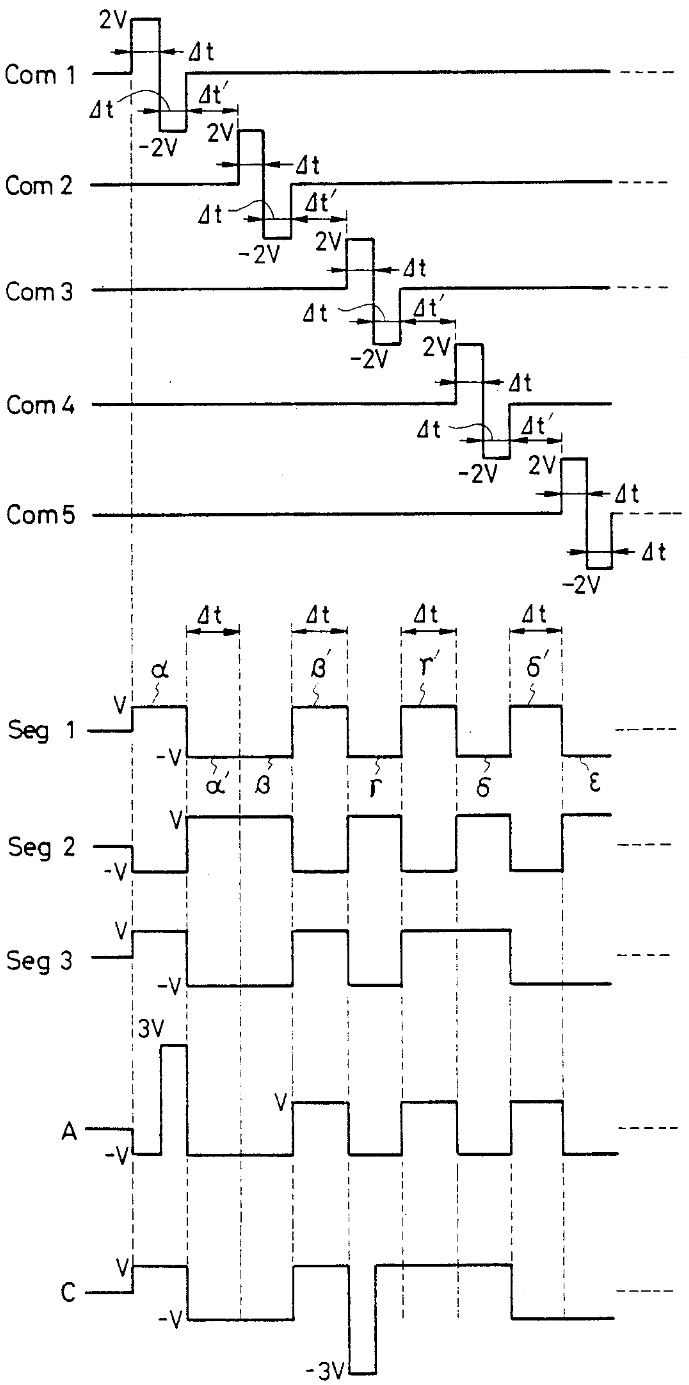

A more preferable driving method is practiced such that waveforms shown in FIG. 6 are applied to the scanning and signal electrodes.

Referring to FIG. 6, a scanning signal is an alternating pulse signal of ±2 V. An information signal is supplied to the signal electrodes in synchronism with the alternating current pulse signal and has two phases, i.e., +V corresponding to "bright" information and −V corresponding to "dark" information. Assume that the time interval Δt' is provided as the auxiliary signal applied interval while com n (the nth scanning electrode) and com n+1 (the (n+1)th scanning electrode) are selected when the scanning signal is regarded as a time-serial signal. During this interval Δt', an auxiliary signal having a polarity opposite to that of the signal applied to the signal electrodes during com n scanning. In this case, the time-serial signal pulses applied to the respective signal electrodes are given as, e.g., seg1 to seg3 shown in FIG. 6. That is, auxiliary signals $\alpha'$ to $\epsilon'$ have polarities opposite to those of information signals $\alpha$ to $\epsilon$, respectively. For this reason, when the voltage applied to the pixel A is observed in a time-serial manner with reference to FIG. 6, even if the same information signal is continuously applied to one signal electrode, the voltage actually applied to the pixel A is not inverted until desired information ("bright" in this case) formed during coml scanning is written because the alternating current voltage having a level lower than the threshold voltage Vth is applied and because voltage applied time dependency of the threshold voltage for the FLC is eliminated.

The above two types of drive waveform are model examples for illustrative convenience. In the subsequent embodiments, different appropriate drive waveforms are used for driving of the effective display area 104 and the frame unit 106 in the display screen 102 and in accordance with actual access modes. The above-mentioned waveforms have positive and negative half cycles which are symmetrical with each other. However, the positive and negative cycles need not be symmetrical.

(3.3) Drive Voltage of Display Element

The FLC display element according to this embodiment is oriented such that its liquid crystal molecules have bipolar moments directed in the direction of the electric field, and this orientation state is kept unchanged even after the electric field is withdrawn, as previously described above.

The change from one stable state to the other stable state varies depending o voltage values applied to the display elements.

Figure 7A:
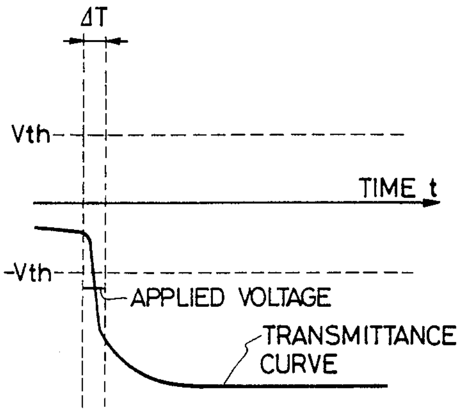
FIGS. 7A and 7B are charts for explaining the relationship between the drive voltage and the transmittance of the FLC element.
Figure 7B:
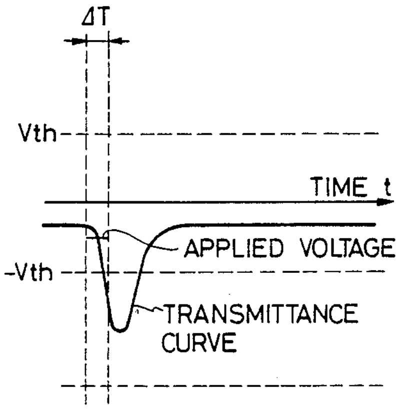

FIGS. 7A and 7B show changes in drive voltage (applied voltage) and FLC transmittance as a function of time. FIG. 7A shows a case in which the drive voltage exceeds the threshold voltage −Vth. In this case, the transmittance curve allows a change from one stable state to the other stable state (e.g., from "bright" state to the "dark" state). FIG. 7B shows a case in which the drive voltage does not exceed the threshold voltage. In this case, the liquid crystal molecules behave in response to the drive voltage to some extent but their orientation directions are not inverted. In other words, the transmittance of the liquid crystal is changed to the original value.

In addition, the threshold value varies depending on the types and drive temperatures of the FLC, as will be described with reference to FIG. 8.

As described with reference to FIGS. 4 and 6, the required drive voltage values are the positive and negative values of the scanning signal, positive and negative values of the information signal, and the reference potential, i.e., a total of five voltage values. These drive voltages are generated by an apparatus (to be described later) using an appropriate power source.

As is apparent from the above description, appropriate temperature compensation in consideration of the threshold value and the like must be performed to set the drive voltages.

(3.4) Temperature Compensation

Temperature compensation must be particularly taken into consideration for FLC display control of this embodiment due to the following reason. Closely associated drive conditions (e.g., a pulse width (voltage applied time) and a drive voltage value) for the SmC*-phase FLC greatly vary depending on FLC temperatures. The drive condition range at a predetermined temperature is narrowed. Therefore, fine temperature compensation during FLC driving is required.

Temperature compensation is performed by detection of an FLC temperature, detection of an ambient temperature on the display screen 102 in practice, setting of drive voltage values corresponding to the detected temperature, and setting of a pulse width, i.e., one horizontal (1H) scanning period. It is very difficult to perform manual compensation in consideration of an operating speed and the like of the display screen 102. Therefore, temperature compensation is an essential factor in FLC display element control.

Changes in FLC drive conditions, e.g., changes in pulse width, drive voltage values, and the like as a function of temperature will be described below.

FIG. 4 shows the relationship between the drive voltage value and the pulse width, as described above. The smaller the pulse width AT becomes, the higher the drive voltage V becomes.

The pulse width ΔT has an upper limit ΔTmax and a lower limit ΔTmin due to the following reason. During so-called refresh driving, when a frequency f (=1/ΔT) of the applied voltage is about 30 Hz or less, flickering occurs, thus limiting the lower frequency, i.e., ΔTmax. When the frequency f is a video rate or more, i.e., the speed represented by the frequency f exceeds a data transfer speed of the wordprocessor 1, communication between the display screen 102 and the wordprocessor 1 becomes impossible, thereby providing an upper limit of the frequency f, i.e., ΔTmin.

The drive voltage V also has an upper limit Vmax and a lower limit Vmin. These limits are primarily caused by various functions of the drive units.

Figure 8:
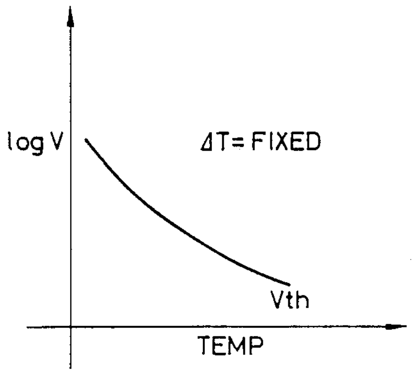
FIG. 8 is a graph showing the relationship between the temperature and drive voltage of the FLC element.

FIG. 8 shows the relationship between the drive voltage and the temperature, in which the temperature Temp is plotted along the abscissa and a logarithm of the drive voltage, i.e., logV is plotted along the ordinate. More specifically, FIG. 8 shows changes in threshold voltage value Vth in accordance with changes in temperatures when the pulse width ΔT is fixed. As is apparent from FIG. 8, the higher the temperature becomes, the lower the drive voltage becomes As is apparent from FIGS. 4 and 8, when the temperature is increased, the drive voltage value is decreased or the pulse width is decreased.

Figure 9:
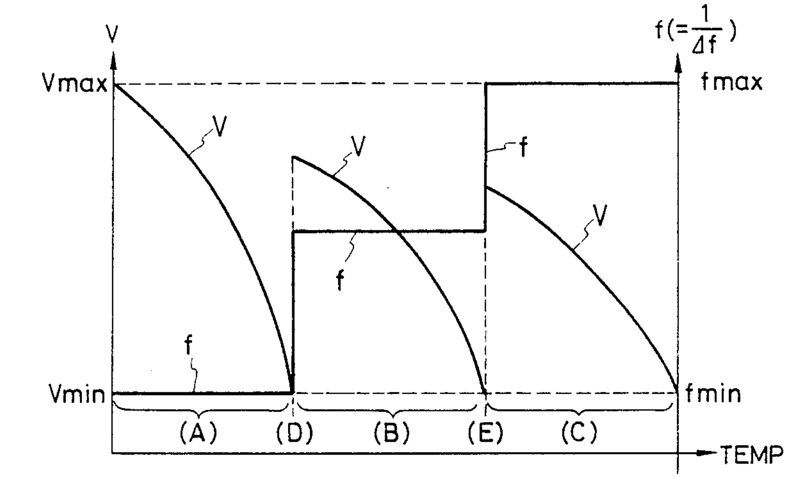
FIG. 9 is a graph showing the relationship between the temperature data, drive voltage data, and the frequency data, all of which are stored in a memory area in a controller in the device shown in FIG. 1.

FIG. 9 shows curves for actually driving the display element in accordance with the above various conditions. In other words, FIG. 9 shows a look-up table (to be described later) in an analog manner. The look-up table stores various drive condition data corresponding to the values detected by the temperature sensor 400.

The temperature Temp is plotted along the abscissa of FIG. 9, and the drive voltage V and the frequency f (=1/ΔT) are plotted along the ordinate. When the frequency f is fixed and the temperature Temp is increased, the drive voltage value V is decreased and becomes lower than Vmin in a temperature range (A). A higher frequency f is given as a fixed value at a temperature (D), and therefore the corresponding drive voltage V is determined. The above operations are repeated in temperature ranges (B) and (C) and at a temperature (E). The shapes of the resultant curves vary depending on liquid crystal properties. The number of stepwise or saw-toothed waves can be properly determined.

(3.5) Drive Method of Display Unit

In this embodiment, in the data access mode of the display screen 102, line access for every horizontal scanning line (i.e., a line corresponding to the common transparent electrode 114) and block access in units of blocks each consisting of several lines can be performed. The display screen 102 is scanned in either access mode. A block or line associated with access in the form of real address data from the wordprocessor 1 can be recognized.

Figure 10:
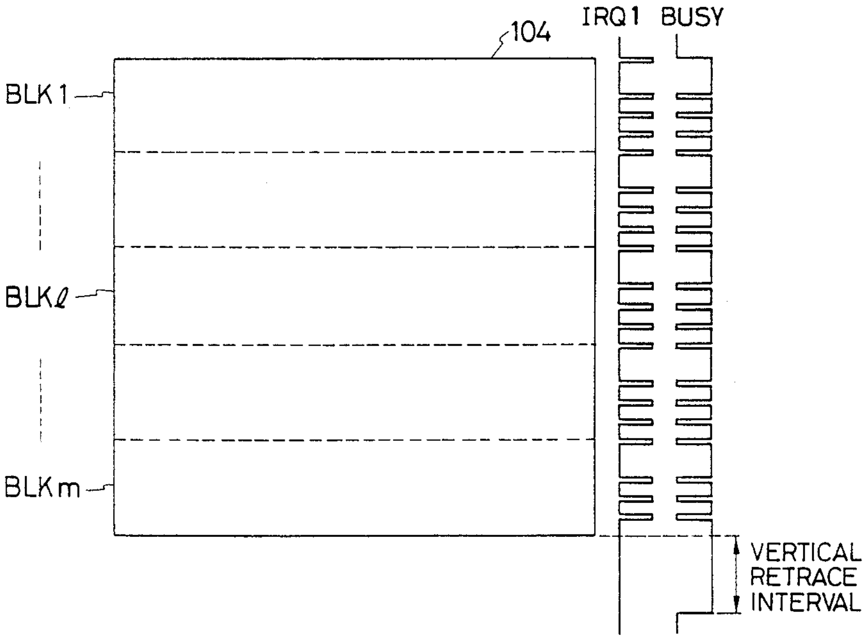
FIG. 10 is a view showing blocks as effective display areas according to the embodiment shown in FIG. 1.

FIG. 10 shows m blocks BLKl, . . . , BLK , . . . BLKm (1≦l≦m) obtained by dividing the effective display area 104 and including a predetermined number of lines. In this embodiment, 400 common transparent electrodes 114 (i.e., 400 lines) are arranged in the vertical scanning direction. The effective display area 104 is divided into 20 blocks (m=20) each comprising 20 lines. When block access is to be performed, display contents of all lines included in each block are erased, and data are sequentially written in the block from the head line to the last line.

When the display unit 100 is arranged, as shown in FIGS. 2 and 3, the FLC element has a memory function and the data which need not be updated is left unchanged, i.e., screen refresh need not be performed. Therefore, only data to be updated is accessed on the display screen.

In this embodiment, refresh driving for continuously refreshing the effective display area 104 from the head line to the last line, i.e., refresh driving equivalent to that for a display unit without a memory function, and partial rewrite driving for rewriting only a block or line subjected to updating can be performed. When the wordprocessor 1 transmits refresh data in the same manner as in refreshing of the display unit without a memory function, a refresh operation is performed. If data updating is required and the image data of the corresponding block or line is transmitted, the partial rewrite operation is performed.

The erase operation of the block and the write operation of the line are performed on the basis of the temperature compensation data described in (3.4). The temperature compensation data is updated in an interval between the end of access of the last line and the start of access of the head line in the refresh drive mode, i.e., in a vertical retrace interval The partial rewrite operation is performed every predetermined interval by a constant period interrupt.

(3.6) Display Screen Clearing

Since the FLC element according to this embodiment has a memory function, the first or second stable state can be maintained although a voltage is not applied. In other words, the previous screen state is maintained unless a voltage is applied.

The display screen 102 (at least the effective display area 104) is preferably cleared when the power switch is turned off. Then, for example, the power-off state can be confirmed by the state of the display screen 102. A display screen clearing state may be changed during the power-off state due to some reason and insignificant data may be displayed on the screen. Therefore, it is preferable to clear the effective display area 104 in order to prevent mixing of the actual display data and the insignificant data when the power switch is turned on.

Based on the above consideration, the effective display area 104 is cleared and the frame unit 106 is formed in this embodiment when the power switch is turned on. The effective display area 104 and the frame unit 106 are cleared when the power switch is turned off. Block erasure described with reference to (3.5) is performed for all blocks when the effective display area 104 is cleared.

The above clear operations are performed without screen erase data (e.g., "all white" data) from the wordprocessor 1 serving as a host device. The load of the wordprocessor 1 is reduced, and data transfer can be omitted, thereby achieving high-speed operation.

(4) Arrangement of Respective Components in Display Control Unit

The respective components in the display control unit 50 for realizing all functions described in "(3) General Description of Display Control" will be described in detail.

(4.1) Main Symbols

Signals and data which are exchanged between the components are summarized as follows:

| Signal | Signal Name | Output Side | Input Side | Content |
|---|---|---|---|---|
| Tout | System clock | Controller 500 (PORT2) | Data Output Unit 600 | Reference clock for the operation of the data output unit 600. Time on the control program is synchronized with time on the display screen. The reference clock is input to controller 500 so as to guarantee constantly stable one horizontal scanning period. |
| $\overline{IRQ1}$ | Line access interrupt | Data output unit 600 | Controller 500 (PORT5) | One of the interrupt signals is input to the controller 500 in response to the interrupt signal IRQ generated by the data output unit 600 in accordance with the real address data supplied from wordprocessor 1. |
| $\overline{IRQ2}$ | Block access interupt | Data output unit 600 | Controller 500 (PORT5) | |
| MR | Memory ready | MR generation unit | Controller 500 (PORT5) | Signal for establishing a timing of access of the D/A conversion unit 900. |
| $\overline{INTR}$ | A/D conversion end acknowledge- | A/D conversion unit 950 | Controller 500 (PORT6) | Signal for acknowledging the end of A/D conversion of the detected temperature |

-continued

| Signal | Signal Name | Output Side | Input Side | Content |
|---|---|---|---|---|
| | ment | | | data. |
| IBSY | Busy | Controller 500 (PORT6) | Data output unit 600 | This signal is output to the data output unit 600 so as to signal it to word-processor 1 |
| Light | Light source control signal | Controller 500 (PORT6) | Word-processor 1 | This signal requests lighting (ON) and nonlighting (OFF) of the light source FL. |
| P ON/OFF | Power status | Controller 500 (PORT6) | Word-Processor 1 | This signal requests processing in the ON/OFF operation of the power source. |
| DACT | Panel access identification signal | Controller 500 (PORT6) and Data output unit 600 (GATE) array 680) | Data output unit 600 (DACT generation unit) | This signal discriminates access/nonaccess of the effective display area 104. |
| $\overline{RD}$ | Read signal | Controller 500 (PORT7) | A/D conversion unit 950 and Data output unit 600 | This signal is a control signal for reading data from each input unit. |
| $\overline{WR}$ | Write signal | Controller 500 (PORT7) | A/D conversion units 950 and 900 and Data output unit 600 | This signal is a control signal for causing each unit to write data. |
| DD0-DD7 | Data on system data bus | Each component | Each component | |
| A0-A15 | Address signal | Controller 500 (PORT1 & PORT4) | Data output unit 600 | This signal is used to cause data output unit 600 to select each unit. |
| $\overline{RES}$ | Reset signal | Controller 500 (Reset unit 507) | Controller 500 (CPU 501) | This signal resets the CPU in the controller 500. |
| $\overline{NMI}$ (PDOWN) | Nonmaskable interrupt (Power-off interrupt) | Word-processor 1 | Controller 500 (CPU) | This signal is set as $\overline{NMI}$ in response to PDOWN for signaling power-off from the wordprocessor 1 to allow the controller 500 to perform proper processing. |
| E | Clock | Controller 500 (CPU) | D/A conversion unit 900 and Data output unit 600 | This clock is output after its pulse width is changed in response to the signal MR so as to properly access the D/A conversion unit 900 or the data output unit 600. |
| D0-D3 | Image data | Data output unit 600 | Segment drive unit 200 | These data are generated from image data input as the signal D from the word-processor 1. |
| D | | Word-processor 1 | Data output unit 600 | Signal including data to be displayed, real address data, and the horizontal sync signal. |
| CLK | Transfer clock | Word-processor 1 | Data output unit 600 | Transfer clock for the signal D. |
| A/$\overline{D}$ | Address/data discrimination signal | Data output unit 600 | Data output unit 600 | Signal for discriminating whether the data sent as the signal D is the image data or the real address data. |
| RA/D | Real address data | Data output unit 600 (Data input unit 601) | Data output unit 600 (Register 630) | This signal is used to designate a data display position and corresponds to one line. This signal is superposed on the horizontal sync signal and is derived from data input from the wordprocessor 1. |

-continued

| Signal | Signal Name | Output Side | Input Side | Content |
|---|---|---|---|---|
| IRQ | Interrupt signal | Data output unit 600 | Controller 500 | This signal is output to the controller 500 in response to the signal A/D and is supplied to the controller 500 as IRQ1 or IRQ2. |
| IRQ3 | Internal interrupt | Controller 500 (Timer) | Controller 500 (Timer) | Internal interrupt for releasing an inoperative state (sleep state). |
| $\overline{FEN}$ | Frame end signal | Data output unit 600 ($\overline{FEN}$ generation unit) | Data output unit 600 (Gate array 680) | This signal is used for horizontal frame formation. |
| $\overline{DS0}$ | Chip select signal | Data output unit 600 (Device selector) | A/D conversion unit 950 | These signals are generated in accordance with the signals A10 to A15 from the controller 500 and serve as the chip select signals from viewed from the controller 500. |
| $\overline{DS1}$ | Chip select signal | | D/A conversion unit 900 | |
| $\overline{DS2}$ | Chip select signal | | Data output unit 600 (Register selector) | |
| $\overline{DS3}$ | Chip select signal | | Unused | |
| $\overline{LATH}$ | Latch signal | Data output unit 600 | Segment drive unit 200 (Segment drive element 210) | This signal is used to cause the line memory to latch the data (image data) stored in the shift register in the element 210. |
| CA0–CA6 | Line selection signal | Data output unit 600 | Common drive unit 300 (Common drive element 310) | Selection signal of the horizontal scanning output line for the element 310. CA5 and CA6 are used to select the block and CA0 to CA4 are used to select the line in the block. |
| $\overline{CCLR}$ | Clear signal | Data output unit 600 | Common drive unit 300 | |
| CEN | Enable signal | Data output unit 600 | Common drive unit 300 | |
| CM1,CM2 | Waveform defining signal | Data output unit 600 | Common drive unit 300 | This signal defines the output waveform of the common drive element 310. |
| $\overline{SCLR}$ | Clear signal | Data output unit 600 | Segment drive unit 200 | |
| SEN | Enable signal | Data output unit 600 | Segment drive unit 200 | |
| SM1,SM2 | Waveform defining signal | Data output unit 600 | Segment drive unit 200 | This signal defines the output waveform of the segment drive element 210. |
| $\overline{V1}$–$\overline{V4}$ $\overline{CVc}$, $\overline{SVc}$ | Frame drive unit switch signal | Data output unit 600 | Frame drive unit 700 | This signal defines an output of the frame drive unit 700. |
| V1,V2 | Voltage signal | Power controller 800 | Common drive unit 300 | This signal defines an output voltage (+ and −) of the element 310. |
| V3,V4 | Voltage signal | Power controller 800 | Segment drive unit 200 | This signal defines an output voltrage (+ and −) of the element 210. |
| Vc | Voltage signal | Power controller 800 | Drive units 200 and 300 | This signal defines the reference ("0") of the output |

-continued

| Signal | Signal Name | Output Side | Input Side | Content |
| --- | --- | --- | --- | --- |
| | | | | voltage. |

(4.2) Controller

Figure 11:
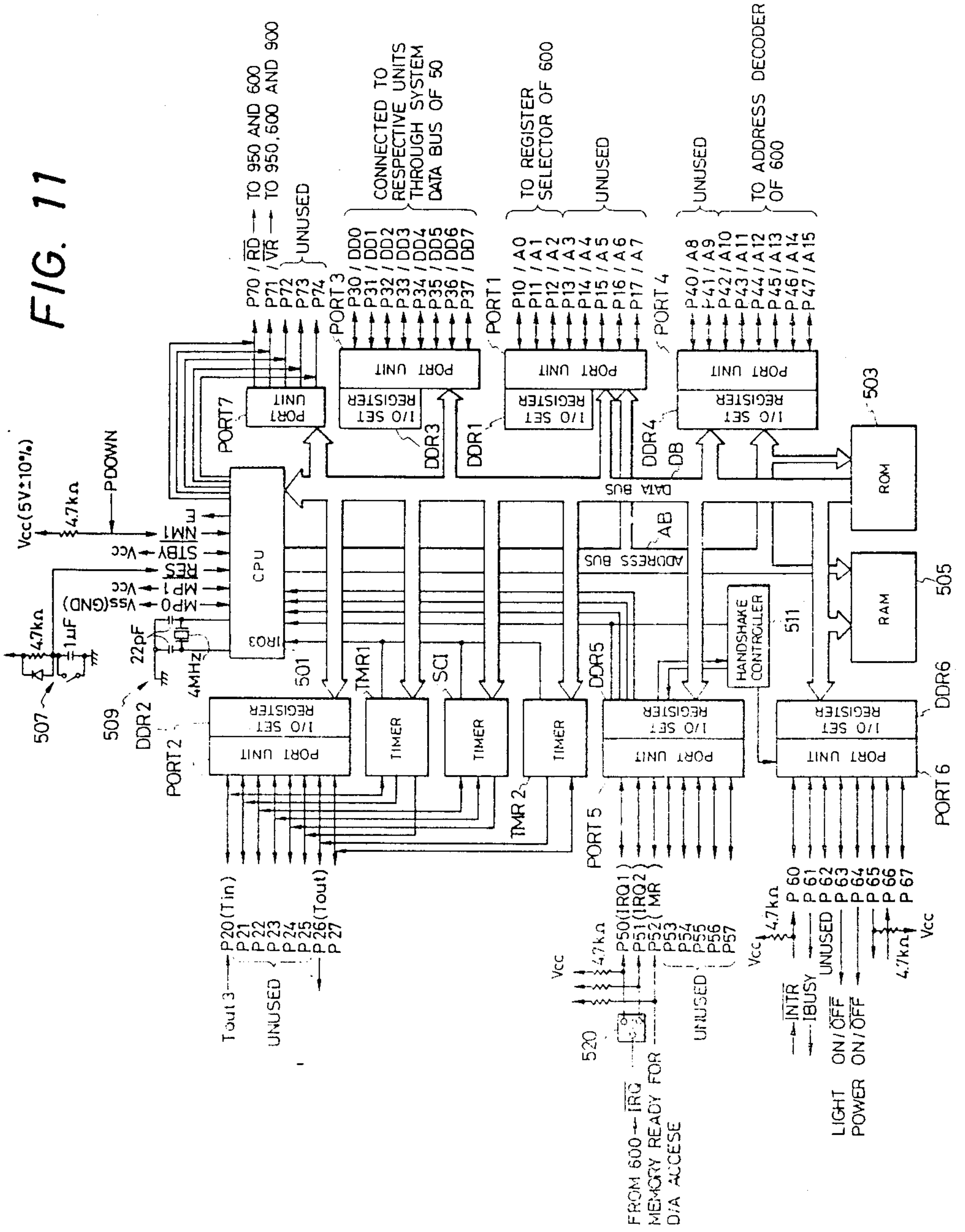
FIG. 11 is a block diagram showing an arrangement of the controller of the embodiment shown in FIG. 1.

FIG. 11 shows an arrangement of the controller 500. The controller 500 includes a CPU 501 in the form of, e.g., a microprocessor for controlling the respective components in accordance with a flow chart shown in FIG. 32, a ROM 503 for storing a program corresponding to the flow chart of FIG. 32 and various tables data, and a RAM 505 serving as a working memory for storing processed data during a control sequence of the CPU 501.

The controller 500 also includes I/O port units PORT1 to PORT6. The I/O port units PORT1 to PORT6 have ports P10 to P17, ports P20 to P27, ports P30 to P37, ports P40 to P47, ports P50 to P57, and ports P60 to P67. A port unit PORT7 serves as an output port unit which has ports P70 to P74. I/O setting registers DDR1 to DDR6 (data direction registers) in the controller 500 are used to set switching between the input and output directions of the port units PORT1 to PORT6. In this embodiment, the ports P13 to P17 (corresponding to signals A3 to A7) in the port unit PORT1, the ports P2l to P25 in the port unit PORT2, the ports P40 and P41 (corresponding to signals A8 and A9) in the port unit PORT4, the ports P53 to P57 in the port unit PORT5, the port P62 in the port unit PORT6, the ports P72 to P74 in the port unit PORT7, and terminals MP0, MP1, and STBY of the CPU 501 are unused.

The controller 500 includes a reset unit 507 for resetting the CPU 501 and a clock generation unit 509 for supplying a reference operation clock (4 MHz) to the CPU 501.

Each of timers TMR1, TMR2, and SCI has a reference clock generator and a register, and the reference clock can be frequency-divided in accordance with a value set in the register. More specifically, the timer TMR2 frequency-divides the reference clock in accordance with a set value of the register and generates a signal Tout serving as a system clock for the data output unit 600. The data output unit 600 generates a clock signal which defines one horizontal scanning period (1H) of the display unit 100 on the basis of the signal Tout. The timer TMR1 is used to synchronize the operating time of the program with the 1H on the display screen 102. This synchronization operation is performed in accordance with a set value in its register.

The timers TMR1 and TMR2 supply an internal interrupt signal IRQ3 to the CPU 501 at the time of time-up of the period based on the preset value and at the start of time measurement at the time-up timing. The CPU 501 accepts the interrupt signal IRQ3 as needed.

The timer SCI is unused in this embodiment.

Referring to FIG. 11, an address bus AB and a data bus DB are connected between the respective components and the CPU 501. A handshake controller 511 causes the port units PORT5 and PORT6 to handshake with the CPU 501.

(4.3) Memory Space of ROM (4.3.1) Arrangement of Memory Space

Figure 12:
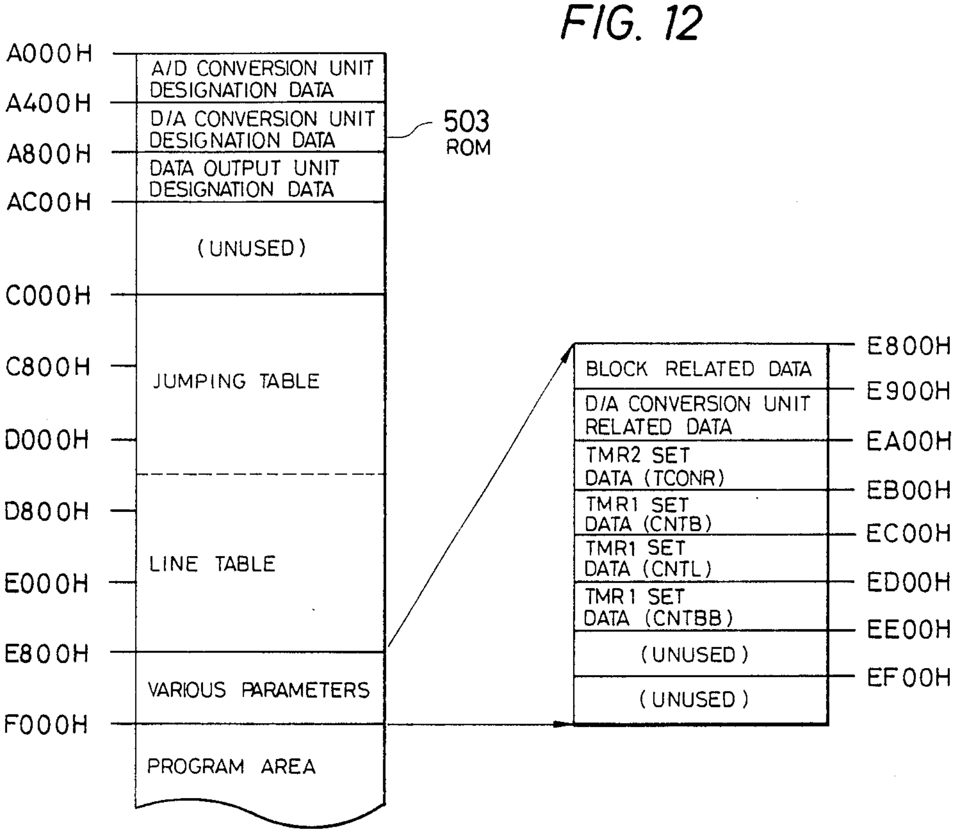
FIG. 12 is a memory map of a memory space in the controller shown in FIG. 11.

FIG. 12 shows an arrangement of the memory space in the ROM 503. Data for designating and accessing the A/D conversion unit 950 and the D/A conversion unit 900 are stored in a memory area at A000H (where H means hexadecimal notation) to A3FFH and a memory area at A400H to A7FFH, respectively. Data for designating a display unit drive register (FIG. 16) for accessing the data output unit 600 are stored at A800H to ABFFH.

A memory area at C000H to E7FFH is defined as an area to be referred to in response to real address data RA/D output from the wordprocessor 1. This area comprises a jumping table for discriminating if the address data sent in the block access mode is associated with the block head line, and a line table for designating a common line to be driven in response to the received real address data RA/D.

An area at E800H to EFFFH is used to store various parameters associated with control (to be described later) with reference to FIGS. 33 and 36A to 38. The area at E800H to EFFFH has a block related data area (E800H ~) for storing the number of blocks (20 blocks in this embodiment), a D/A conversion unit related data area (E900H ~) for storing data for controlling the D/A conversion unit 900 so as to variably set the drive voltages for the transparent electrodes, a TMR2 designation data area (EA00H ~) for storing data TCONR for designating the timer TMR2 for outputting the clock Tout serving as the reference for setting one horizontal scanning period (1H) on the display unit 100, and timer TMR1 designation data areas (respectively EB00H ~, EC00H ~, and ED00H ~) for storing register designation data CNTB, CNTL, and CNTBB for the timer TMR1 for setting a delay time so as to synchronize the operating time on the display unit 100 and the control operating time.

An area at F000H is a program area for storing programs corresponding to the processing sequences to be described with reference to FIG. 32, FIG. 33, and FIGS. 36A to 38.

(4.3.2) Jumping Table

In this embodiment, a processing route varies depending on the fact as to whether the real address data RD/D sent from the wordprocessor 1 is related to the block head line due to the following reason. When the address data corresponding to the block head line is supplied, display contents of this block are cleared, and data are sequentially written for the respective lines in the block.

For this reason, it is required to check whether the real address data RA/D sent from the wordprocessor 1 corresponds to the block head line. It is assumed that each input real address data is compared with each address data of each block head line.

However, the above sequential comparison causes an increase in processing time when the number of objects to be compared is increased because the number of comparison steps is increased before and after the program of comparison and discrimination processing step.

In this embodiment, discrimination processing is performed using the jumping table, and the discrimination time is averaged.

Figure 13:
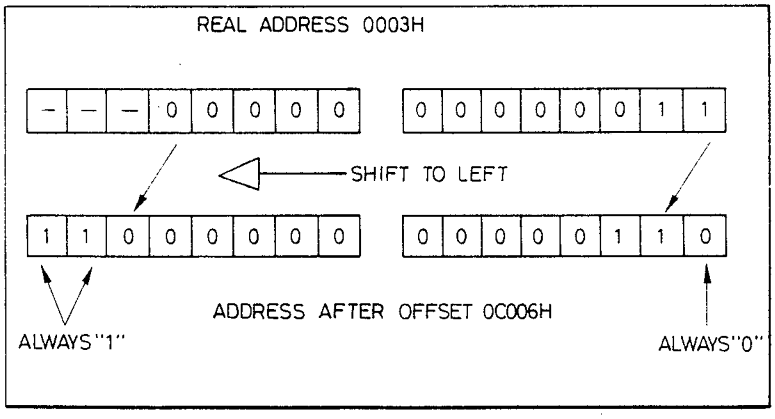
FIG. 13 is a view for explaining an address change in the embodiment shown in FIG. 1.

For example, as shown in FIG. 13, if real address data from the wordprocessor 1 is "03"H (corresponding to line number "3"), this data is shifted by one bit to the left. Both two upper bits are set at logic "1", and the LSB (least significant bit) is set at logic "0", thereby obtaining data "C006"H after the offset. This data is used as address data on the memory space, and a code representing whether to indicate the block head line is stored at the address for the memory space. Then, the block head line can be discriminated for all read address data within identical execution intervals.

In addition, if the CPU 501 can use an index register (IX) and can process an instruction (e.g., "JUMP IX") for jumping the operation to a step represented by the address of the index register, the offset data is stored in the IX, and a jump destination address is written in the jumping table. Therefore, proper processing can be immediately started when the above instruction is executed.

Figure 14:
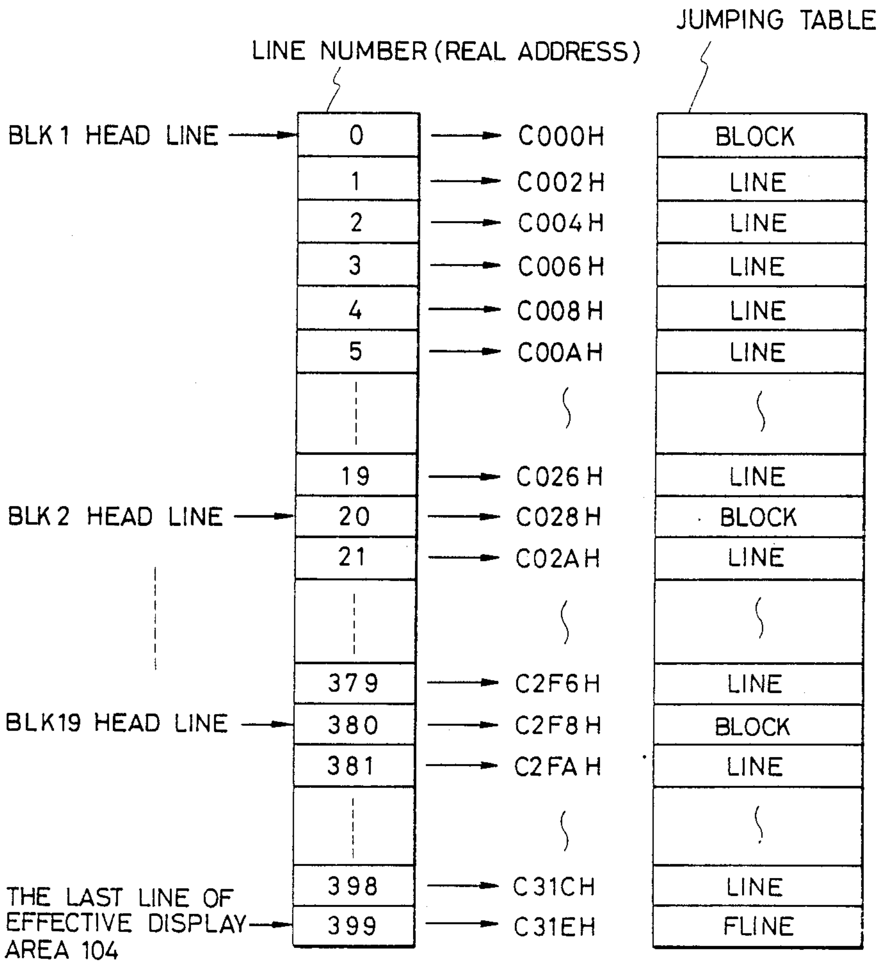
FIG. 14 is a view for explaining a one-to-one correspondence between a line number and a jumping table in the embodiment shown in FIG. 1.

In the above embodiment, a CPU which can use the index register and the above instruction is used as the CPU 501, and the jumping table (C000H to C31EH) corresponding to the line numbers (0 to 399) is arranged, as shown in FIG. 14. The sequences (head addresses on the program areas of these sequences) are stored at the addresses of the jumping table.

FIG. 14 shows a block erase sequence BLOCK, a line write sequence LINE, and a sequence FLINE accompanied by last line write of the effective display area 104 in the block access mode. These sequences will be described in detail with reference to FIGS. 36A to 36D.

In the line access mode, the line is discriminated whether it is the last line so as to discriminate whether the temperature compensation data updating sequence is to be performed. Therefore, an object to be compared is one, and the above discrimination using the jumping address need no be performed.

(4.3.3) Line Table

The real address data RA/D must be changed depending on the type of the common drive unit 00. For example, the drive unit 300 comprises five common drive elements 310 each generating an 80-bit output (80 bits are divided into four blocks). Furthermore, 400 scanning lines are arranged as common lines. In order to select one scanning line:

(1) One of the five common drive elements 310 is selected;

(2) One of the four blocks of the elements 310 is selected; and (3) One of the 20 lines in the block is selected.

Figure 15:
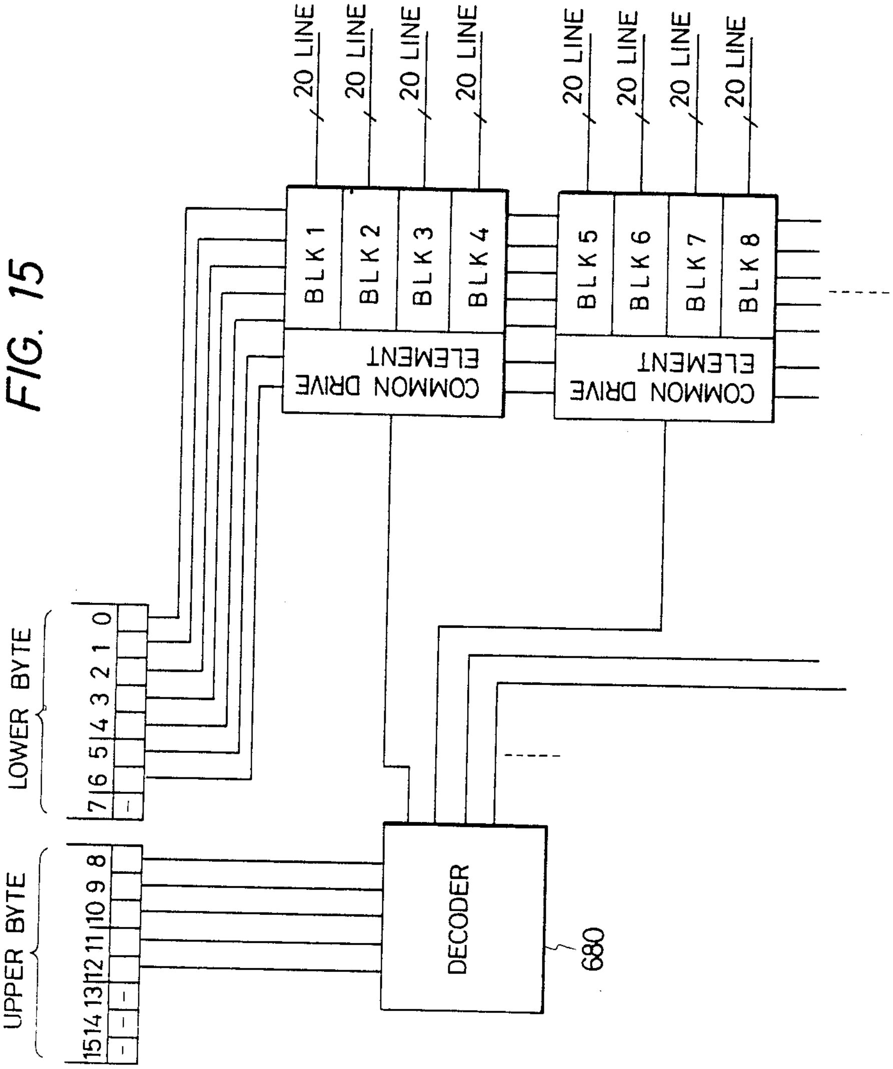
FIG. 15 is a block diagram for explaining a method of selecting scanning lines in the embodiment shown in FIG. 1.

In this embodiment, as shown in FIG. 15, a 2-byte line selection address is used. The 12th to 8th bits of the line selection address are assigned to the element 310, the sixth and fifth bits of the address are assigned to the block, and the fourth to 0th bits thereof are assigned to the line. Translation or a change from the real address data into the line selection address data can be performed substantially in the same manner as in processing (FIG. 13) described with reference to the jumping table. The line selection address data is developed in the line table.

In an arrangement of FIG. 15, a decoder 680 performs selection (element chip select) of the element 310. With this arrangement as well as assignment of 12th to 8th bits for chip selection, the number of elements 310 can be extended to a maximum of $2^5=32$. In this case, 2560 scanning lines can be selectively driven.

(4.3.4) Storage Area for Various Parameters

In this embodiment, the drive conditions, i.e., the drive voltage, one horizontal scanning period, and delay data, of the display unit 100 are changed in accordance with the temperature conditions, thereby performing optimal drive control. Therefore, the drive conditions must be corrected for driving on the basis of the temperature measurement data from the temperature sensor 400.

An area at E900H to EDFFH is an area for storing this correction data. In this embodiment, the following data are stored to achieve an effective read operation for parameters corresponding to temperatures (to be described later).

If one D/A conversion unit related data can correspond to TCONR and CNTB (CNTL or CNTBB) for one temperature range or one step in a given temperature range, the respective parameters corresponding to the temperatures can be stored in the memory areas having the same two lower bytes. In the same manner as described with reference to FIG. 13, temperature data output from the A/D conversion unit 950 or data obtained by properly processing the temperature data is used as two lower bytes of the address data, and the two upper bytes are sequentially updated to obtain parameters corresponding to the temperatures.

For example, if the temperature data is "0080"H, data at address "E980"H obtained by adding "0080"H to "E900"H is accessed to obtain the D/A conversion unit related data (drive voltage) corresponding to the temperature represented by this temperature data. Data at address "EA80"H obtained by adding "E980"H to "0100"H is accessed to obtain timer TMR2 designation data TCONR (data for generating the fundamental clock which defines one horizontal scanning period on the display screen). Similarly, additions and access cycles are repeated to obtain data CNTB, CNTL, and CNTBB respectively corresponding to the detected temperatures.

(4.4) Data Output Unit (4.4.1) Arrangement

Figure 16:
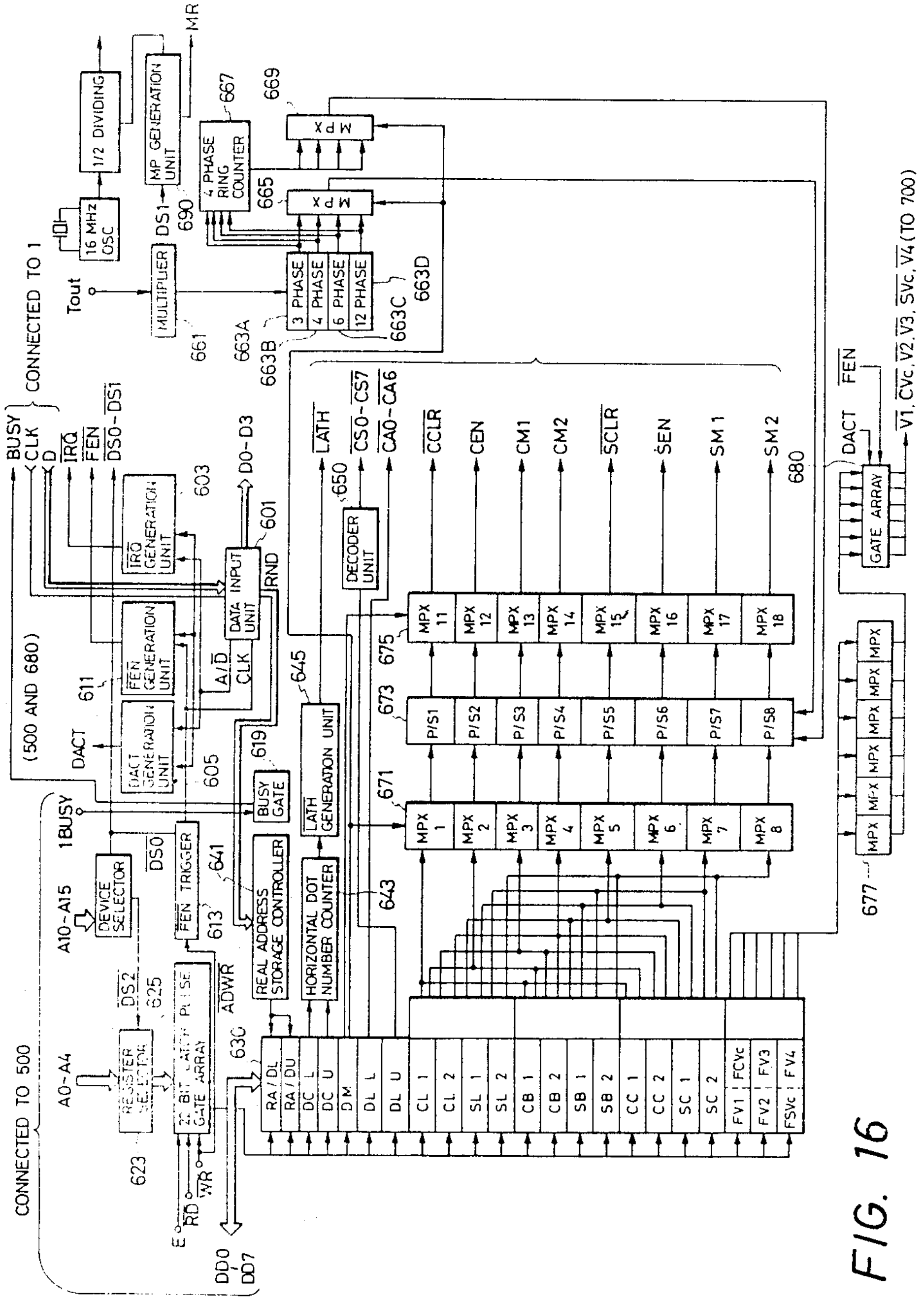
FIG. 16 is a block diagram showing an arrangement of a data output unit in the embodiment shown in FIG. 1.

FIG. 16 shows an arrangement of the data output unit 600. The data output unit 600 includes a data input unit 601, coupled to the wordprocessor 1, for receiving a signal D and a transfer clock CLK. The signal D is obtained by adding an image signal to the horizontal sync signal and is output from the wordprocessor 1. In this embodiment, the real address data is superposed during the horizontal sync signal period or the horizontal retrace erase interval. The data input unit 601 changes a data output path in accordance with the presence/absence of detection of the horizontal sync signal or the horizontal retrace erase interval and detects a superposed signal component as the real address data. The data input unit 601 outputs the real address data as RA/D. However, when the horizontal sync signal or the horizontal retrace erase interval is not detected, the signal component during detection is detected as image data. In this case, the data input unit 601 outputs the image data as image data bits D0 to D3.

When the data input unit 601 detects the real address data input, it enables an address/data discrimination signal $A/\overline{D}$ which is then input to an $\overline{IRQ}$ generation unit 603 and a DACT generation unit 605. The $\overline{IRQ}$ generation unit 603 outputs an interrupt signal $\overline{IRQ}$ in response to the signal A/$\overline{D}$. The interrupt signal $\overline{IRQ}$ is supplied as an interrupt command $\overline{IRQ1}$ or $\overline{IRQ2}$ to the controller 500. Therefore, an operation in the line or block access mode is performed. In response to the signal A/$\overline{D}$, the DACT generation unit 05 outputs the DACT signal for discriminating the presence/absence of access of the display unit 100. The DACT signal is supplied to the controller 500, an $\overline{FEN}$ generation unit 611, and a gate array 680.

In response to a trigger signal output from an $\overline{FEN}$ trigger generation unit 613 during an ON duration of the DACT signal, the $\overline{FEN}$ generation unit 611 generates a signal $\overline{FEN}$ for starting the gate array 680. The $\overline{FEN}$ trigger generation unit generates a trigger signal in response to a write signal $\overline{ADWR}$ for causing the controller 500 to instruct the A/D conversion unit 950 to fetch temperature information from the temperature sensor 400. In this case, the $\overline{FEN}$ trigger generation unit 613 is selected in response to a chip select signal $\overline{DS0}$ generated by a device selector 621. More specifically, when the A/D conversion unit 950 is selected to cause the controller 500 to fetch temperature data, the $\overline{FEN}$ trigger generation unit 613 is also selected, and frame driving is effected in response to the write signal $\overline{ADWR}$.

In response to a busy signal IBUSY from the controller 500, a busy gate 619 outputs a signal BUSY signaling a busy state of the display control unit 50 to the word-processor 1.

The device selector 621 receives signals A10 to A15 from the controller 500 and outputs chip select signals $\overline{DS0}$ to $\overline{DS2}$ for the A/D conversion unit 950, the D/A conversion unit 900 and the data output unit 600. A register selector 623 is started in response to the signal $\overline{DS2}$ and sets a latch pulse gate array 625 on the basis of signals A0 to A4 from the controller 500. The latch pulse gate array 625 selects each register in a register unit 63 and has the number of bits corresponding to the number of registers in the register unit 630. The register unit 630 comprises 22 1-byte registers. The 22-bit latch pulse gate array 625 has bits respectively corresponding to the 22 registers in the register unit 630. More specifically, when the register selector 623 performs bit selection of the latch pulse gate array 625, the corresponding area or register is selected, and data read or write access is performed for the selected register through a system data bus in response to a read signal $\overline{RD}$ or a write signal $\overline{WR}$ from the controller 500 to the latch pulse gate array 625.

The lower and upper byte registers RA/DL and RA/DU in the register unit 630 store the lower and upper one-bytes of the real address data RA/D under the control of a real address storage controller 641.

Horizontal dot count data registers DCL and DCU respectively store lower and upper one-bytes of the data corresponding to the value corresponding to the number of dots (800 dots in this embodiment) in the horizontal scanning direction on the display screen. When a horizontal dot number counter 643 for counting clocks in response to the start of transfer of the image data D0 to D3 counts clocks the number of which is equal to the value stored in the registers DCL and DCU, the counter 643 causes an $\overline{LATH}$ generation unit 645 to generate a latch signal.

A drive mode register DM stores mode data corresponding to the line or block access mode.

Common line select address data registers DLL and DLU store lower and upper one-bytes of the 16-bit data shown in FIG. 15. The data stored in the register DLL is output as block designation address data CA6 and CA5 (corresponding to the sixth and fifth bits in FIG. 15) and line designation address data CA4 to CA0 (corresponding to the fourth to 0th bits in FIG. 15). The data stored in the register DLU is supplied to the decoder 650 and is output as chip select signals $\overline{CS0}$ to $\overline{CS7}$ for the common drive element 310.

One-byte areas CL1 and CL2 store drive data supplied to the common drive unit 300 in driving (line write) of the common lines in the block access mode, and one-byte areas SL1 and SL2 store drive data supplied to the segment drive unit 200 during driving of the segment lines in the block access mode.

One-byte areas CB1 and CB2 store the drive data supplied to the common drive unit 300 at the time of driving of the common lines during block erasure in the block access mode. One-byte areas SB1 and SB2 store drive data supplied to the segment drive unit 200 in the same manner as in the one-byte areas CB1 and CB2.

One-byte areas CC1 and CC2 store data supplied to the common drive unit 300 at the time of driving of the common lines during line write in the line access mode. One-byte areas SC1 and SC2 store drive data supplied to the segment drive unit 200 in the same manner as in the one-byte areas CC1 and CC2.

The subsequent three one-byte areas store data for switching the frame drive unit 700, and a total of 3 bytes are divided in units of 4 bits so as to form registers FV1, FCVc, FV2, FC3, FSVc, and FV4.

A multiplier 661, for example, doubles the pulse signal Tout from the controller 500. A 3 phase ring counter 663A is used to divide one horizontal scanning period (1H) into four intervals, a 4 phase ring counter 63B is used to divide 1H into three intervals, a 6 phase ring counter 663C is used to divide 1H into two intervals, and a 12 phase ring counter 663D is used not to divide 1H. The divided duration is called as ΔT. For example, if the 4 phase ring counter is used, 3 ΔT is equal to 1H.

A multiplexer 665 selects one of the outputs from the ring counters 663A to 663D in accordance with the contents of a drive mode register DM, i.e., in accordance with data representing which division is employed. For example, when a ⅓ division is employed, the output from the 4 phase ring counter 663 is selected by the multiplexer 665.

A 4 phase ring counter 667 receives the outputs from the ring counters 663A to 663D. A multiplexer 669 can be set in the same manner as in the multiplexer 665.

Figure 17:
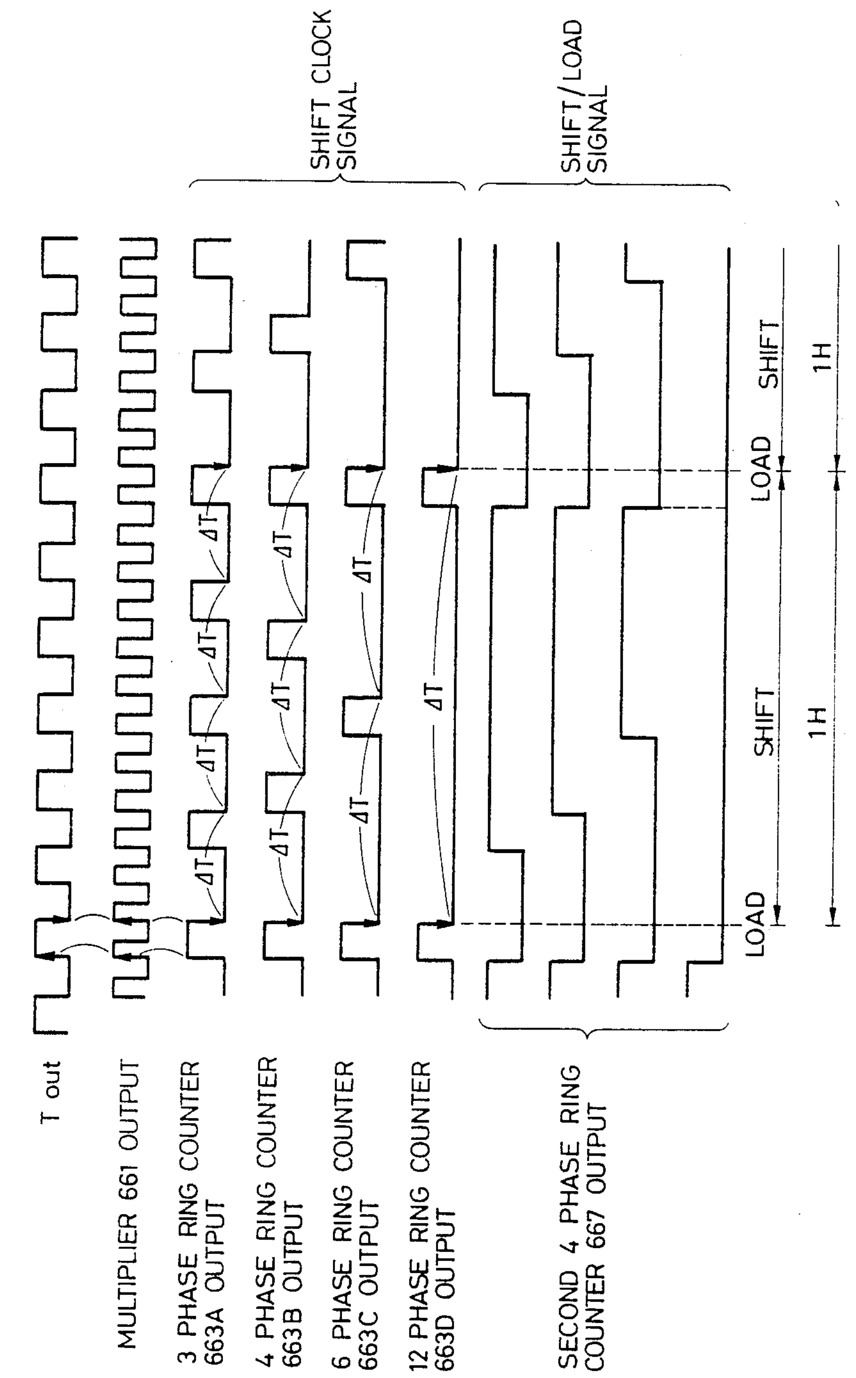
FIG. 17 is a timing chart showing signals for setting drive waveform generation in the data output unit shown in FIG. 16.

FIG. 17 shows waveforms of the clock signal Tout, the output from the multiplier 661, and the outputs from the ring counters 663A to 663D. When the multiplexer 665 selects one of the outputs from the ring counters 663A to 663D, 4ΔT/1H, 3ΔT/1H, 2ΔT/1H, or ΔT/1H is selected, and its output waveform is supplied as shift clocks to a shift register unit 673 (to be described later). The shift register 673 outputs on/off data for every ΔT. An output from the 4 phase ring counter 667 is selected by the multiplexer 669, and its output waveform is supplied as a shift/load signal to the shift register unit 673. An operation is set in accordance with a selected division value.

Referring back to FIG. 16, in the register unit 630, on/off data for every AT of clear and enable signals $\overline{CCLR}$ and CEN output to the common side drive unit 300 are stored in the areas CL1, CB1, and CC1; and on/off data for every ΔT of drive waveform defining signals CM1 and CM2 are stored in the areas CL2, CB2, and CC2. On/off data for every AT of a clear signal $\overline{SCLR}$ and an enable signal SEN output to the segment drive unit 200 are stored in the areas SL1, SB1, and SC1; and on/off data for every ΔT of waveform defining signals SM1 and SM2 are stored in the areas SL2, SB2, and SC2.

In this embodiment, each signal data storage area is a 4bit area, and one bit corresponds to the on/off data of 1 ΔT. That is, a maximum division number of 1H in this embodiment is 4.

A multiplexer unit 671 is coupled to the areas CL1 to SC2 and selects signal data in the line write operation in the block access mode, the block erase operation in the block access mode, and the line write operation in the line access mode in accordance with the content of the drive mode register DM. The multiplexer unit 671 comprises a multiplexer MPX1 for selecting 4bit data for the signal $\overline{CCLR}$ from the area CL1, CB1, or CC1, a multiplexer MPX2 for selecting 4-bit data for the signal CEN, a multiplexer MPX3 for selecting one of the 4-bit data for the signal CM1 from the area CL2, CB2, or CC2, and a multiplexer MPX4 for selecting 4bit data for the signal CM2. A multiplexer MPX5 selects one of the 4-bit data for the signal $\overline{SCLR}$ from the area SL1, SB1, or SC1. A multiplexer MPX6 selects 4bit data for the signal SEN. A multiplexer MPX7 selects one of the 4-bit data for the signal SM1 from the area SL2, SB2, or SC2. A multiplexer MPX8 selects 4bit data for the signal SM2.

A shift register unit 673 comprises parallel/serial (P/S) conversion shift registers P/S1 to PS/8 respectively connected to the multiplexers MPX1 to MPX8 in the multiplexer unit 671. An output from a multiplexer 665 is output as a shift clock signal to define an output interval ΔT of the 1-bit on/off data. An output from a multiplexer 669 is output as a preset signal for performing an operation in accordance with a preset division number.

A multiplexer unit 675 comprises multiplexers MPX11 to MPX18 respectively coupled to the shift registers P/S1 to P/S8 and outputs P/S-converted on/-off data on the basis of the bit selection data (stored in the register DM) of 4-bit on/off data stored in the registers CL1 to SC2.

An output unit 677 performs the same operation as those of the shift register unit 673 and the multiplexer 675 for the registers FV1, FCVc, FV2, FV3, FSVc, and FV4. A gate array 680 is enabled in response to the signals DACT and $\overline{FEN}$ to gate switch signals $\overline{V1}$ to $\overline{V4}$, $\overline{CVc}$ and $\overline{SVc}$ to the frame drive unit 700.

An MR generation unit 690 outputs a signal MR to the controller 500 upon activation of the chip select signal DS1 for the D/A conversion unit 900, i.e., during access of the D/A conversion unit 900, and changes a pulse width of a clock E generated by the CPU 501.

(4.5) A/D Conversion Unit

Figure 18:
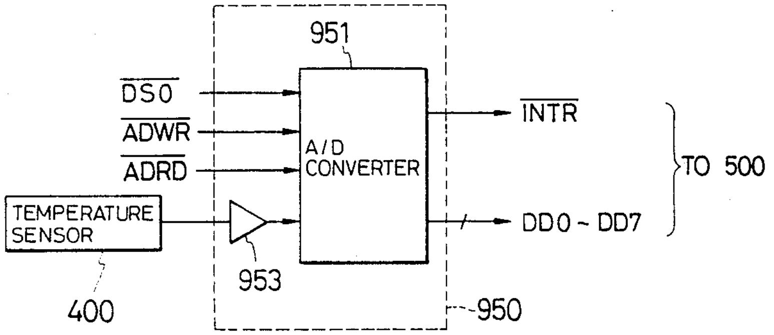
FIG. 18 is a block diagram showing an arrangement of an A/D conversion unit in the embodiment shown in FIG. 1.

FIG. 18 shows an arrangement of the A/D conversion unit 950. The conversion unit 950 comprises an A/D converter 951 and an amplifier 953 for amplifying a detection signal from the temperature sensor 400 to a level matching with sensitivity of the A/D converter 51.

At the time of temperature detection, the controller 500 sends the chip select signal $\overline{DS0}$ through the device selector 621 in the data output unit 600. At the same time, the controller 500 generates the write signal $\overline{WR}$ (illustrated as $\overline{ADWR}$ in this case). In response to these signals, the A/D converter 951 converts an analog temperature detection signal obtained from the temperature sensor 400 through the amplifier 953 into a digital signal. At the end of A/D conversion, the A/D converter 951 activates the interrupt signal $\overline{INTR}$, thus signaling the end of A/D conversion to the controller 500.

In response to the signal $\overline{INTR}$, the controller 500 supplies a read signal $\overline{RD}$ (illustrated as $\overline{ADRD}$ in this case) to the A/D converter 951. The A/D converter 951 supplies the digital temperature data as signals DD0 to DD7 to the controller 500 through the system bus.

When refresh driving is performed to continuously refresh the display contents from the head line to the last line in the effective display area 104, the temperature detection timing falls within the vertical retrace interval from the end of driving of the last line to the start of driving of the start line. When partial rewrite driving is performed to rewrite only the block or line subjected to display data updating, for example, this operation can be cyclically performed in response to a timer interrupt.

(4.6) D/A Conversion Unit and Power Controller

Figure 19:
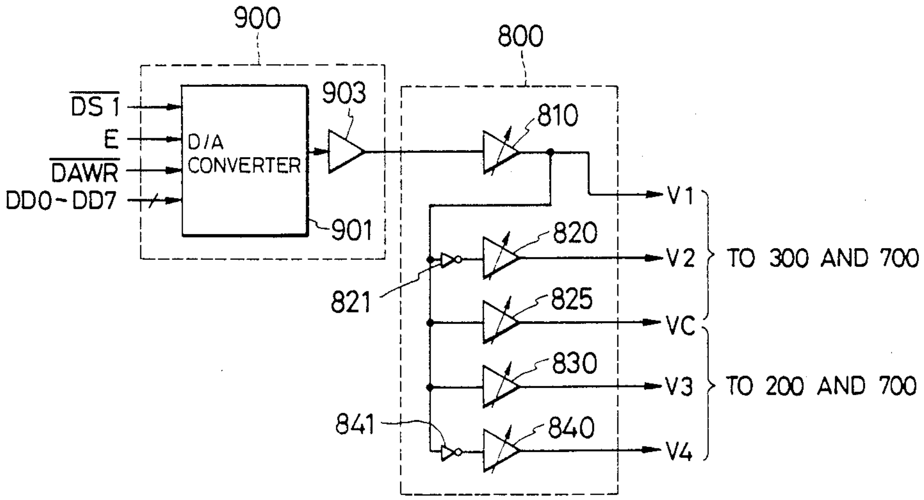
FIG. 19 is a block diagram showing an arrangement of a D/A conversion unit and a power controller in the embodiment shown in FIG. 1.

FIG. 19 shows an arrangement of the D/A conversion unit 900 and the power controller 800.

The D/A conversion unit 900 comprises a D/A converter 901 and an amplifier 903 for amplifying an output from the D/A converter so as to match with a level in the next stage.

The power controller 800 comprises variable gain amplifiers 810, 820, 825, 830, and 840 for generating voltage signals V1, V2, VC, V3, and V4, respectively. The voltage V1 is generated by supplying an output from the amplifier 903 to the amplifier 810. The voltages V2, VC, V3, and V4 are generated by supplying the output from the amplifier 810 to the amplifiers 820, 825, 830, and 840. The power controller 800 also includes a inverter 821 arranged between the amplifiers 810 and 820, and an inverter 841 inserted between the amplifiers 810 and 840.

The voltages V1 and V2 are respectively positive and negative drive voltages supplied to the common drive unit 300. The voltages V3 and V4 are respectively positive and negative voltages supplied to the segment drive unit 200. The voltage VC is the reference voltage applied to the drive units 200 and 300. These voltage signals are also supplied to the frame drive unit 700.

The gains of the amplifiers 810, 820, 825, 830, and 840 are set such that a ratio of differences in the voltages V1, V2, VC, V3, and V4 to the VC is set to be $2 : -2 : 0 : 1 : -1$ while the reference voltage VC is fixed.

When the drive voltages are changed in accordance with changes in temperature, the controller 500 generates the chip select signal $\overline{DS1}$ through the device selector 621 in the data output unit 600 to select the D/A converter 901. In this case, when the fundamental clock for operating the D/A converter 901 is different from that for operating the controller 500, the signal $\overline{DS1}$ is also supplied to the MR generation unit 690 in the data output unit 600, thereby generating the signal MR. The controller 500 supplies the proper clock signal E to the D/A converter 901. The controller 500 activates the write signal $\overline{WR}$ (illustrated as $\overline{DAWR}$ in this case) and the digital data DD0 to DD7 are supplied to the D/A converter 901 through the system bus. The D/ converter 901 converts the input data into an analog signal.

The analog signal is then output through the amplifier 903.

When the voltage V1 is generated by the amplifier 810, the voltages V2, VC, V3, and V4 having the above ratio with respect to the voltage V1 are generated.

In the arrangement shown in FIG. 19, the voltage V2 and the like are generated with respect to the voltage V1. However, the output from the amplifier 903 may be supplied to the variable gain amplifiers 810, 820, 825, 830, and 840. Alternatively, variable gain amplifiers capable of programming gain control may be used. The arrangement of the power controller 800 is not limited to the above arrangement, but various arrangements may be employed if a multi-value voltage can be generated in accordance with the operation modes of the drive units 200 and 300.

(4.7) Frame Drive Unit

Figure 20:
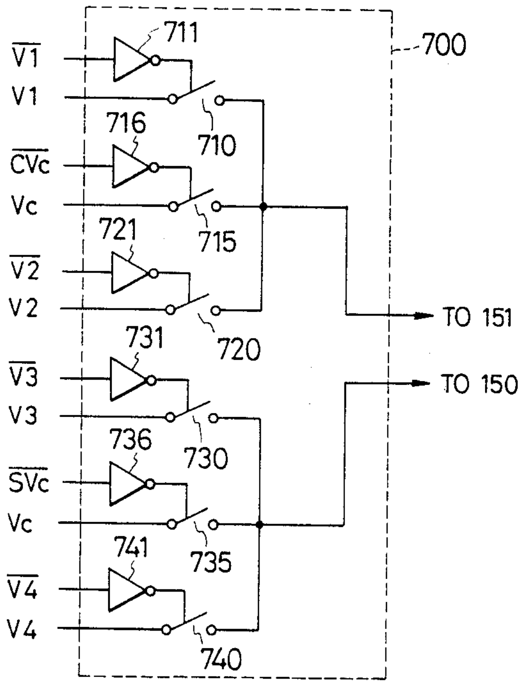
FIG. 20 is a block diagram showing an arrangement of a frame drive unit in the embodiment shown in FIG. 1.

FIG. 20 shows an arrangement of the frame drive unit 700. The frame drive unit 700 includes switches 710,7715, 720, 730, 735, and 740 for connecting/disconnecting the supply paths of the voltage signals V1, VC, V2, V3, VC, and V4. The switches 710, 715, 720, 730, 735, and 740 are controlled in response to switch signals $\overline{V1}$, $\overline{CVc}$, $\overline{V2}$, $\overline{V3}$, $\overline{SVc}$, and $\overline{V4}$ supplied from the gate array 680 in the data output unit 600 through inverters 711, 716, 721, 731, 736, and 741.

When frame driving is performed, the switches 710, 715, and 720 are switched in accordance with the contents of the registers FV1, FCVc, and FV2 arranged in the register unit 630 in the data output unit 600, i.e., the states of the signals $\overline{V1}$, $\overline{CVc}$, and $\overline{V2}$. A signal having a waveform with three values for $\overline{V1}$, $\overline{VC}$, and $\overline{V2}$ can be applied to the frame transparent electrodes 151 parallel to the common lines. The switches 730, 735, and 740 are switched in accordance with the contents of the registers FV3, FSVc, and FV4, i.e., the states of the signals $\overline{V3}$, $\overline{SVc}$, and $\overline{V4}$. A signal having a waveform with three values of V3, VC, and V4 is applied to the frame transparent electrodes 150 parallel to the segment lines.

(4.8) Display Drive Unit (4.8.1) Segment Drive Unit

Figure 21:
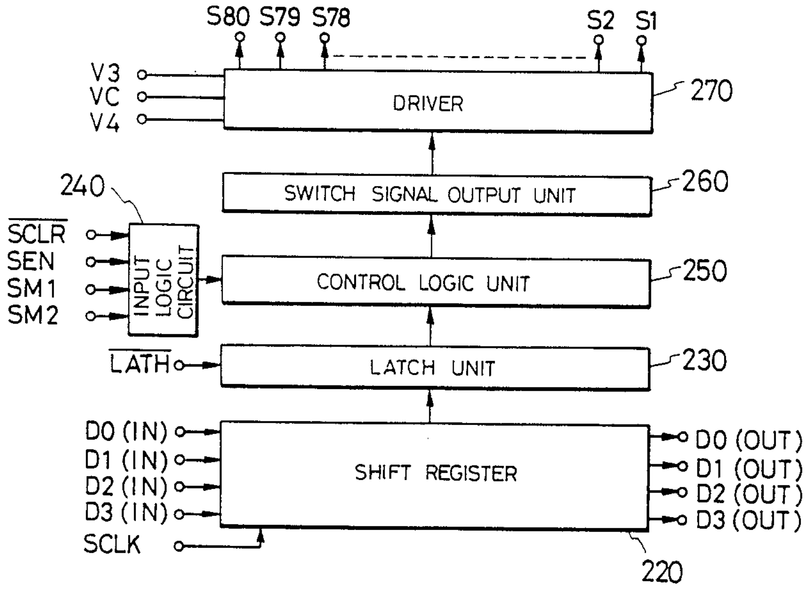
FIG. 21 is a block diagram showing a schematic arrangement of a segment drive element in the embodiment shown in FIG. 1.

FIG. 21 shows a schematic arrangement of the segment drive element 210 constituting the segment drive unit 200. The segment drive element 210 includes a 4×20-bit shift register 220 for sequentially inputting image data D0 to D3 to produce 80-bit parallel data. The shift register 220 is operated in response to the shift clock SCLK. The segment drive element 210 also includes an 80-bit latch unit for latching 80-bit latch data when the image data D0 to D3 are sequentially supplied to the shift register 220 in the segment drive element 210 and 80-bit parallel data is set in all shift registers 220 in the 10 elements 210, i.e., when the latch signal $\overline{LATH}$ is supplied from the $\overline{LATH}$ generation unit 645 in the data output unit 600.

An input logic circuit 240 receives the signals $\overline{SCLR}$, $\overline{SEN}$, SM1, and SM2 from the data output unit 600, and performs predetermined logic processing. A control logic unit 250 generates segment drive waveform defining data corresponding to the bit data from the latch unit 230 in accordance with the operation data of the input logic circuit 240. A switch signal output unit 260 has a level shifter and a buffer, both of which perform level shifting of the data output from the control logic unit 250. A driver 270 receives the voltage signals V3, VC, and V4, is switched in response to an output from the switch signal output unit 260, and supplies the voltage V3, VC, or V4 to the segment lines S80 to S1.

Figure 22:
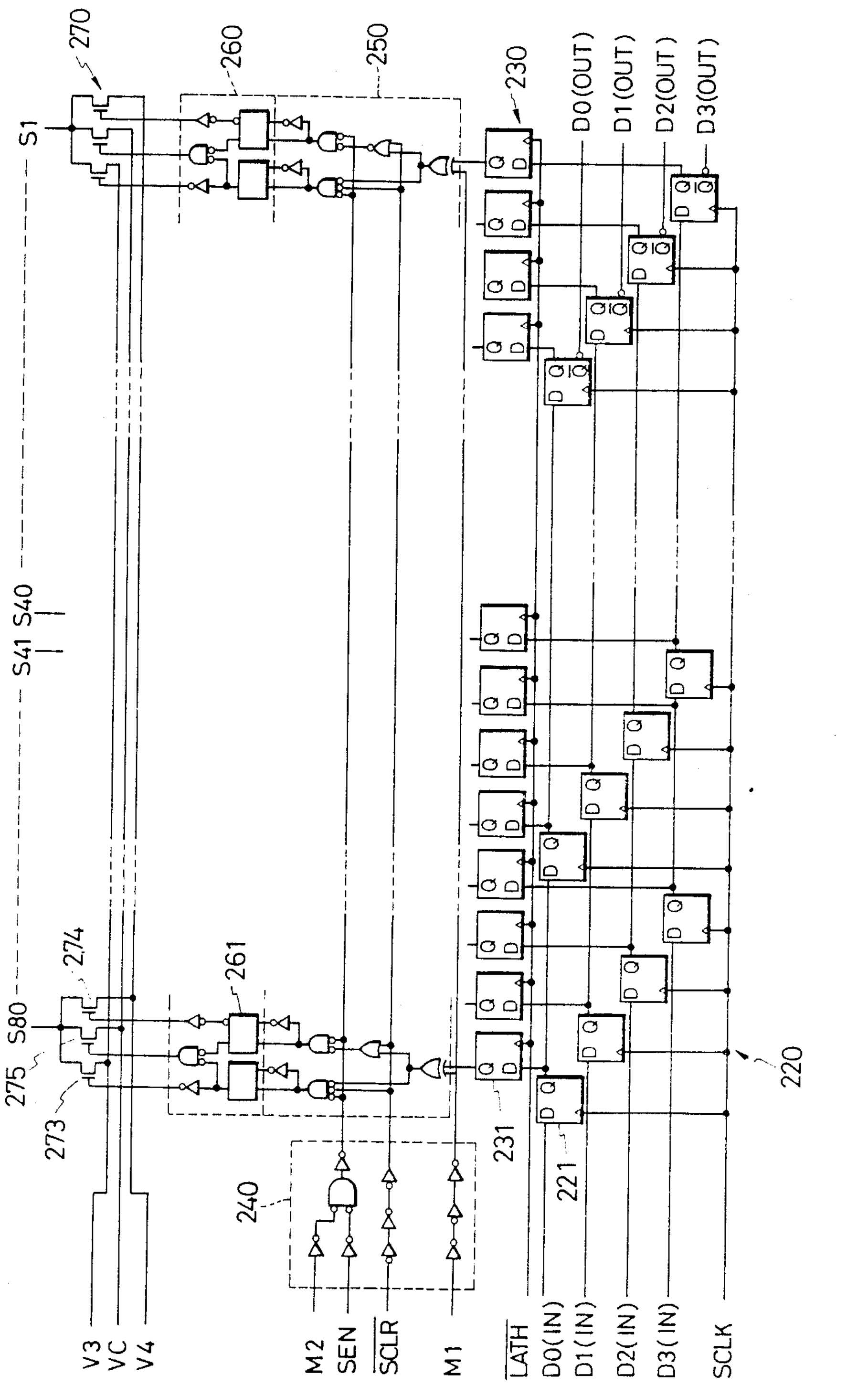
FIG. 22 is a circuit diagram showing a detailed arrangement of the segment drive element shown in FIG. 21.

FIG. 22 shows a detailed arrangement of the segment drive element 210 shown in FIG. 21. The shift register 220 includes a D flip-flop 221 corresponding to one bit, i.e., a one-segment line. The latch unit 230 includes a latch circuit 231. The switch signal output unit 260 includes a level shifter 261. The driver 270 includes switches 275, 273, and 274 for connecting/disconnecting the supply paths of the voltages VC, V3, and V4 in response to the switch signals from the switch signal output unit 260.

(4.8.2.) Common Drive Unit

Figure 23:
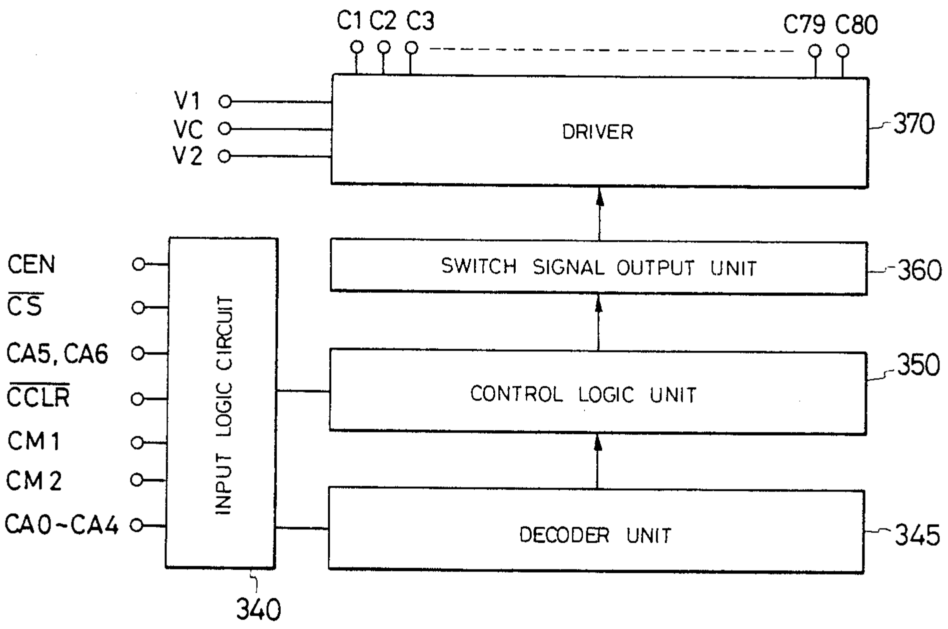
FIG. 23 is a block diagram showing a schematic arrangement of a common drive element in the embodiment shown in FIG. 1.
Figure 24:
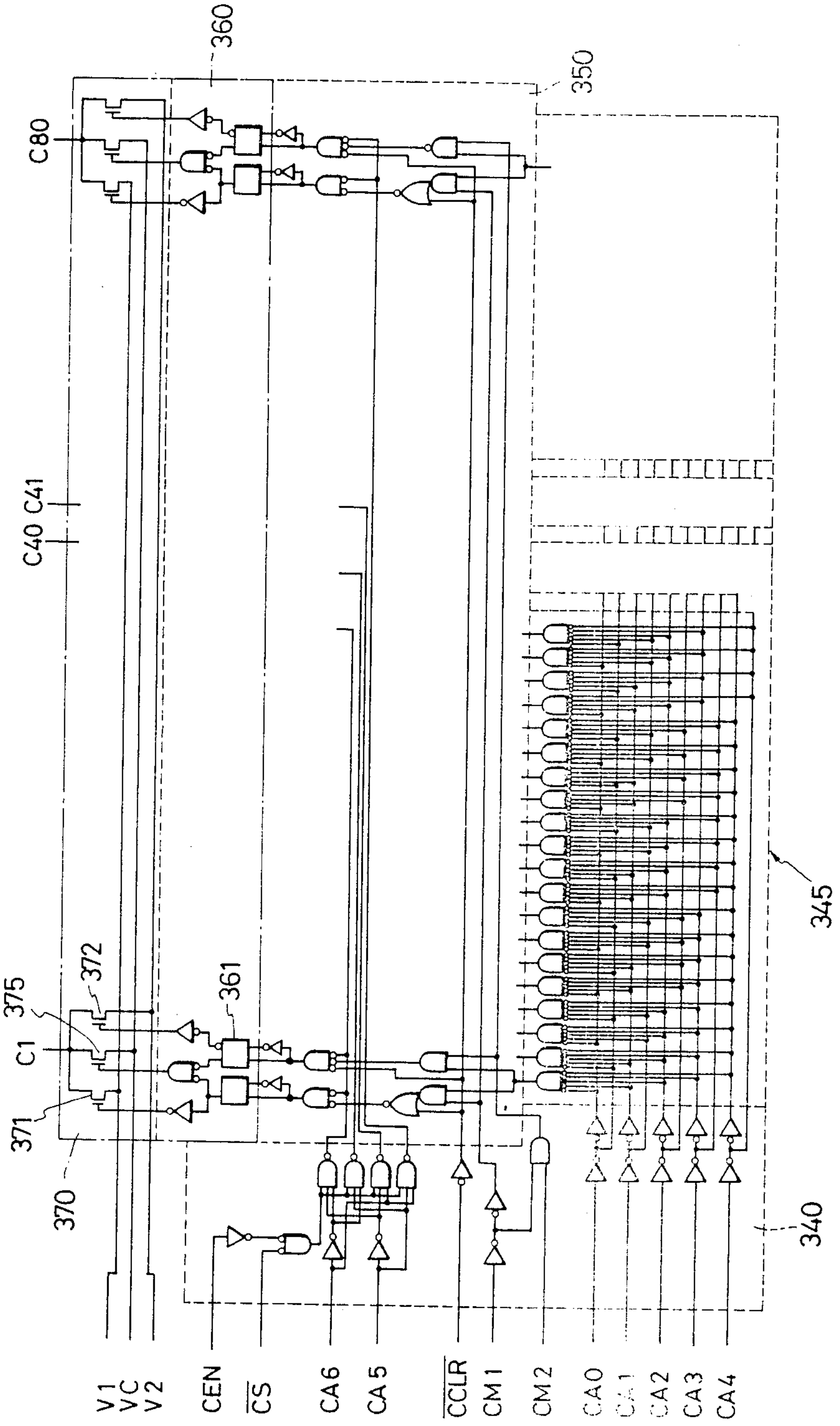
FIG. 24 is a circuit diagram showing a detailed arrangement of the common drive element shown in FIG. 23.

FIGS. 23 and 24 show a schematic arrangement and a detailed arrangement, respectively, of the common drive element 310 constituting the common drive unit 300. The common drive element 310 comprises an input logic circuit 340. The input logic circuit 340 selects the block in response to the signals CA5, CA6, and CEN when the chip select signal $\overline{CS}$ is supplied from the decoder 650 in the data output unit 600. The input logic circuit 340 receives the line select signals CA0 to CA4, and the signals CCLR, CM1, and CM2 and performs predetermined logic processing.

A decoder unit 345 selects a common line to be driven on the basis of the line data related to the signals CA0 to CA4 supplied from the input logic circuit 340. Each element 310 can select a maximum of 80 lines. In this embodiment, 20 lines constitute one block, and four blocks are assigned to one element 310. As shown in FIG. 24, a section which decodes 20-line data in the decoder unit 345 is surrounded by the dotted line.

A control logic unit 350 receives the drive data related to the signals CM1, CM2, and $\overline{CCLR}$ supplied from the input logic circuit 340 and generates drive waveform defining data for the block selected by the input logic circuit 340 or the line selected by the decoder unit 345.

A switch signal output unit 360 includes a level converter and a buffer and performs level conversion of the data generated by the control logic unit 250. A driver 370 receives the voltage signals V1, VC, and V2, is switched in response to the output from the switch signal output unit 360, and selectively supplies the voltage signal V1, VC, or V4 to the common lines C1 to C80.

This embodiment comprises five common elements 310. In other words, the effective display area 104 corresponds to 400 common lines.

The common drive element 310 shown in FIG. 24 also includes a level converter 361, and switches 375, 371, and 372 for connecting/disconnecting the supply paths of the voltages VC, V1, and V2 in response to the switch signals from the switch signal output unit 360.

(4.9) Drive Waveform (4.9.1) General Description of Display Unit

Figure 25:
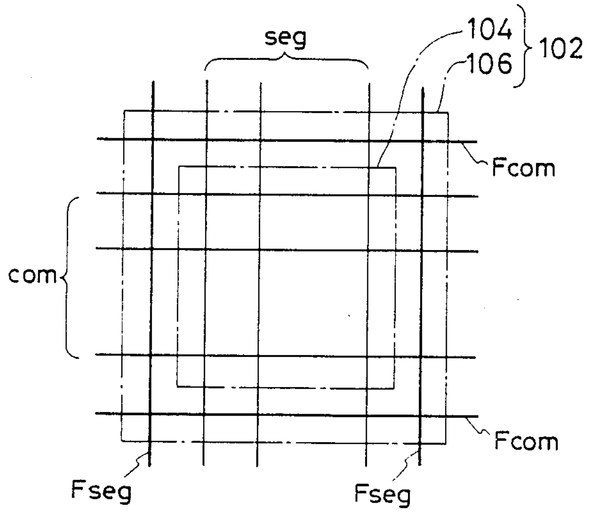
FIG. 25 is a schematic view for explaining a driving operation of a display unit.

FIG. 25 shows a schematic arrangement of the display unit 100. The common lines com correspond to the common transparent electrodes 114 formed on the upper substate 110, and the segment lines seg correspond to the segment transparent electrodes 124 formed on the lower substrate 120. An FLC is filled between the common and segment lines com and seg. Frame common lines Fcom are formed parallel to both sides of the common lines com, and frame segment lines Fseg are formed parallel to both sides of the segment lines seg. A set of intersections (FIG. 25) between the common and segment lines com and seg constitute the effective display area 104 on the display screen 102. A set of intersections between the frame common and segment lines Fcom and Fseg and the segment lines seg and a set of intersections between the frame segment lines Fseg and the common lines com constitute the frame unit 106 outside the effective display area 104.

Referring to FIG. 25, only four common lines com and four segment lines seg and only one frame common line Fcom and one frame segment line Fseg are illustrated for the sake of simplicity. However, in practice, 400 common lines com and 800 segment lines seg are arranged, and each line can be independently driven. 16 frame common lines Fcom and 16 frame segment lines Fseg are arranged at corresponding sides and are simultaneously driven, as described above.

(4.9.2) Drive Mode of Display Unit

In this embodiment, the display unit 100 is driven as follows.

As described in (3.5), in the effective display area 104, in the block access mode, a block is erased and the write operation is performed in units of lines. In the line access mode, the write operation is performed in units of lines. In this embodiment, the area 104 is driven with different waveforms in the block erase mode in the block access mode, the line write operation in the block access mode, and the line write operation in the line access mode.

A frame portion (to be referred to as a horizontal frame hereinafter) of the frame unit 106 along the frame common lines Fcom and a frame portion (to be referred to as a vertical frame hereinafter) along the frame segment lines Fseg are driven at different timings with different waveforms. More specifically, the horizontal frame is formed by the lines Fcom and lines Fseg and seg at the non-access time (e.g., the vertical retrace interval during refresh driving and the timer interrupt duration in the partial rewrite mode) of the effective display area. The vertical frame is formed by cooperation of the frame segment lines Fseg and the common lines com in accordance with the waveform matching with the drive waveform of the common lines com during the line write operation in any mode.

(4.9.3) Drive Waveform of Effective Display Area

In this embodiment, one horizontal scanning period (1H) is divided into three intervals ΔT. In each interval, the voltage V1, VC, or V2 is applied to the common lines com, while the voltage V3, VC, or V4 is applied to the segment lines seg.

Table 1 shows data set in the register areas CL1 to SC2 in the register unit 630 in the data output unit 600. Mark "x" in Table 1 represents an unused bit. In this embodiment, the predetermined data in Table 1 are stored in the 6th to 4th bits of the register areas CL1 to SB2 and the 2nd to 0th bits thereof in the initialization of the program to be described with reference to FIG. 33. During the process of the program execution, the register area DM in the drive mode stores: the data for causing the multiplexer 671 to discriminate the block erase operation in the block access mode, the line write operation in the block access mode, and the line write operation in the line access mode and select the registers CB1 to SB2, the registers CL1 to SL2, or the registers CC1 to SC2; and the data for designating switching of the multiplexers 665 and 669, selection of 3-bits, i.e., bit 6 to bit 4 or bit 2 to bit 0, and sequential output of one-bit data within the ΔT intervals.

TABLE 1

| | Register | bit | 7 | 6 | 5 | 4 | | 3 | 2 | 1 | 0 |
|---|---|---|---|---|---|---|---|---|---|---|---|
| Line Write Data in | C L 1 | $\overline{CCLR}$ | X | 1 | 1 | 1 | CEN | X | 1 | 1 | 1 |
| Block Access Mode | C L 2 | CM2 | X | 0 | 1 | 0 | CM1 | X | 1 | 0 | 0 |
| | S L 1 | SM2 | X | 1 | 1 | 0 | SEM | X | 1 | 1 | 1 |
| | S L 2 | SM1 | X | 1 | 0 | 0 | $\overline{CCLR}$ | X | 1 | 1 | 1 |
| Block Erase Data in | C B 1 | $\overline{CCLR}$ | X | 1 | 0 | 0 | CEN | X | 1 | 1 | 0 |
| Block Access Mode | C B 2 | CM2 | X | 0 | 0 | 0 | CM1 | X | 0 | 0 | 0 |
| | S B 1 | SM2 | X | 0 | 1 | 0 | SEN | X | 1 | 1 | 1 |
| | S B 2 | SM1 | X | 0 | 0 | 0 | $\overline{SCLR}$ | X | 1 | 0 | 1 |
| Line Write Data in | C C 1 | $\overline{CCLR}$ | X | 1 | 1 | 1 | CEN | X | 1 | 1 | 1 |
| Line Access Mode | C C 2 | CM2 | X | 1 | 1 | 1 | CM1 | X | 1 | 1 | 0 |
| | S C 1 | SM2 | X | 0 | 1 | 1 | SEN | X | 1 | 1 | 1 |
| | S C 2 | SM1 | X | 0 | 1 | 0 | $\overline{SCLR}$ | X | 1 | 1 | 1 |

TABLE 2

Truth Table of Common Drive Element 310

| CEN | $\overline{CCLR}$ | CM1 | CM2 | $\overline{CS}$ | V |
|---|---|---|---|---|---|
| 0 | X | X | X | X | VC |
| 1 | 0 | X | X | 0 | V1 |
| 1 | 1 | 0 | 0 | 0 | VC |
| 1 | 1 | 0 | 1 | 0 | V2 |
| 1 | 1 | 1 | 0 | 0 | V1 |
| 1 | 1 | 1 | 1 | 0 | V1 |

TABLE 3

Truth Table of Segment Drive Element 210

| SEN | $\overline{SCLR}$ | SM1 | SM2 | Q | V |
|---|---|---|---|---|---|
| 0 | X | X | X | X | VC |
| 1 | 1 | X | 0 | X | VC |
| 1 | 0 | X | 1 | X | V4 |
| 1 | 1 | 1 | 1 | 0 | V3 |
| 1 | 1 | 0 | 1 | 0 | V4 |
| 1 | 1 | 1 | 1 | 1 | V4 |

TABLE 3-continued

Truth Table of Segment Drive Element 210

| SEN | $\overline{SCLR}$ | SM1 | SM2 | Q | V |
|---|---|---|---|---|---|
| 1 | 1 | 0 | 1 | 1 | V3 |

Tables 2 and 3 are truth tables of the common and segment drive elements 310 and 210. Mark "x" in Tables 2 and 3 represents a case wherein the drive voltage V to be selected is not influenced regardless of the logic value, i.e., logic "0" or logic "1". Q in Table 3 is 1-bit data, i.e., image data output from the latch 231 (FIG. 22) in the latch unit 230. If Q=0, then white data is output. If Q=1, then black data is output.

Figure 26A:
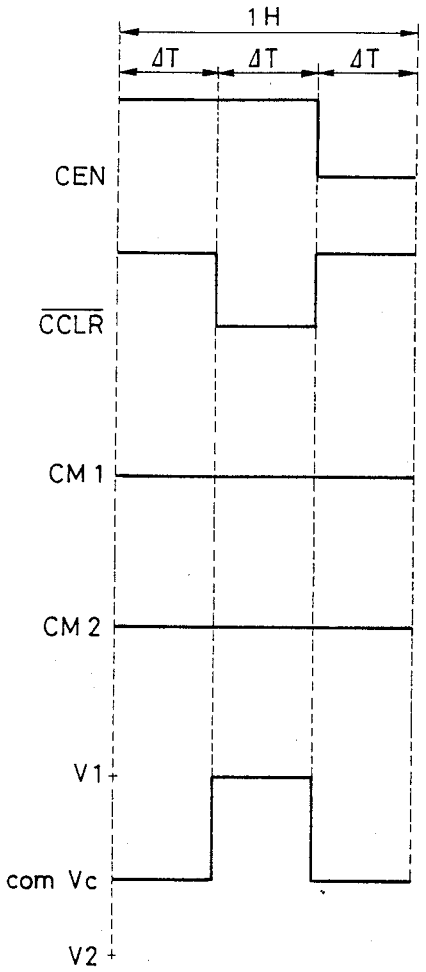
FIGS. 26A and 26B are timing charts of drive signals of the common and segment lines in a block erase mode.
Figure 26B:
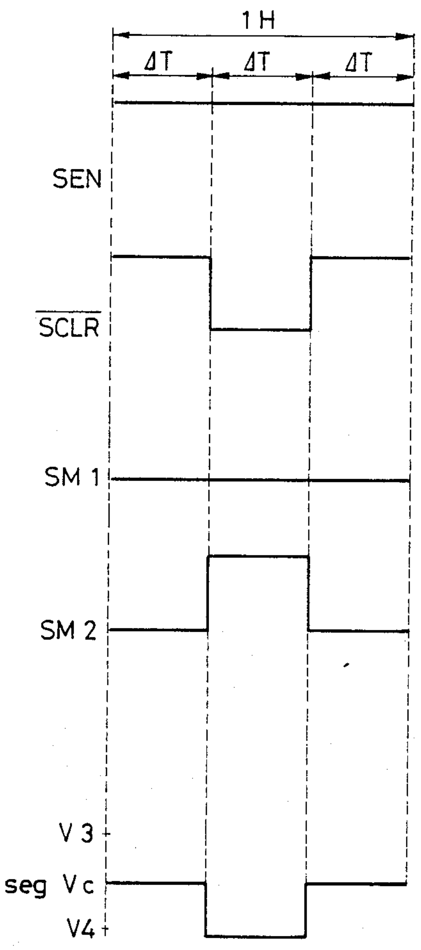

FIG. 26A shows waveforms of the signals CEN, $\overline{CCLR}$, CM1, and CM2 based on the contents (Table 1) of the registers CB1 and CB2 and the waveform of the voltage signal V applied to the common lines com by the logic (Table 2) of the common drive element 310. FIG. 26B shows waveforms of the signals SEN, $\overline{SCLR}$, SM1, and SM2 based on the contents (Table 1) of the registers SB1 and SB2 and the waveform of the voltage signal V applied to the segment lines seg of the logic (Table 3) of the segment drive element 210.

During the block erase operation in the block access mode, the element 310 selected in response to the chip select signal $\overline{CS}$ drives the block selected by the signals CA5 and CA6 so as to apply a difference between the voltages applied to the common and segment lines, i.e., a combined voltage waveform (FIG. 27) to intersections of the common and segment lines com and seg. The block information is cleared to white data by a value 3V0 of the voltage applied within the interval ΔT.

In this case, the interval ΔT, the 1H, and the voltages V1 to V4 and VC are corrected in accordance with the temperature, as previously described.

Figure 28A:
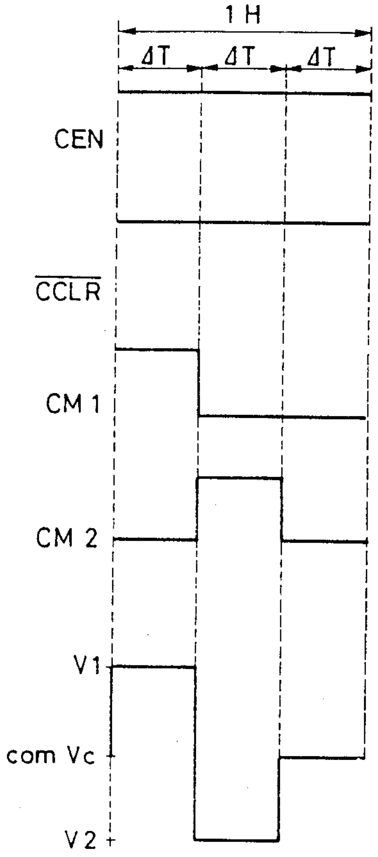
FIGS. 28A and 28B are timing charts of drive signals of the common and segment lines during line write in a block access mode.
Figure 28B:
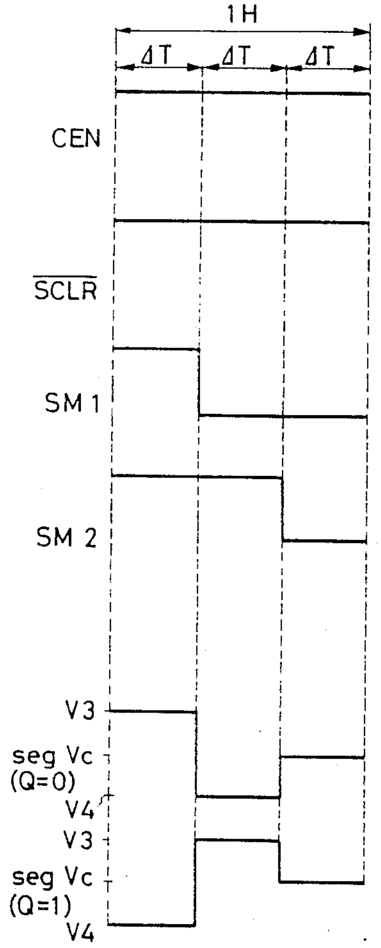

FIG. 28A shows the waveforms of the signal CEN and the like based on the contents of the registers CL1 and CL2 and the waveforms of the voltage signals V based on the logic of the common drive element 310. FIG. 28B shows the waveforms of the signal SEN and the like based on the contents of the registers SL1 and SL2 and the waveforms applied to the segment lines seg on the basis of the logic of the segment drive element 210 and the contents (Q) of the image data.

Figure 29A:
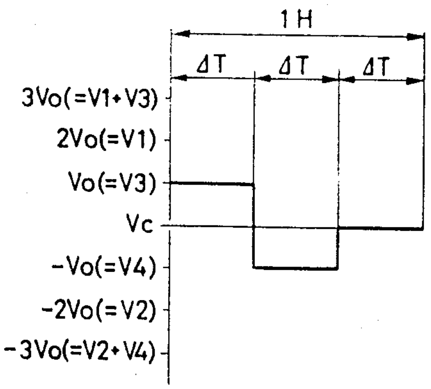
FIGS. 29A and 29B are charts showing waveforms obtained by combining the common and segment line drive waveforms shown in FIGS. 28A and 28B.
Figure 29B:
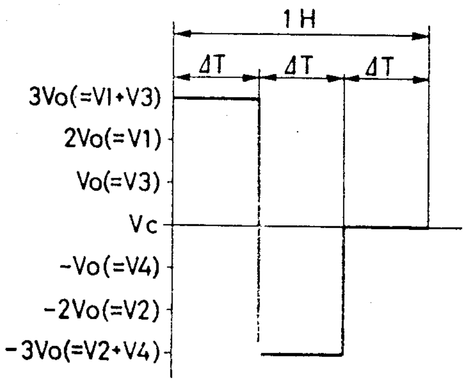

During the line write operation in the block access mode, in the block of the element 310 selected by the chip select signals $\overline{CS}$ and the signals CA5 and CA6, composite voltage waveforms shown in FIGS. 29A and 29B are applied to the intersections of the common and segment lines com and seg selected by the signals CA1 to CA4. Display data updating does not occur at a point applied with the waveform shown in FIG. 29A. That is, this point maintains the white data state obtained by the previous block erase operation. However, the point applied with the waveform shown in FIG. 29B is changed to the white data state by the voltage value 3V0 applied during the first interval ΔT and then to the black data state by the voltage value −3V0 applied during the next interval ΔT.

Figure 30A:
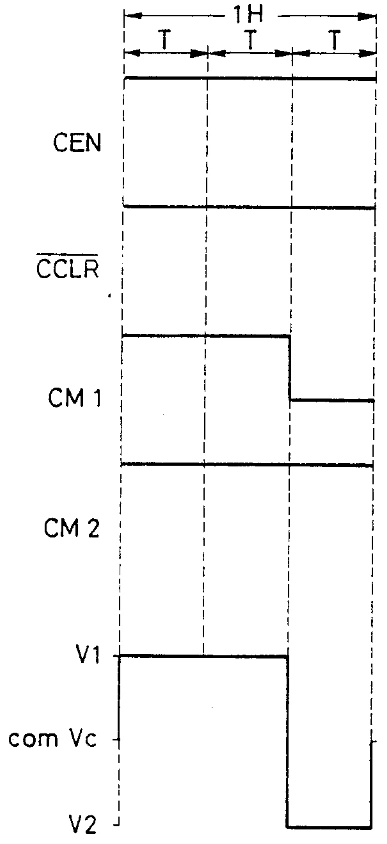
FIGS. 30A and 30B are views for explaining common and segment line drive waveforms during line write in the line access mode.
Figure 30B:
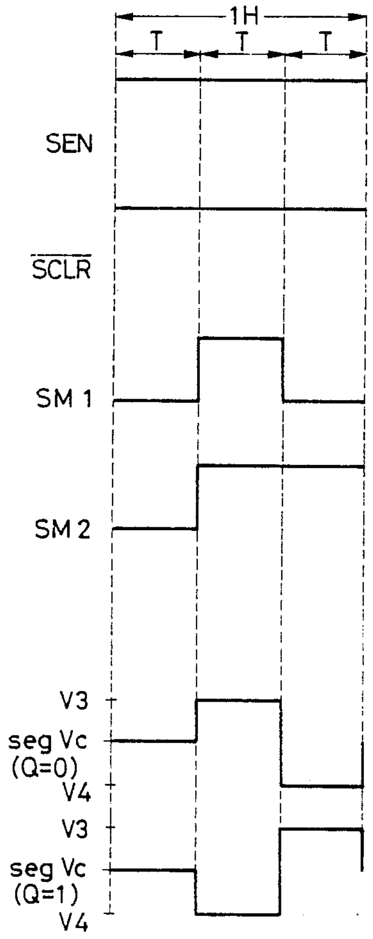

FIG. 30A shows the waveforms of the signal CEN and the like based on the contents of the registers CC1 and CC2 and the waveforms of the voltage signals V applied to the common lines com on the basis of the logic of the common drive element 310. FIG. 30B shows the waveforms of the signal SEN and the like based on the contents of the registers SC1 and SC2 and the waveforms applied to the segment lines seg on the basis of the logic of the segment drive element 210 and the contents (Q) of the image data.

Figure 31A:
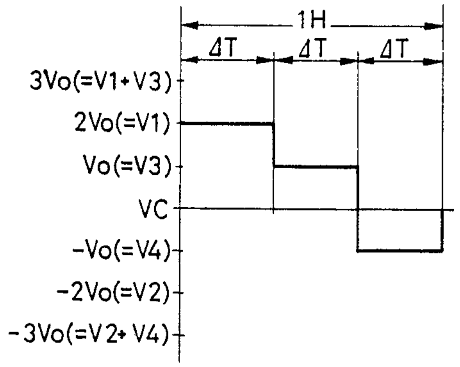
FIGS. 31A and 31B are charts showing waveforms obtained by combining the common and segment line drive waveforms shown in FIGS. 30A and 30B.
Figure 31B:
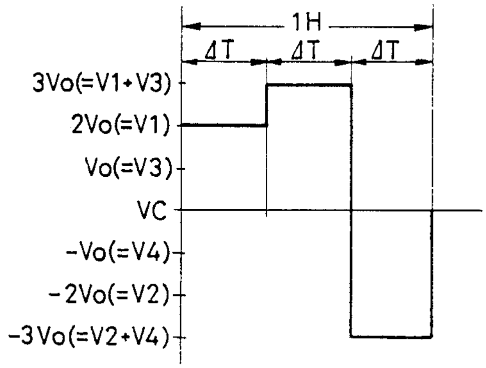

During line write operation in the line access mode, the intersections between the selected common and segment lines comand seg receive a composite voltage waveform shown in FIG. 31A or 31B. At the point applied with the voltage signal having the waveform shown in FIG. 31A, the voltages 2V0 and V0 are applied within the first and next intervals ΔT, so that the voltagellevel of this point exceeds the threshold value for obtaining the white data. However, the voltage level of this point does not exceed the threshold value because the voltage V4 is applied thereto within the last ΔT interval, thereby displaying white data. At the point applied with the waveform shown in FIG. 31B, white data is displayed within the first two intervals 2ΔT, and the voltage −3V0 applied thereto within the last interval ΔT inverts the display state. Therefore, black data is displayed.

(4.9.4) Mode of Frame Driving

In this embodiment as described above, the horizontal frame is formed during the vertical retrace interval or periodically and simultaneously at the start of driving of the A/D conversion unit 950. The vertical frame is formed during the line write operation in the effective display area 104. The frame has the same color as a background color of the effective display area 104. If information is displayed in black, the frame is displayed in white.

Table 4 shows data set in the registers FV1, FCVc, FV2, FV3, FSVc, and FV4 to perform switching of the frame drive unit 700 so as to form a frame. The frame common lines Fcom are substantially independent of driving of the effective display area 104. Therefore, the contents of the data $\overline{V1}$, $\overline{CVc}$, and $\overline{V2}$ are not changed. In this embodiment, the drive data for the frame common lines Fcom is set such that its waveform is the same as the drive waveform for the common lines com shown in FIG. 26A at the time of horizontal frame formation.

When different drive waveforms for the frame common lines Fcom and the common lines com are applied for horizontal frame formation, for vertical frame formation during the line write operation in the block access mode, and for the line write operation in the line access mode, the registers FV3, FV4, and FSVc are changed and set for the frame segment line Fseg so as to display white data.

More specifically, when the horizontal fame is formed, the same waveform as the drive waveform for the segment lines seg, as shown in FIG. 26B, is applied as the drive data for the frame segment lines Fseg. When the vertical frame is formed during the line write operation in the block access mode, the same waveform as the drive waveform (Q=0) for the segment lines seg, as shown in FIG. 28B, is applied as the drive data for the frame segment lines Fseg. When the vertical frame is formed during the line write operation in the line access mode, the same waveform as the drive waveform (Q=0) for the segment lines seg, as shown in FIG. 30B, is applied as the drive data for the frame segment lines Fseg.

Figure 27:
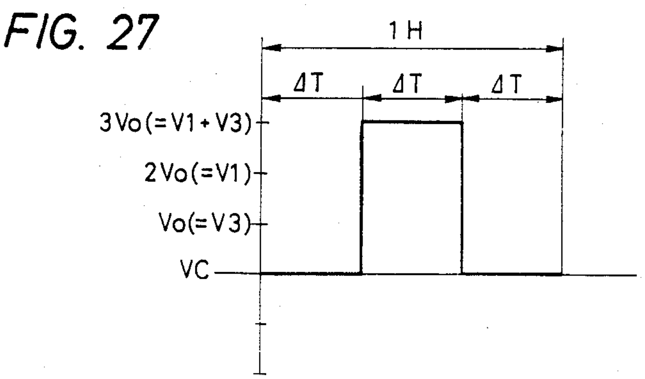
FIG. 27 is a chart showing a waveform obtained by combining the common and segment line drive waveforms shown in FIGS. 26A and 26B.

As a result, the waveform shown in FIG. 27 is used to form the horizontal frame. In the block or line access mode, the waveform shown in FIG. 29A or 31A is used to form the vertical frame.

TABLE 4

| | Register | bit | 7 | 6 | 5 | 4 | | 3 | 2 | 1 | 0 |
|---|---|---|---|---|---|---|---|---|---|---|---|
| Frame Common Line Data | FV1,FCVc | $\overline{CVc}$ | x | 1 | 0 | 1 | $\overline{V1}$ | x | 0 | 1 | 0 |
| Frame Segment Line Data during Line Write Operation | FV2 , FV3 | $\overline{V2}$ | x | 0 | 0 | 0 | $\overline{V3}$ | x | 1 | 0 | 0 |
| in Block Access Mode | FSVc,FV4 | $\overline{SVc}$ | x | 0 | 0 | 1 | $\overline{V4}$ | x | 0 | 1 | 0 |
| Frame Segment Line Data for Horizontal Frame Formation | FV2,FV3 | $\overline{V2}$ | x | 0 | 0 | 0 | $\overline{V3}$ | x | 0 | 0 | 0 |
| | FSVc,FV4 | $\overline{SVc}$ | x | 1 | 0 | 1 | $\overline{V4}$ | x | 0 | 1 | 0 |
| Frame Segment Line Data during Line Write Operation | FV2,FV3 | $\overline{V2}$ | x | 0 | 0 | 0 | $\overline{V3}$ | x | 0 | 1 | 0 |
| in Line Access Mode | FSVc,FV4 | $\overline{SVc}$ | x | 1 | 0 | 0 | $\overline{SVc}$ | x | 0 | 0 | 1 |

(5) Display Control

(5.1) General Description of Control Sequence

Display control according to this embodiment has two major features. First, when the signal Busy is supplied from the display control unit 50 to the wordprocessor 1, data exchange can be synchronized with the operation of the display screen 102. This is based on the assumption that one horizontal scanning period is changed by the temperature so as to obtain effectiveness of an operation in the display element using the FLC.

Second, although the conventional processor sequentially, periodically, and continuously (so-called refresh mode) transfers only the image data, the wordprocessor 1 according to this embodiment transfers address data capable of designating a pixel to be driven by image data prior to transfer of this image data. This image data is not transferred in the refresh mode but only a specific image data portion accessed by the address data is transferred and driven. This operation is based on the assumption that the display element using the FLC has a memory function and only the pixels required for information updating need be accessed.

In order to achieve the above display control, the wordprocessor 1 according to this embodiment includes a function for interrupting transfer of the address data upon reception of the signal Busy and a function for transferring the address data with, e.g., the horizontal sync signal, in addition to the functions of the conventional wordprocessor.

By effectively utilizing the second feature in display control, the following two display control modes can be obtained.

Two display control modes are block and line access modes. Operations in the block access mode are performed as follows. For example, 20 scanning electrode lines constitute one block, and a one-block information in the effective display area 104 is erased at once. This block is set in the "all white" state. Information of the block is sequentially accessed in units of scanning lines, and characters and the like are written on the screen. To the contrary, in the line access mode, access is performed in units of scanning lines to write information. All the pixels in the block need not be set to be "all white" state.

Figure 32:
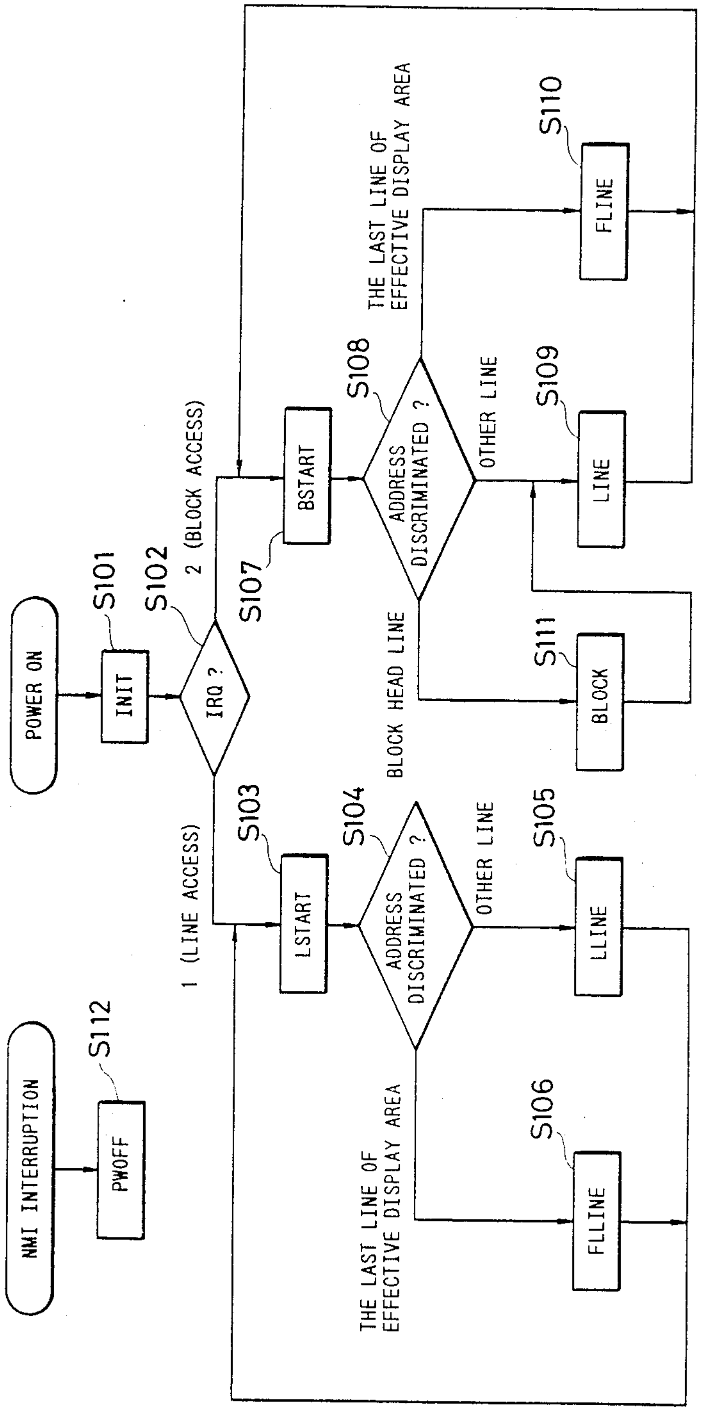
FIG. 32 is a flow chart showing a display control sequence in the embodiment shown in FIG. 1.

These display control modes are shown in a program flow of FIG. 32. The general operation of display control in this embodiment will be described with reference to FIG. 32.

Referring to FIG. 32, when a power switch in the wordprocessor 1 is turned on, the INIT routine is automatically executed (step S101). The signal Busy is set to be "ON". In the power-on state, the frame unit 106 is driven, the effective display area 104 is erased, and temperature compensation therefor is performed. Finally, the signal Busy is set to be "OFF", and the system waits for an interrupt request $\overline{IRQ1}$ or $\overline{IRQ2}$. The interrupt request $\overline{IRQ1}$ or $\overline{IRQ2}$ is generated when address data is transferred from the wordprocessor 1. When the address data is not sent, the program is not executed, and the contents of the display screen 102 are not changed.

When the address data is transferred and the interrupt is generated, the flow is branched in accordance with the type of internal interrupt request. In the decision step S102, if the internal interrupt request is the interrupt request $\overline{IRQ1}$, the flow advances to a LASTART routine. However, if the internal interrupt request is the request $\overline{IRQ2}$, the flow advances to a BSTART routine. The above decision step determines the block or line access mode. More specifically, if the flow advances to the START routine, the line access mode is set. Otherwise, the block access mode is set.

In this embodiment, the interrupt request $\overline{IRQ1}$ or $\overline{IRQ2}$ is manually set by a switching means 520 arranged at a proper position of the display control unit 50.

If the line access mode is set by such a switching means 520 and the interrupt request $\overline{IRQ1}$ is generated, the LSTART routine is started and such a program is executed. In this case, the address data transferred from the data output unit 600 is read to determine whether this address data represents the last line 0f the effective display area 104 (steps S103 and S104). If the line is determined not to be the last line, the program is branched into the LLINE routine. In this routine, the signal Busy is set to be "ON", and one-scanning line write is performed on the basis of the image data transferred next to the address data. The signal Busy is then set to be "OFF", and the system waits for the interrupt request $\overline{IRQ1}$ (step S105). When the interrupt request $\overline{IRQ1}$ is supplied, the LSTART routine is started again.

If the address data is determined in step S104 to represent the last line, the program is branched into the FLLINE routine. In this routine, the line write operation of the last line is performed on the basis of the transferred image data. Frame driving and updating of the temperature compensation data are performed. The signal Busy is set to be "OFF", and the system waits for the interrupt request $\overline{IRQ1}$ (step S106). When the interrupt request $\overline{IRQ1}$ is generated, the LSTART routine is started again. As described above, display control in the line access mode is performed.

When the block access mode is set by the above switching means 520 and the interrupt request $\overline{IRQ2}$ is generated, the BSTART routine is started. In this case, the signal BUSY is set to be "ON", and the transferred address data is read to discriminate whether the data represents the head line of the block, the last line of the effective display area 104, or a line excluding the above lines (steps S107 and S108). If the address data is discriminated not to represent the head or last line, the flow is branched into the LINE routine. In this routine, one-line write operation is performed on the basis of the transferred image data. The signal Busy is set to be "OFF", and the system waits for the next interrupt (step S109). If the interrupt is discriminated to be the internal interrupt request $\overline{IRQ2}$, the BSTART routine is started again.

If the address data is discriminated in step S108 to be the last line of the effective display area 104, the flow or program is branched into the FLINE routine. In this routine, one-line write operation is performed, the frame is driven, and the temperature compensation data is updated. The signal Busy is set to b "OFF", and the system waits for the interrupt request (step S110). When the interrupt request $\overline{IRQ2}$ is generated, the BSTART routine is started again.

If the address data is discriminated in step S108 to represent the head line of the block, the flow is branched into the BLOCK routine. In this routine, all blocks related to the lines designated by the address data are erased, and the areas of these blocks are set to be "white" (step S111). The flow advances to the LINE routine (step S109), and the same operations as described above are performed. Display control in the block access mode is performed in accordance with the steps described above, and information write operations are performed.

When the wordprocessor 1 sends a power down signal $\overline{PDOWN}$ to the controller 500, this signal enables a nonmaskable interrupt request NM1, and the signal PWOFF is enabled. In this case, the signal Busy is set to be "ON", and the effective display area 104 is erased to set the entire area to be "white". The power status signal and the signal Busy are set to be "OFF", thereby deenergizing the wordprocessor 1 (step S112).

As is apparent from the above description, even if either the block or line access mode is set, refresh driving is performed in accordance with the address data which are sequentially, cyclically, and continuously transferred throughout the entire effective display area. However, if address data of predetermined portions are intermittently transferred, partial rewrite driving is performed.

In the control sequence described in detail below, assume that address data and image data are transferred from the wordprocessor 1 in à refresh mode.

(5.2) Details of Control Sequence

(5.2.1) Power On (Initialization)

When the power switch of the wordprocessor 1 is turned on, automatically started operations will be described with reference to FIGS. 33 and 34.

Figure 33:
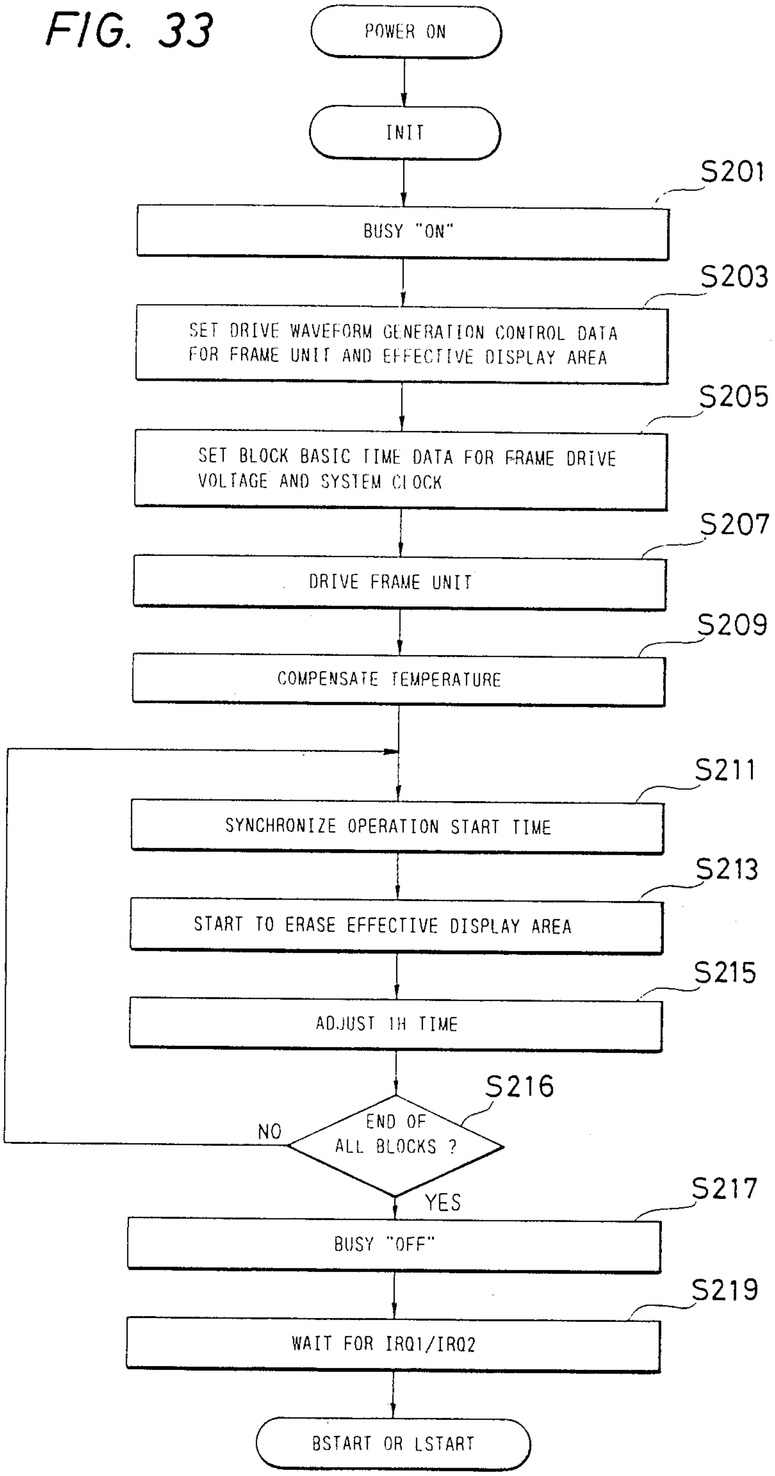
FIG. 33 is a flow chart showing an initialization processing sequence in the display control sequence of this embodiment.
Figure 34:
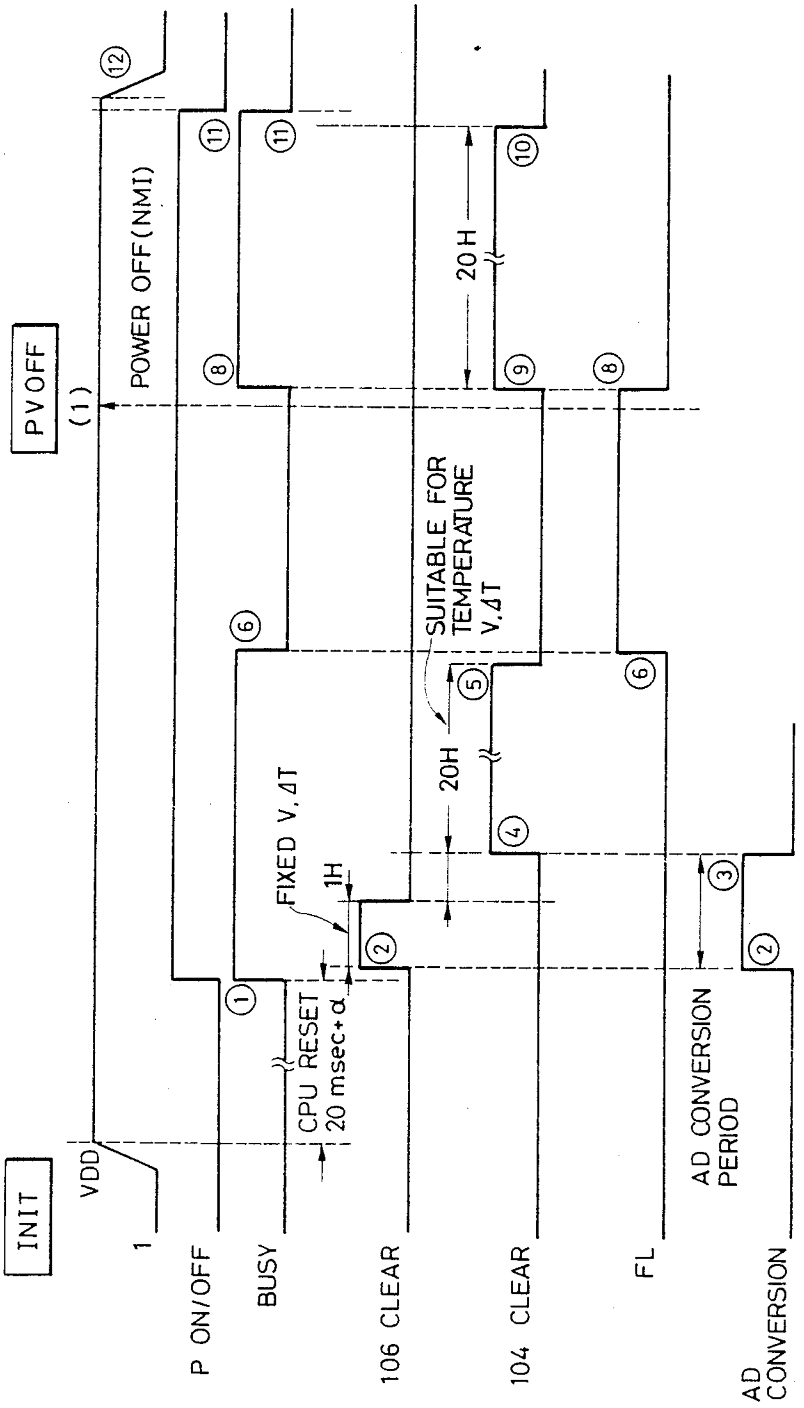
FIG. 34 is a timing chart for explaining an operation of this embodiment during initialization processing and power-off processing.

FIG. 33 is a flow chart of the started processing, i.e., the INIT routine described with reference to FIG. 32. FIG. 34 is a timing chart of the INIT routine and a PWOFF routine (to be described later). The operations performed by the controllers 500 will be described step by step.

S201:

The power status (P ON/OFF) signal is set to be "ON", and the signal Light is set to be "OFF". At the same time, the signal Busy is set to be "ON" through the data output unit 600 and is output to the wordprocessor 1. While the signal Busy is output, no address data is transferred from the wordprocessor 1 because one horizontal scanning period is changed by a change in temperature so as to effectively drive the FLC display element. Since the FLC display element drive time in the effective display area 104 cannot be perfectly synchronized with the data transfer time of the wordprocessor 1, in other words, VRAM operating time in the wordprosessor 1, the signal Busy is output from the display control unit 50 to synchronize the FLC display element drive time with the data transfer time (time in FIG. 34; only a numeral will be described below).

S203:

Drive waveform generation control data for initial frame driving and effective display area driving are set in the register unit 630 in the data output unit 600. More specifically, the waveform generation control data stored in the ROM 503 in the controller 500 are set in the register unit 630 in the data output unit 600, as shown in Tables 1 and 4.

S205:

Initial frame drive data of drive voltage values and system clocks serving as the reference clocks of one horizontal scanning period are set in the D/A conversion unit 900 and the register TCONR in the timer TMR2 in the controller 500. The reference time data in block access, the line access, and block access in the power-on/-off operation are set.

S207:

The controller 500 transfers the frame drive control data from the data output unit 600 to the frame drive unit 700, and the frame drive unit 700 performs frame driving on the basis of these input data. Such frame driving improves the image quality of the frame unit 106, and the display screen 102 is always kept in the top condition due to the following reason. A change in transmittance is prevented upon an application of a voltage to the frame unit 106 while the effective display area 104 is being driven. Therefore, misting of part of the frame unit 106 and hence degradation of image quality of the frame unit 106 are prevented.

In this embodiment, the frame unit 106 is set in the "white (orientation state for transmitting light from the light source FL) state", the effective display area 104 is set in the "white (a state for transmitting light) state", and character information and the like are displayed in "black". The "black" and "white" states in the display mode are not limited to the one described above. The "black" and "white" states may be inverted, or the frame unit 106 is distinguished from the effective display area 104 according to the display device of the present invention.

Frame driving in step S207 is performed throughout one horizontal scanning period. During this period, voltage signals are supplied to the frame transparent and segment electrodes 150 and 124 formed on the lower glass substrate 120 and the frame transparent electrodes 151 parallel to the common electrodes 114 and formed on the upper glass substate 110. Therefore, the entire frame is not always driven, but the remaining frame unit (i.e., the vertical frame) is driven by also using the common electrodes when the effective display area 104 is erased in step S213 (to be described later).

In this step, the above-mentioned frame driving is performed together with A/D conversion. A/D conversion is performed such that ambient temperature information of the display screen 102 which is detected by the temperature sensor 400, that is, FLC temperature information, is read by the A/D conversion unit 950, and the read information is converted into digital data (times and ).

S209:

Temperature compensation is performed. The A/D-converted data is read, and the look-up table (FIG. 12) stored in the ROM 503 in the controller 500 is referred, thereby obtaining temperature-compensated drive voltages V, system clocks, and delay data.

Figure 35:
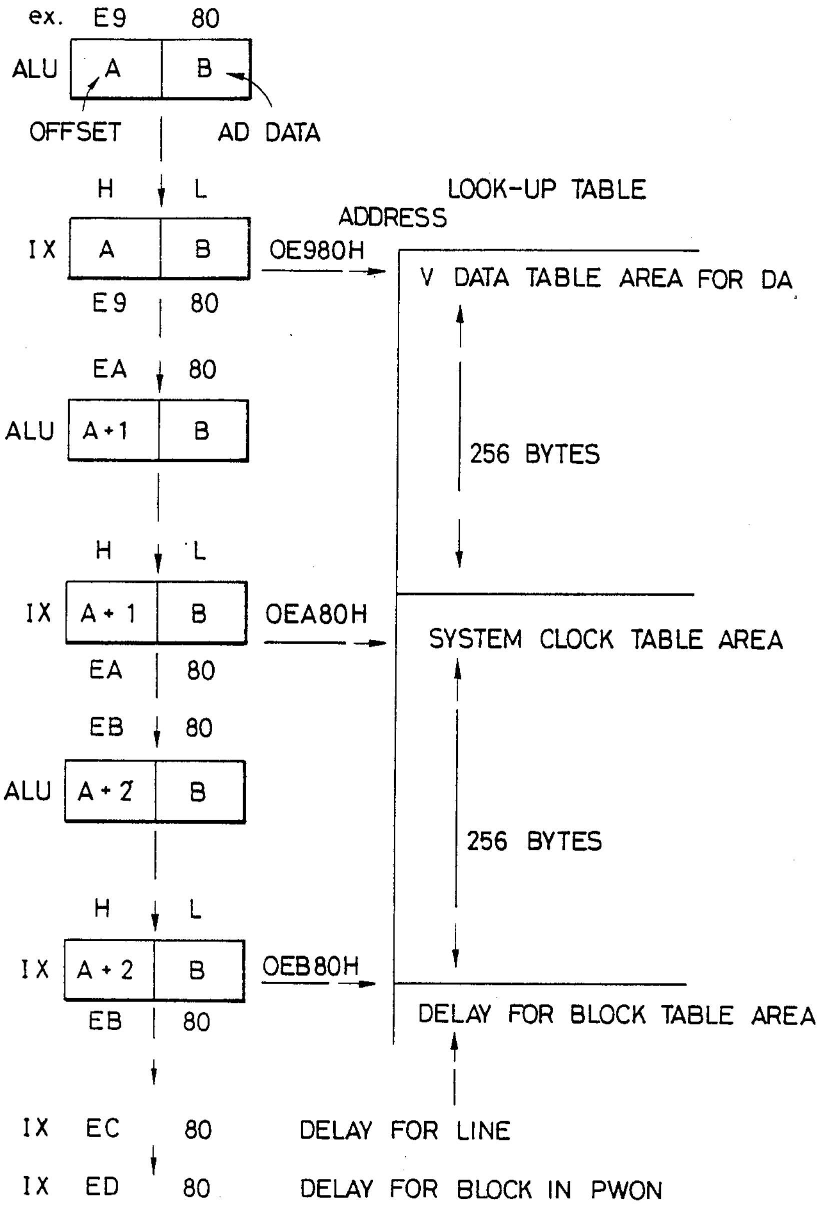
FIG. 35 is a view for explaining an algorithm for converting the temperature data into drive voltage data and time data in this embodiment.

The above operations will be described in detail with reference to FIG. 35. FIG. 35 shows an algorithm and a look-up table when the A/D-converted data is converted into the drive voltage V, the system clock as a reference for one horizontal scanning period, and each delay time. Assume that temperature data 80H shown in FIG. 35 is obtained. A hexadecimal code "80"H represents lower bits of the address data in the table. In the above A/D conversion operation, the analog temperature data is converted to digital temperature data corresponding to the lower bits of the address data.

An arithmetic and logic unit ALU in the controller 500 sets in 0080H data E900H corresponding to the upper bits of the address data of the drive voltage data table area (D/A conversion unit related data area). The content of the index register IX can be set to be E980H, and the data corresponding to this address is obtained. The temperature-compensated drive voltage value is output to the power controller 800 through the D/A conversion unit 900. The arithmetic and logic unit ALU then does not update the lower bit data of the index register IX and increments the upper bit data by one, so that the content of the register IX becomes EA80H. This content corresponds to the address in the system clock table, thereby obtaining the temperature-compensated data. The system clock data serving as a reference for one horizontal scanning period is set in the time constant register TCONR in the timer TMR2.

The respective time data in block access, line access, and block access in the power-on/-off operation are set in the registers CNTB, CNTL, and CNTBB for the timer TMR1.

S2ll:

The start time of driving of the effective display area 104 is synchronized. More specifically, in order to establish perfect synchronization between the start of program access and the start of actual driving of the effective display area, an internal interrupt request IRQ3 is generated in the CPU in the controller 500 at, e.g., a leading edge of the clock output pulse Tout having the timer TMR2 in the controller 500, thereby starting actual driving of the effective display area (time ).

S213:

The effective display area 104 is erased. In other words, the entire area is set to be "white". This operation together with previous frame driving allows a good state of the display screen 102 in the power-on operation.

The erase operation of the effective display area 104 is performed by driving the area 104 in units of blocks each consisting of, e.g., 20 scanning lines. Therefore, one block is erased in one horizontal scanning period.

This driving is not performed by receiving image data "white" for the entire effective display area 104, but by automatically setting a predetermined block erase waveform on the program. Therefore, the effective display area can be erased upon the power-on/-off operation.

S215:

One horizontal scanning period is controlled. More specifically, delay data in the register CNTBB is set in the counter, and the timer TMR1 counts its own clock pulses on the basis of this data. The operation of the effective display area 104 during one horizontal scanning period can be synchronized with the actual program execution time. When a predetermined time interval has elapsed, the CPU generates the internal interrupt request IRQ3.

The timer TMR1 sets the predetermined time interval on the basis of the reference time data set in step S205 and the delay time data obtained by temperature compensation in step S209. When the predetermined time interval is measured from a proper moment, the internal interrupt request is generated.

S216:

The operations in steps S211, S213, and S215 are performed in units of blocks, i.e., every horizontal scanning. In step S216, the controller 500 discriminates whether an end of all blocks in the effective display area 104 is detected. If NO in step S216, the flow returns to step S211. The above operations are repeated until the end of all the blocks is detected (time ).

S217:

When the end of all the blocks (effective display area) is detected in step S216, the signal Busy is set to be "OFF", and the signal D from the wordprocessor 1 can be transferred. At the same time, the signal Light is set to be "ON". In this case, the operator at the wordprocessor 1 turns on the power switch. When the display screen 102 is displayed, the operator knows that the wordprocessor 1 has been powered. In the operations in steps S201 to S215, driving of the frame unit 106 of the display screen 102 and of the effective display area 104 has been performed as initial display control (time ).

S219:

The controller 500 waits for the interrupt request $\overline{IRQ1}$ or $\overline{IRQ2}$. The interrupt request $\overline{IRQ1}$ or $\overline{IRQ2}$ is generated when the address data is transferred from the wordprocessor 1. Various programs to be described later are executed in response to the interrupt request. The standby program is executed to maintain the common and segment lines at the same potential or the ground potential until the address data is transferred. In this case, contents of the display screen 102 are not updated. Instead, the display unit 100 may be powered off. For example, the voltage signal may be disabled by interrupting power supply to, e.g., the power controller 800.

As described above, generation of either the request $\overline{IRQ1}$ or $\overline{IRQ2}$ is preset. This presetting can be arbitrarily determined by the operator in accordance with an application of the wordprocessor, data processed by the wordprocessor, and the like.

(5.2.2) Block Access

Block access display control started in response to the interrupt request $\overline{IRQ2}$ after the predetermined initial control (INIT routine) will be described with reference to FIGS. 36A to 36D and FIGS. 39A and 39B.

FIGS. 36A to 36D are flow charts of programs related to display control and stored in the ROM 503 in the controller 500 in the form shown in FIG. 12. These programs are initialized in steps of block access display control.

Figure 39A:
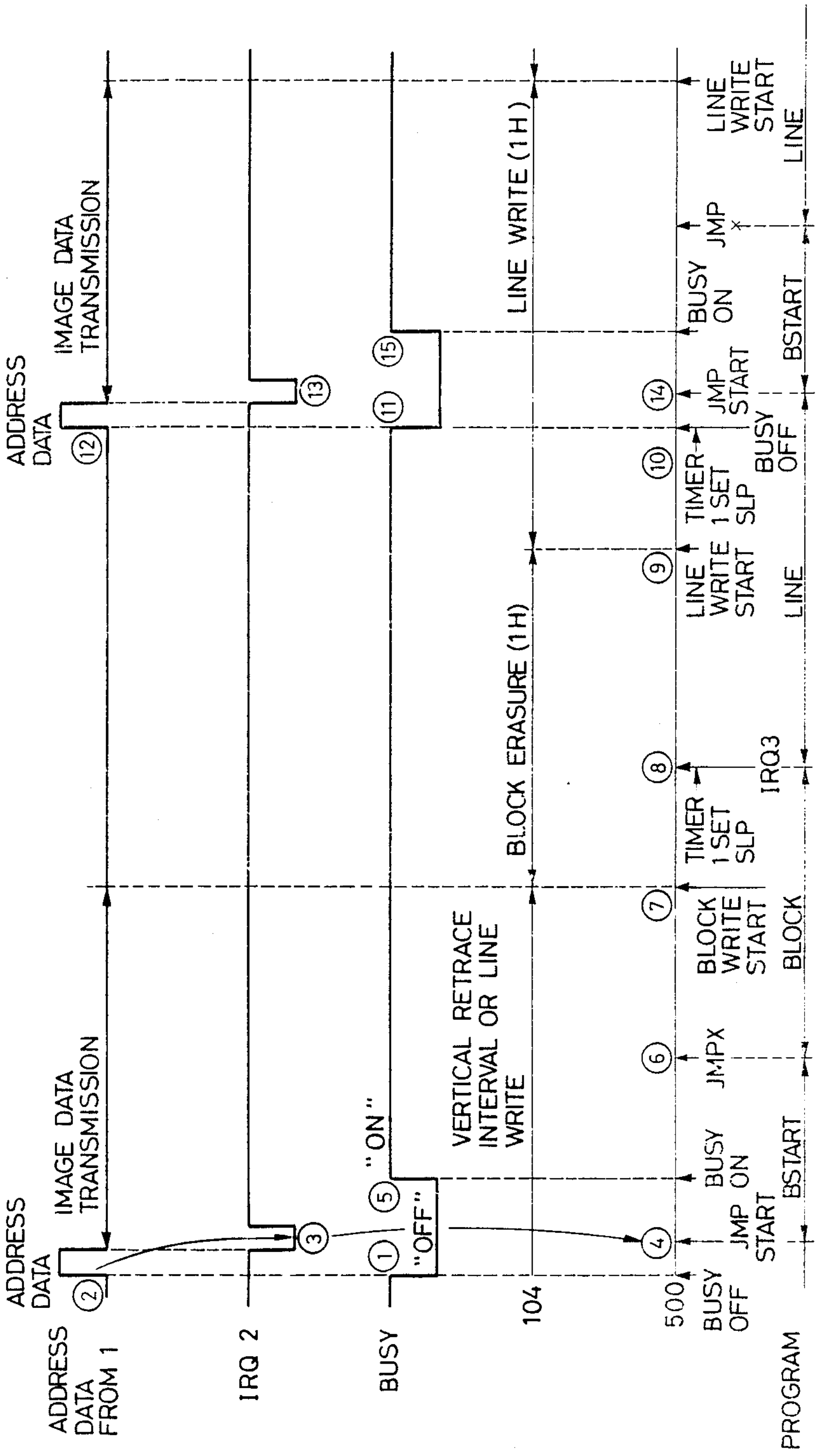
FIGS. 39A and 39B and FIGS. 40A and 40B are timing charts for explaining the operation of this embodiment according to the display control sequences shown in FIGS. 36A to 36D and FIGS. 37A to 37C, respectively.
Figure 39B:
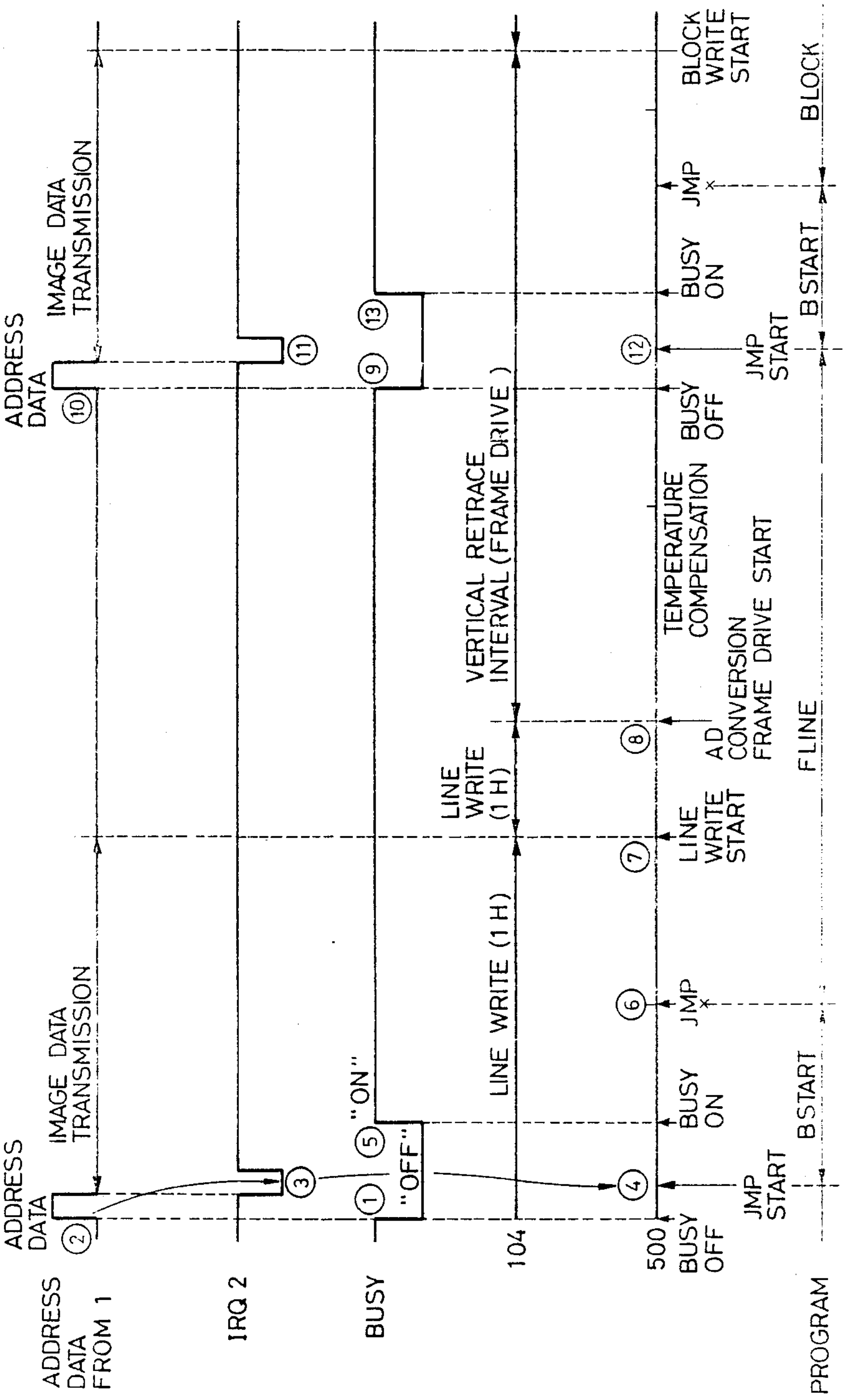

FIGS. 39A and 39B are timing charts of such display control.

Figure 36A:
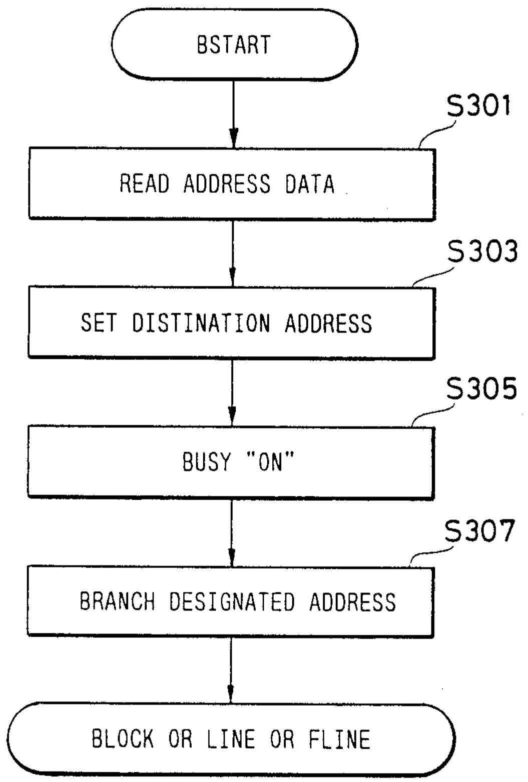
FIGS. 36A to 36D and FIGS. 37A to 37C are flow charts showing detailed display control sequences in the block and line access modes of this embodiment, respectively.

When address data is transferred to the control unit 500 which is set in the standby state upon "OFF" operation (time 1 in FIGS. 39A and 39B; only the numeral will be described below) of the signal Busy, i.e., when time 2 reaches, the interrupt request $\overline{IRQ2}$ is input (time 3 ), and the BSTART routine shown in FIG. 36A is started (time 4 ). Display control in the BSTART routine will be described with reference to FIG. 36A.

S301:

Address data is read. Address data RA/D transferred to the data output unit 600 is read in the controller 500.

S303:

Address translation described in (4.3.2) is performed on the basis of the read address data. The jumping table shown in FIG. 12 is referred, and address data (destination address) for a program to be executed is set.

S305:

The signal Busy is set to be "ON" (time 5 ), and the next address data transfer is inhibited.

S307:

The flow is branched into the program at the designated address set in step S303 (time 6 ). If the address data RA/D is discriminated to represent the head line of the address, the BLOCK routine is executed However, if the data RA/D is discriminated to represent the last line of the effective display area, the flow is branched into the FLINE routine. Otherwise, the flow is branched into the LINE routine.

Figure 36B:
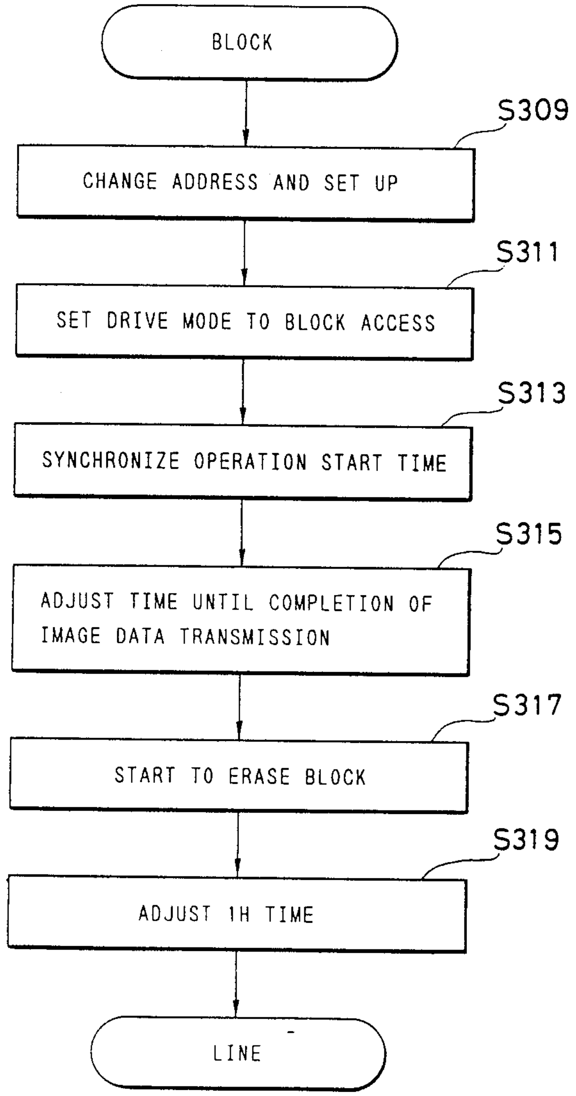

When the BLOCK routine shown in FIG. 36B is started, the following operations are performed.

S309:

The address is changed and set up. More specifically, the address is changed to select a line to be driven (described in (4.3.3)) on the basis of the the address data RA/D transmitted to the registers RA/DL and DA/DU in the register unit 630 in the data output section 600. The changed address is used to retrieve data in the line table shown in FIG. 12, and the corresponding address data is obtained. The address data is then set in the registers DLL and DLU in the register unit 630 in the data output unit 600.

S311:

The drive mode is set to be the block access mode. In other words, data representing the block erase operation ih the block access mode is set in the register DM in the register unit 630 in the data output unit 600.

S313:

The operation start time is synchronized. More specifically, in order to perfectly synchronize the operation on the effective display area 104 and the execution of the program, as described above, the internal interrupt request IRQ3 is generated at, e.g., a leading edge of the clock output pulse Tout of the timer TMR2 in the control unit 500. The output pulse Pout is synchronized with the execution timing of the program. Therefore, since the output pulse Tout serves as a reference pulse for one horizontal scanning period and the operation timing in the effective display area 104, the execution of the program is synchronized with the operation of the effective display area 104.

S315:

Time is adjusted until the completion of image data transmission. More specifically, as shown in the timing chart in FIG. 39A, image data transmission is performed immediately after address data transfer. When this transfer is completed (time 7 ), the controller 500 starts to access the effective display area 104.

The image data transmission time is defined as a time interval as a sum of a transfer time of 40 μsec required for transferring 800-bit one-scanning image data in units of 4-bit parallel data at a speed of 5 MHz, and a time required for storing the image data in the segment drive unit 200.

The routine BLOCK aims at erasing the block. The image data is transmitted although the block erase operation does not require image data because data transfer or transmission of the next line access is performed. Alternatively, instead of performing image data transmission, the program may be interrupted for a period of time equal to the image data transmission time.

S317:

The controller 500 starts to erase a block (time 7 ). One block, e.g., 20 scanning lines, is accessed within one horizontal scanning period (1H) so as to set all pixels in the block to be "white". This operation is not performed upon reception of all "white" image data but performed by setting a predetermined block erase waveform.

As is apparent from FIG. 39A, at the start time of the block erase operation (time 7 ), the write operation of the last line of th previous block is completed, or the vertical retrace interval is ended in the effective display area 104.

S319:

One horizontal scanning period (1H) is adjusted on the program. As previously described, the access time in the effective display area 104 is changed in accordance with a change in temperature of the FLC display element. The program execution time is adjusted in accordance with the length of one horizontal scanning period in the effective display area 104.

More specifically, the timer TMR1 in the control unit 500 starts its operation from time (i.e., time 4 ), e.g., when the address data is transferred and the program is started in response its own clock pulse. When a predetermined period of time has elapsed, the internal interrupt request IRQ3 is generated in the CPU 501 in the controller 500, and the flow is branched into the next program routine.

The predetermined period of time is determined as follows. As described in step S209 in (5.2.1), a time interval as a sum of the program execution time and the delay time is stored as a count data in the table area CNTB in FIG. 12 as a result of temperature compensation. The timer TMRl compares the count of its own clock pulses with the content of the CNTB. When a predetermined count reaches, the internal interrupt request IRQ3 is generated.

When the predetermined period of time has elapsed and the interrupt request IRQ3 is generated, the program is branched into the LINE routine (time 8 ).

Figure 36C:
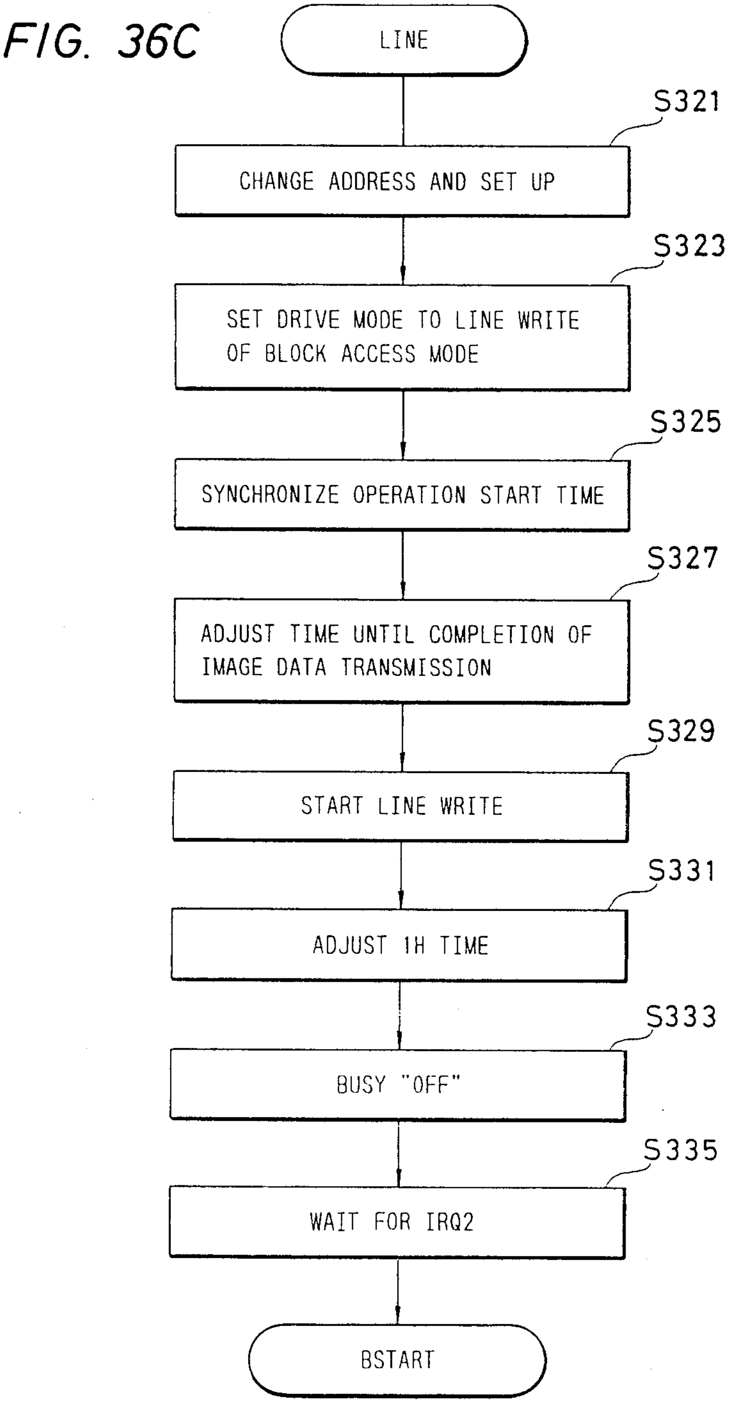

FIG. 36C is a flow chart of the LINE routine. This routine is started as a continuation of the BLOCK routine or directly as a continuation of the BSTART routine. In the following description, the LINE routine is regarded as a continuation of the BLOCK routine. The same step operations as described above will be omitted.

S321:

When the LINE routine is started in response to H the internal interrupt request IRQ3 (time 8 ), the address is changed and set up.

S323:

The controller 500 sets the drive mode to the line write of the block access mode. In other words, data presenting the line write of the block access mode is set in the register DM in the register unit 630 in the data output unit 600.

S325:

The controller 500 synchronizes the operation start time.

S327:

The controller 500 adjusts time until completion of image data transmission. If the image data transmission is not performed in the previous BLOCK routine, data transmission need not be performed. Time equal to the data transmission is idled on the program.

S329:

The controller 500 starts a line write operation (time 9 ). In this moment, the block erase operation is ended. Information of one scanning line for the head line of the block is written or displayed in accordance with the transmitted image data of one scanning line.

S331:

The controller 500 adjusts one horizontal scanning period (1H) (time 10 ).

S333 and S335:

The signal Busy is set to be "OFF" (time 11 ), and the controller 500 waits for the interrupt request $\overline{IRQ2}$. Meanwhile, execution of the program is not started.

When the address data is transferred (time 12 ), the interrupt request $\overline{IRQ2}$ is generated (time 13 ), and the BSTART routine is started (time 14 ). The LINE routine follows the BSTART routine, and the second scanning line of the block is written. As described above, the BSTART and LINE routines are executed, and the write operation of all scanning lines in the block is completed. The next block erase operation and the next line write operation are performed.

Figure 36D:
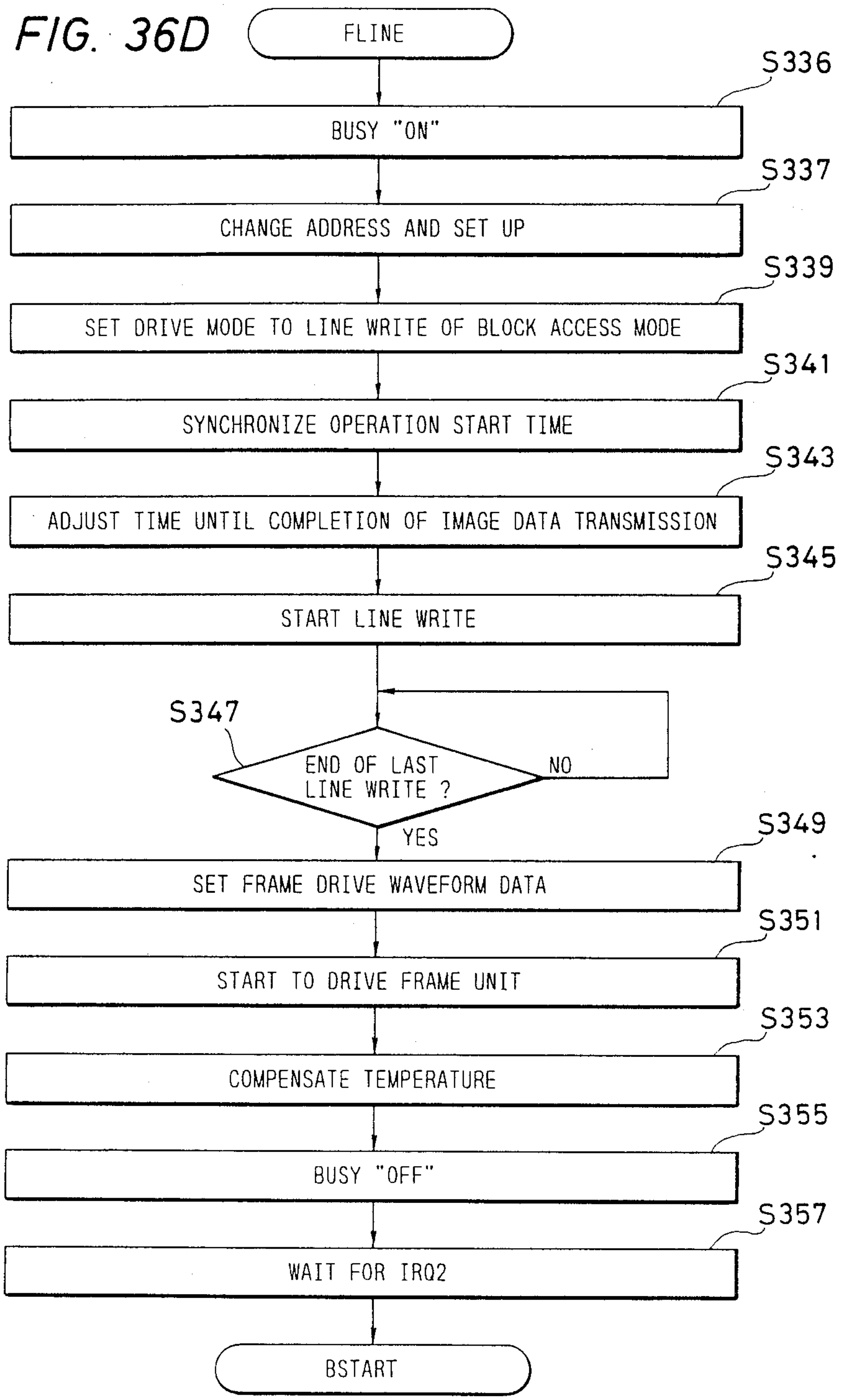

When all the operations described above are completed and the address data representing the last line of the effective display area 104 is transferred, processing is started as shown in the flow chart of FIG. 36D and the timing chart of FIG. 39B.

When the address data which represents the last line of the effective display area 104 is transferred (time 2 in FIG. 39B; only the numeral will be described later), the interrupt request $\overline{IRQ2}$ is generated (time 3 ), and the above-described BSTART routine is started (time 4 ). In this case, since the address data represents the last line of the effective display area 104, the FLINE routine (FIG. 36D) follows (time 6 ) after the above routine.

The operations in steps in the FLINE routine will be described with reference to FIG. 39B together mainly with FIG. 36D. The same operations as described above are omitted.

S336, S337, S339, S341, and S343:

The signal Busy is set to be "ON", and the designated address is changed and set up. The controller 500 sets the drive mode to line write of the block access mode, and synchronizes the operation start time. In addition, the controller 500 adjusts time until completion of the image data transmission.

S345:

The controller 500 starts write of the last line (time 7 ). At this moment, the write operation of the second last line of the effective display area 104 is completed.

S347:

The controller 500 discriminates whether the end of last line write in the effective display area 104 is detected. If YES in step 347, the flow advances to step S349. This discrimination is performed when the last line of the effective display area 104 is accessed. Otherwise, the controller 500 simply monitors the access start time.

S349:

In this step, the waveform control data for frame driving in the next step is set in the register unit 630 in the data output unit 600 to update the data. If a separate frame drive system is arranged, only frame driving can be performed without updating the data.

In the INIT routine shown in FIG. 33, as described above, the waveform data and the frame drive voltage values are set. However, as in this step, frame driving performed during the vertical retrace interval uses as the reference value the drive voltage values obtained by temperature compensation in the INIT routine.

S351 and S353

The controller 500 starts driving of the frame unit 106 and A/D conversion (time 8 ). The vertical retrace interval is started from time 8 . At the end of A/D conversion, the drive voltage values, the system clock and the delay time data are obtained. In other words, the temperature-compensated data is updated.

In frame driving in step S351, the frame unit 106 is partially (i.e., only the horizontal frame) driven to obtain all "white" pixels, but the remaining part (i.e., the vertical frame) is then driven simultaneously with driving of the effective display area 104, as described with reference to in the INIT routine. However, if the driving system of the frame unit 106 is arranged independently of the driving system of the effective display area 104, all parts of the frame unit 106 can be simultaneously driven.

The frame unit 106 is electrically driven to obtain high image quality of a portion outside the effective display area 104. However, the frame unit 106 may be mechanically driven or a coating is formed on the frame unit 106 without considering the image quality outside the effective display area 104.

S355 and S357:

The signal Busy is set to be "OFF", and the controller 500 waits for the interrupt request $\overline{IRQ2}$ (time 9 ).

As described above, frame driving and temperature compensation are performed during writing of the last scanning line of the effective display area 104 and during the vertical retrace interval immediately after writing of the last scanning line.

Thereafter, when the address data, i.e., address data on the uppermost scanning line of the effective display area 104 is transferred (time 10 ), the interrupt request $\overline{IRQ2}$ is generated (time 11 ), and the BSTART routine is executed (time 12 ). The block erase and line write operations in units of blocks are performed.

(5.2.3) Line Access

Line access display control started in response to the interrupt request $\overline{IRQ1}$ after predetermined initial control (INIT routine) will be described with reference to FIGS. 37A to 37C, and FIGS. 40A and 40B.

Figure 37A:
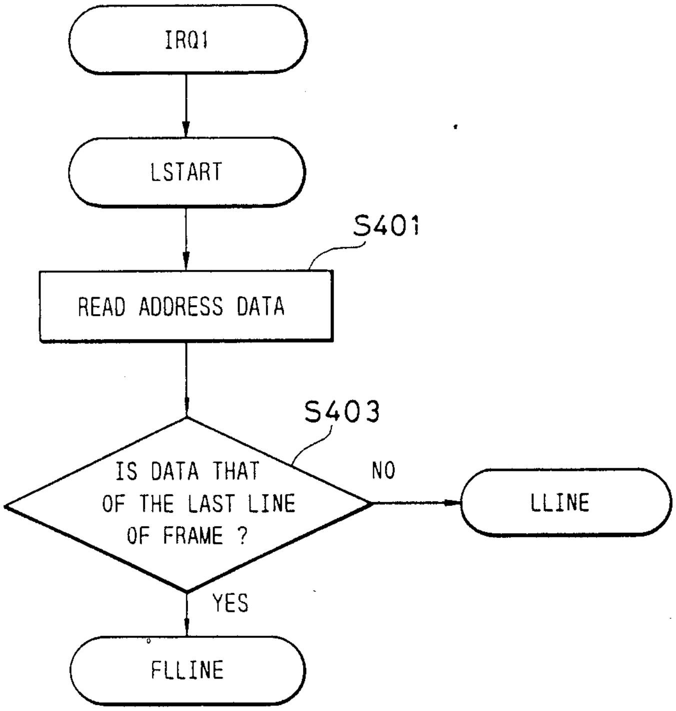
Figure 37B:
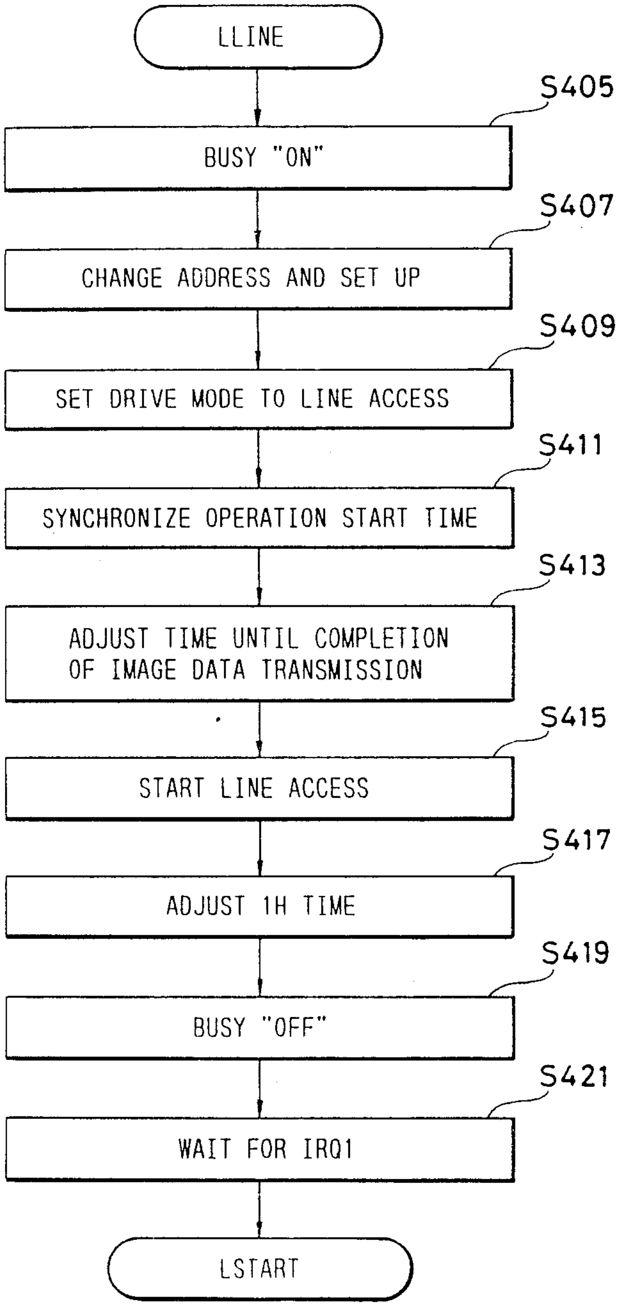
Figure 37C:
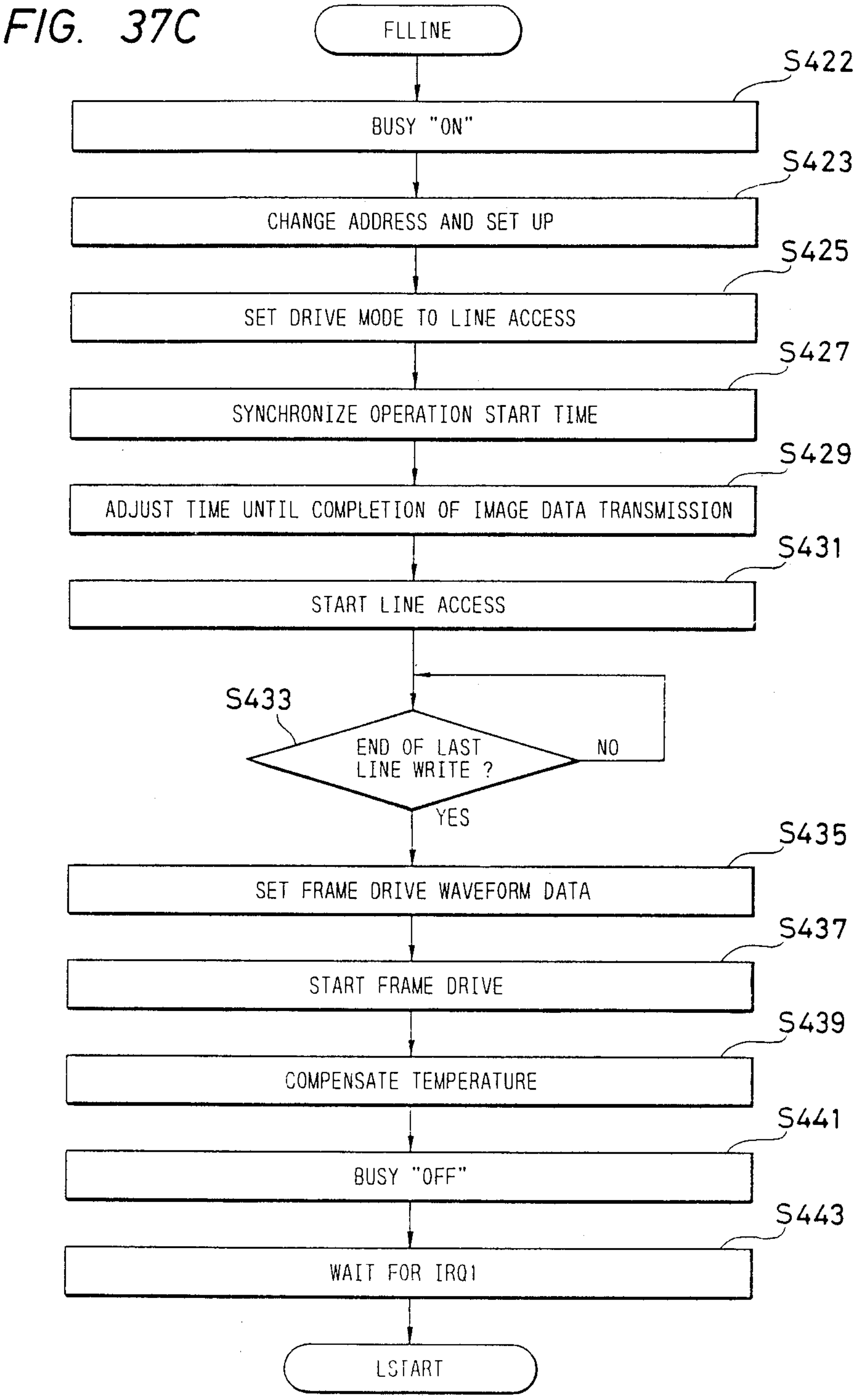

FIGS. 37A to 37C are flow charts of display control programs stored in the ROM 503 in the controller 500 in the form shown in FIG. 12. These programs are started in the respective steps of line access display control.

Figure 40A:
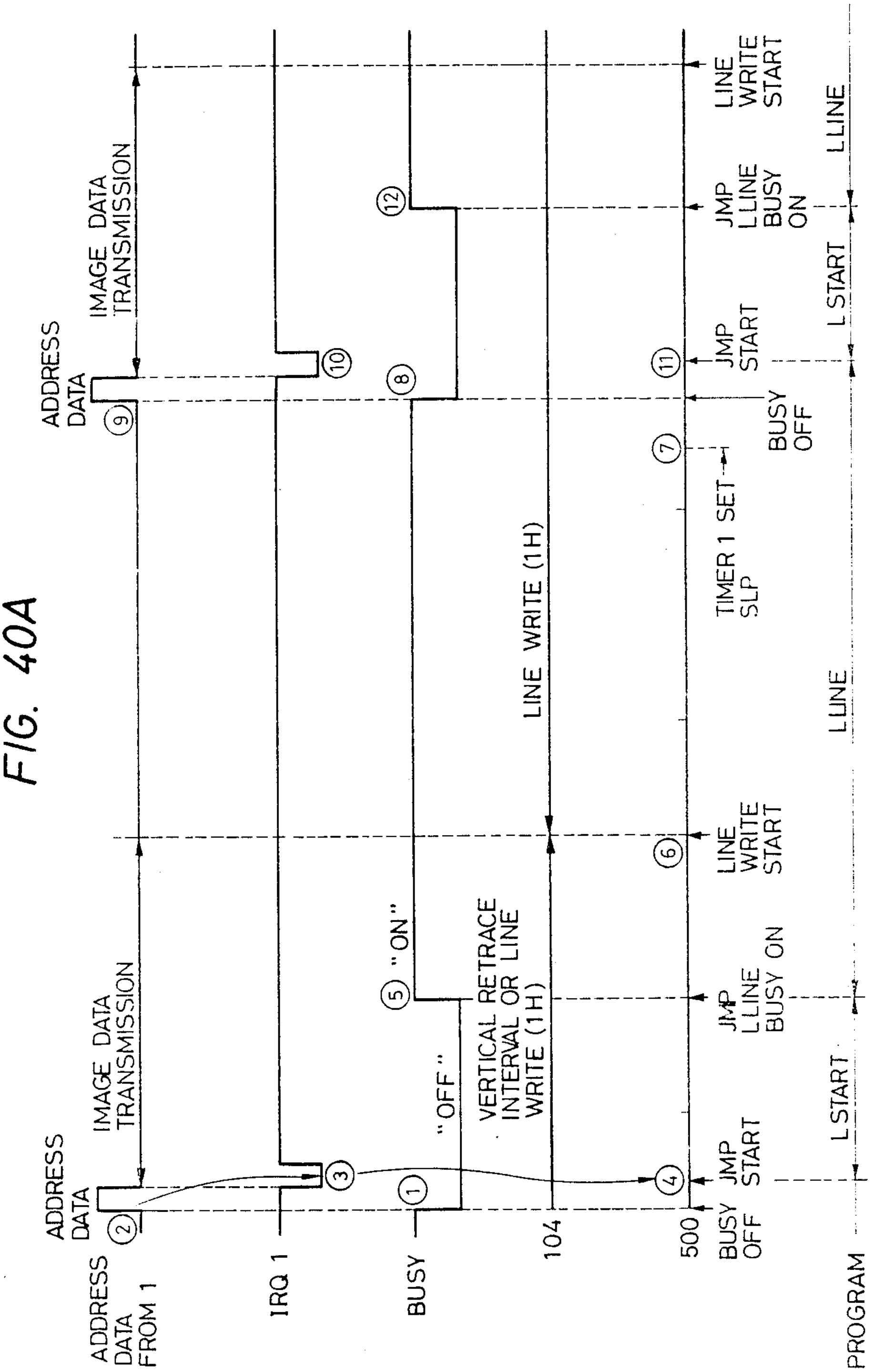
Figure 40B:
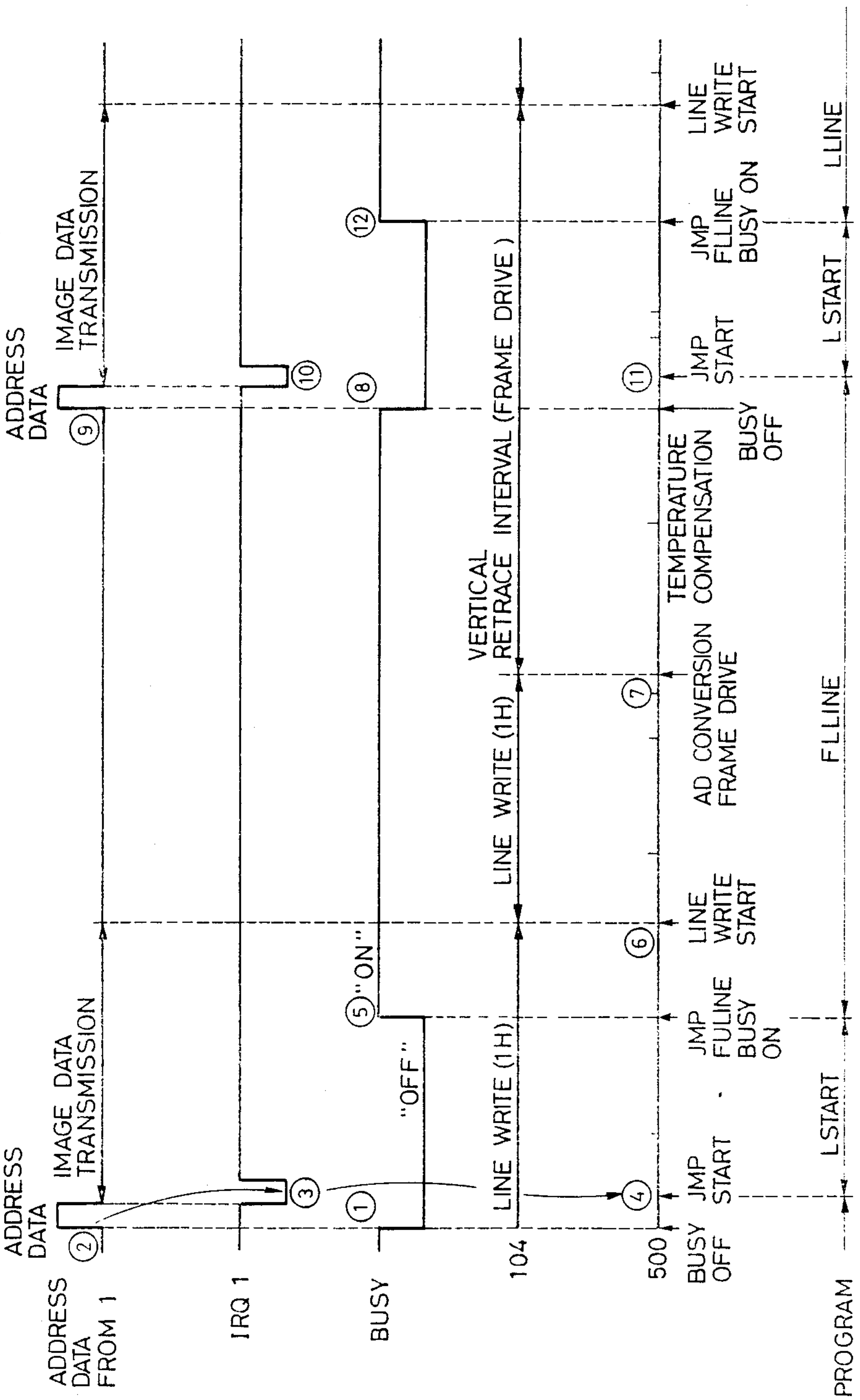
Figure 41A:
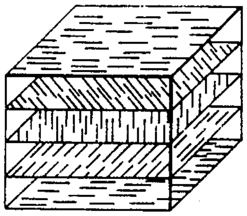
FIGS. 41A and 41B are views for explaining a TN liquid crystal, respectively.
Figure 41B:
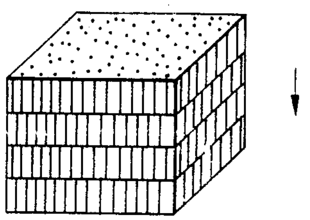
Figure 42:
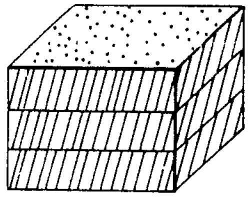
FIG. 42 is a view for explaining an SmC* liquid crystal.
Figure 43:
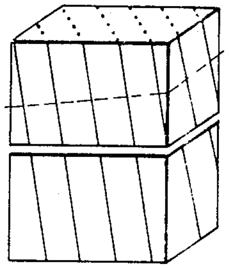
FIG. 43 is a view for explaining an SmH* liquid crystal.

FIGS. 40A and 40B are timing charts of such display control.

Line access in this embodiment is different from the previous block access in that the block erase operation is omitted. Information is updated and displayed in units of scanning lines without erasing the scanning lines beforehand. The same operations as in the previous block access display control are omitted.

The signal Busy is set to be "OFF" (time 1 in FIG. 40A; only the numeral will be described below). The controller 500 in the standby mode receives the interrupt request $\overline{IRQ1}$ (time 3 ) generated upon address data transmission (time 2 ) and causes the LSTART routine (FIG. 37A) to start (time 4 ). Display control in the LSTART routine will be described with reference to FIG. 37A.

S401:

The address data is read.

S403:

The controller 500 determines whether the read address data represents the last scanning line of the effective display area 104. If YES in step 403, the flow is branched into the FLLINE routine. Otherwise, the flow is branched into the LLINE routine.

Display control in the LLINE routine will be described with reference to FIGS. 37B and 40A.

S405, S407, and S409:

The signal Busy is set to be "ON" (time 5 ), and the designated address is changed and set up. The controller 500 changes the drive mode into the line access mode.

S411 and S413:

The controller 500 synchronizes the operation start time and adjusts time until image data transmission.

S415:

The controller 500 starts line access (time 6 ). Information of one scanning line is written. At this moment, the write operation during the vertical retrace interval or the immediately preceding scanning line is completed.

S417, S419, and S421:

The predetermined period of time is awaited to adjust one horizontal scanning period, and the program is restarted upon generation of the internal interrupt request IRQ3 (time 7 ). The signal Busy is set to be "OFF" (time 8 ), and the controller 500 waits for the interrupt request $\overline{IRQ1}$.

Information of one scanning line is written, and the LSTART and LLINE routines are repeated on the basis of the address data sequentially and continuously transferred, thereby continuing scanning line write operations.

When the transferred address data is discriminated to be the last scanning line of the effective display area 104 in step S403 of the LSTART routine, the flow is branched into the FLLINE routine.

Display control of the FLLINE routine will be described with reference to FIGS. 37C and 40B.

S422, S423, and S425:

The signal Busy is set to be "ON" (time 5 in FIG. 40B; only the numeral will be described below), and the designated address is changed and set up. The controller 500 sets the drive mode in the line access mode.

S427 and S429:

The controller 500 synchronizes the operation start time and adjusts time until completion of image data transmission.

S431:

The controller 500 starts line access (time 6 ). At this moment, the write operation of the immediately preceding line is completed.

S433:

The controller 500 discriminates whether the end of last line write is detected. If YES in step S433, the flow advances to step S435.

S435:

In this step, waveform control data for frame driving to be performed in the next step is set.

S437 and S439

The controller 500 starts driving the frame unit 106 and A/D conversion (time 7 ). At this time, the write operation of the second last scanning line of the effective display area 104 is completed. Temperature-compensated data is updated simultaneously with the end of A/D conversion.

S441 and S443:

The signal Busy is set to be "OFF", and the controller 500 waits for the interrupt request $\overline{IRQ1}$ (time 8 ).

As described above, the write operation of the last scanning line of the effective display area 104, and frame driving and temperature compensation are performed during the above write operation and during the vertical retrace interval immediately after the write operation.

When the address data, i.e., the address data of the uppermost scanning line of the effective display area 104 is transferred (time 9 ), the interrupt request $\overline{IRQ1}$ is generated (time 10 ), and the LSTART routine is started (time 11 ). Subsequently, the line write operation is performed in units of scanning lines.

(5.2.4) Power-Off

When the operator at the woodprocessor 1 turns off the power switch with a key or the like, a PWOFF routine related to the power-off display control is started.

Figure 38:
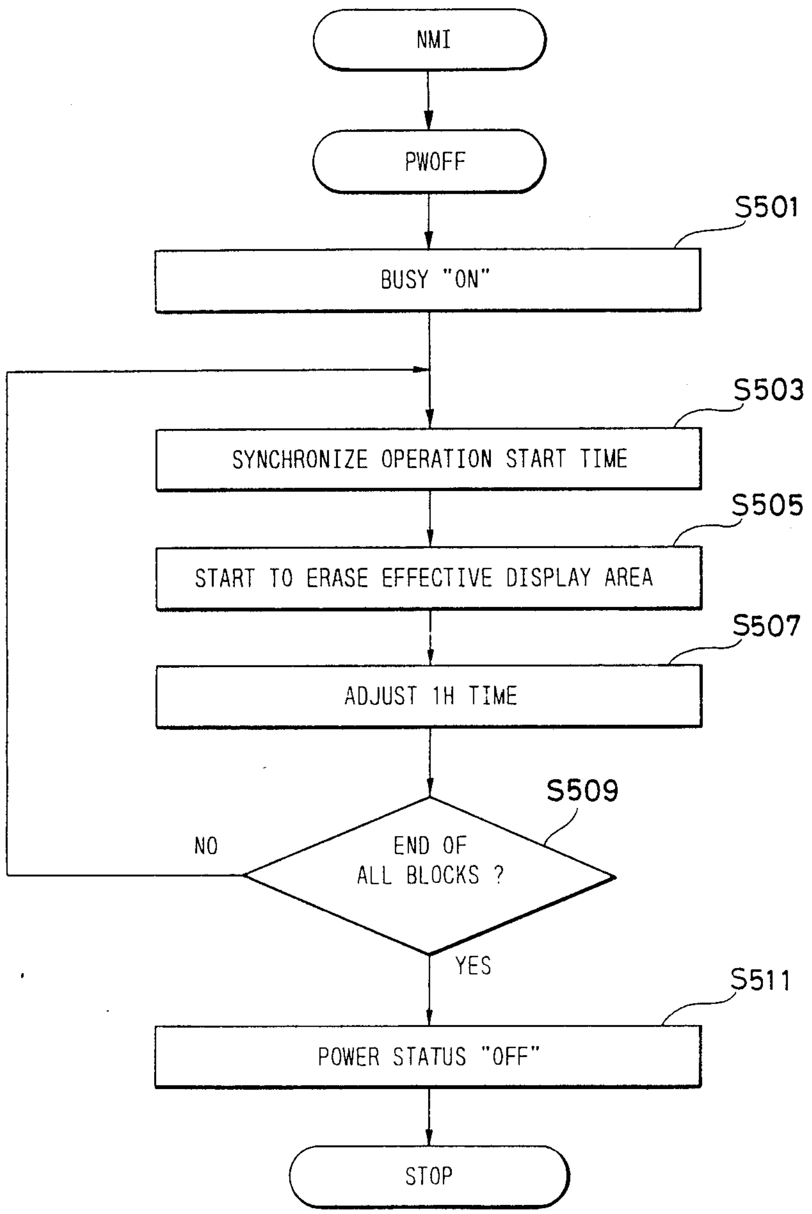
FIG. 38 is a flow chart showing a detailed display control sequence in the power-off mode in this embodiment.

Such display control will be described with reference to the timing chart of FIG. 34 and the flow chart of FIG. 38.

When the operator manipulates a key or the like to cause system power-off, the wordprocessor 1 supplies the $\overline{PDOWN}$ signal to the controller 500. A nonmaskable interrupt NMI is supplied to the CPU 501 in the controller 500, thereby starting the PWOFF routine. The interrupt request NMI is an unconditional interrupt, and the PWOFF routine is immediately started regardless of the operating state of the controller 500. The PWOFF routine will be described below.

S501:

The signal Busy is set to be "ON", and at the same time the signal Light is set to be "OFF" (time 8 in FIG. 34; only the numeral will be described below).

S503:

The controller 500 synchronizes the operation start time in the same manner as described above.

S505:

The controller 500 starts driving the effective display area 104 (time 9 ). This driving aims at erasing one block in the effective display area 104 within one horizontal scanning interval in the same manner as in the INIT routine. That is, all blocks in the area 104 are set in the "white" state, and the image quality of the area 104 is improved to prepare for the next display cycle.

S507:

The controller 500 adjusts one horizontal scanning period (1H). This processing is the same as described above.

S509:

Steps S503, S505, and S507 are performed every block erase cycle. In step S509, the controller 500 discriminates whether all blocks, i.e., the entire effective display area 104, are erased.

S511:

If YES in step S509 (time 10 ), the power status (P ON/OFF) signal is set to be "OFF", and at the same time the signal Busy is set to be "OFF" (time 11 ). When the P ON/OFF signal is disabled, the entire display device including the wordprocessor 1 is powered off (time 12 ).

(6) Effect of Embodiment

The embodiment has the following effects.

(6.1) Effect of Frame Formation

When the display device is arranged using the FLC element, the frame unit 106 is formed outside the effective display area 104 on the display screen 102 in this embodiment. Poor display of the display screen 102 which is caused by an unstable state of the FLC element corresponding to the area outside the effective display area 104 can be prevented. In addition, an unclear boundary of the effective display area 104 and confusion of the operator can also be prevented.

In the above embodiment, particularly, when frame electrodes are arranged in correspondence with the frame unit 106 and the frame is electrically formed, mechanical layout adjustments are not required unlike in a mechanical arrangement in which a mechanical member comprising a plastic material is used to form a frame or a film is coated to form the frame to define the effective display area 104. In addition, the dead space caused by disposing a mechanical member depending on a location of the display device can be eliminated. Furthermore, the frame may be colored with the same color as that of the background of the display data or a color different therefrom, thereby improving flexibility in frame formation.

(6.2) Effect of Temperature Compensation

Since drive energy (voltages and pulse widths) of the FLC elements corresponding to the effective display area 104 and the frame unit 106 is compensated depending on temperature changes immediately prior to write timings, stable driving free from temperature changes can be achieved. Therefore, reliability of the display device using FLC elements can be improved.

In this embodiment, the compensated data is updated during the vertical retrace interval, and therefore effective display processing can be achieved. At the same time, the horizontal frame can be driven in response to a temperature data detection command, i.e., the drive command for the A/D conversion unit 950, thereby further improving display processing efficiency.

(6.3) Effect of Control in Response to Image Data Input

The means for waiting for an image data input from the host device is arranged, and the operation is started in response to the input. The display device can perform not only refresh driving for continuously changing the display state regardless of its contents as in the display having a display element without a memory function, but also intermittent driving for updating display data only when updating of its contents is required. Since the display device can perform refresh driving, changes in technical specifications of the existing host device need not be performed. In addition, intermittent driving allows a decrease in power consumption. Data is transmitted from the host device when screen updating is needed. Therefore, software or hardware load on the host device can be reduced.

The busy signal is output to the host device in response to a unit image data input (e.g., one line), and various modes can be then set. In this case, the host device additionally includes a function for receiving the busy signal and waiting for image data transmission.

In the above embodiment, the start/stop of the operation is controlled in accordance with the presence/absence of a real address data input supplied together with the image data from the wordprocessor 1 serving as the host device. The block or line to be accessed is detected on the basis of the real address data, thereby allowing the partial rewrite operation. Furthermore, the temperature-compensated data during refresh driving can be updated during the vertical retrace interval.

(6.4) Effect of Display Drive Unit Arrangement

There are provided a plurality of voltage supply lines and the switches for connecting the plurality of voltage supply lines to the electrodes (common electrodes com, segment lines seg, frame common lines Fcom, and frame segment lines Fseg) formed on the display unit 100 constituted by FLC elements and/or disconnecting the voltage supply lines from the electrodes. There is also provided the means (common drive unit 300, segment drive unit 200, and frame drive unit 700) for switching the switches in accordance with the waveform data. Therefore, the electrodes can be optimally driven with various proper drive waveforms in accordance with the contents of the waveform data.

In the above embodiment, the waveform data are properly changed and generated during control, and therefore, driving in block erasure, image formation, frame formation, and screen clearing can be performed with appropriate waveforms, and image quality can be improved.

(6.5) Effect of Screen Forcible Clearing

The display screen 102 of the display unit 100 constituted by the FLC elements is cleared at the time of power-on and -off operations. The operator can check the state of the display device while the display screen 102 is cleared. The operator can easily check the power-off state.

In particular, the display screen can clear its display contents without receiving clear data (e.g., all white data) from the host device at the time of power-on/-off operation. Therefore, the load of the host device can be reduced, and clearing can be performed at high speed.

Self-clearing of the screen has the following advantage. The display device need not receive all white data from the host device but can receive only a clear command therefrom so as to perform self-clearing.

(6.6) Effect of Power Controller Arrangement

Since the values of the voltages applied to the electrodes (lines com, seg, Fcom, and Fseg) arranged on the display unit 100 constituted by the FLC elements are changed, the voltages having optimal values can be supplied to the electrodes in accordance with the temperature and drive conditions.

In this embodiment, particularly, the positive, negative, and reference voltages are applied to the common lines com and Fcom, and another negative voltage, another positive voltage, and the reference voltage are applied to the segment lines seg and Fseg (i.e., a total of five voltage values can be generated). In this case, one value (VC) is fixed, and other values are set to be variable at a predetermined ratio with respect to the fixed value. In addition, some output voltages are used to set other output voltages, thereby generating five types of voltages. Therefore, the voltage values can be appropriately adjusted in accordance with temperature conditions and the like.

ICs used in the common drive element must have a high breakdown voltage, while ICs used in the segment drive elements must have a high operating speed. When one voltage is fixed and other voltages are determined in a predetermined ratio with respect to the fixed voltage, different types of ICs described above can fall within the predetermined range of technical specifications, and the manufacturing process can also be simplified.

(7) Modification

(7.1) Arrangement of Frame Unit 106

In this embodiment, the frame unit 106 is electrically formed. However, the present invention is not limited to this. A portion corresponding to the frame unit 106 on the display screen 102 may be replaced with a mechanical means such as a plastic member or a coating. In this case, the image quality in the area outside the effective display area 104 need not be taken into consideration. When the frame unit is electrically driven, a separate frame drive system allows simultaneous driving of all the parts of the frame unit. Furthermore, when frame formation is electrically performed, the color of the frame unit can be the same as that of the background or that of the data.

In the above embodiment, the frame transparent electrodes 150 and 151 are driven by the frame drive unit 700 independent of the drive units 200 and 300. However, the elements 210 and 310 or equivalent drive elements may be arranged in one or both of the units 200 (300) and 700 and may be driven when the drive units 200 and 300 are driven.

(7.2) Temperature Compensation Timing and Partial Rewrite

In the above embodiment, temperature compensation is performed within the vertical retrace interval. This can be achieved under the assumption that the address data and the image data are cyclically and continuously (i.e., in the refresh mode) transferred. However, the temperature compensation timings may be arbitrarily determined. For example, when address data of specific portions are intermittently transferred, the vertical retrace interval is not present. Therefore, temperature compensation is not performed in the above display control which is thus regarded to be improper.

When driving is performed in the partial rewrite mode, it is preferable to perform temperature compensation at predetermined intervals. For this purpose, time is measured by a timer in the controller 500, and an internal interrupt request is generated at predetermined intervals. After the signal Busy is set to be "ON", temperature compensation can be performed.

In order to allow driving in the partial rewrite mode, the wordprocessor includes the functions of the wordprocessor in the above embodiment and functions for transferring the address data of specific portions and the corresponding image data. When the address data is transferred in the refresh mode as in the above embodiment, an arrangement may be utilized to discriminate whether to start display control in accordance with the presence/absence of the image data following the address data.

Temperature compensation need not be performed in accordance with the table system described above, but can be performed by proper arithmetic operations.

(7.3) One-Horizontal Scanning Period and Drive Voltage Value

The relationship between the temperature range and corresponding frequency (i.e., one horizontal scanning period) and drive voltage values shown in FIG. 9 is not limited to the one described above. For example, if the temperature range is narrowed and the frequency and drive voltage values are properly set in correspondence with the temperature range, fine temperature compensation can be performed.

(7.4) Waveform Setting

In the above embodiment, once the waveform data for image formation is set in the register unit 630, except for the frame drive waveforms, the set waveform data is not updated. With the arrangement in this embodiment, however, it is apparent that the waveforms and 1H-dividing control data can be updated at proper timings in display control. Therefore, drive waveforms corresponding to various drive conditions can be generated.

In addition to selection of waveform data corresponding to the drive conditions, the waveform data can be changed in accordance with temperatures, thereby obtaining appropriate waveforms. In this case, waveform defining data corresponding to the temperatures may be stored in the unused area at EE00H~ as shown in FIG. 12 in the same manner as other data, and the waveform data may be changed in the same manner as in the read operation using the above jumping table. In addition, the display device of this embodiment can be used to arbitrarily change the waveform data to determine optimal waveforms.

(7.5) Selection of Block Access or Line Access

Block or line access, i.e., the interrupt request $\overline{IRQ2}$ or $\overline{IRQ1}$ is selected by the operator in accordance with the form of write data and the application of the display device in the above embodiment due to the following reason. For example, if the size of one block on the display screen 102 corresponds to the size of a character train displayed thereon and write data consist of only characters and numeric values, block access simplifies processing of the character trains.

If the image to be displayed comprises various different symbols and graphic patterns, display and rewriting of a size exceeding each block must be performed. In this case, line access is more convenient than block access.

(7.6) Number of Scanning Lines

In the above embodiment, one block comprises 20 scanning lines, and the effective display area comprises 400 lines. However, in the display device using FLC display elements, the change in selection time/line does occur even if the number of scanning lines is increased. Therefore, the number of scanning lines can be increased to obtain a large, high-resolution display screen.

(7.7) Erasure of Effective Display Area 104

In order obtain an initial state of the display screen, the effective display area 104 is automatically performed at the time of power-on/-off operation without receiving the all "white" data from the wordprocessor 1 in the above embodiment. In this case, the screen may be cleared at the time of either power-on or power-off operation. The effective display area may be erased regardless of the data to be transmitted, if the effective display area is required to be entirely erased during display control of block or line access.

For this purpose, a control signal such as an unconditional interrupt signal is output upon operation of, e.g., a key or the like in the wordprocessor 1, and the effective display area 104 in the control unit 500 can be erased.

(7.8) Position of Temperature Sensor 400

The temperature sensor 400 is arranged at a proper position so as to represent a temperature in a temperature profile on the basis of the FLC temperature profile obtained by an experiment or the like beforehand. In order to perform more accurate temperature detection, a plurality of temperature sensors may be used.

(7.9) Display Unit 100, Display Control Unit 50, and Wordprocessor 1

The form of signals exchanged between the wordprocessor 1 and the control unit 50, i.e., the signals D (including the signal $A/\overline{D}$, the image data, and the real address data), may be limited to the one described in the above embodiment. A proper form may be used.

In the above embodiment, the display unit and the display control system are described with reference to the wordprocessor. However, the arrangements are not limited to the above embodiment. The present invention may be applied to a display of a computer display or a television set.

A display unit having a larger screen than that of the existing television set may be arranged as an application obtained by effectively utilizing the memory function of the FLC display element.

The present invention is also effectively applicable to image display of a still image or an image having a low frequency of screen updating. When the present invention is applied to a display unit such as a 7-segment display element in a receiver for, e.g., a teletext and information service equipment, a face in timepiece equipment, or display units in various equipment, driving is performed only if screen updating is required, thereby contributing to a decrease in power consumption.

In these cases, the screen can be entirely or partially updated if partial updating is required in the same manner as in partial rewrite operation. In these cases, temperature compensation is performed at predetermined intervals of interrupt operations. The screen to be updated next is a driven/corrected screen. When the interval of screen updating is long or partial rewrite operation is required, the display data can be output again from, e.g., a VRAM during temperature compensation. Therefore, a constant display state can be obtained with uniformity.

I claim:

1. A display control unit comprising:

display means having a plurality of scanning electrodes arranged in a horizontal direction and a plurality of signal electrodes separately arranged in a vertical direction with a predetermined spacing, and a liquid crystal having a memory function and being disposed between said electrodes;

memory means for storing data for selecting either of when said scanning electrodes are driven in units of blocks each comprising several scanning electrodes divided from said plurality of scanning electrodes and when said scanning electrodes are driven for every one line of scanning electrode;

supply means for supplying access data for designating a line of said scanning electrodes to be accessed; and control means, responsive to data stored in said memory means that indicates said scanning electrodes are driven in units of blocks, for driving said scanning electrodes in a block when the access data supplied by said supply means designates a head line in the block, and otherwise driving a line designated by the access data to display the image data applied to said signal electrodes.

2. A display control unit according to claim 1, further comprising latch means for storing an image signal to be supplied to signal electrodes of said display means.

3. A display control unit according to claim 1, further comprising switch means for setting data to be stored in said memory means.

4. A display control unit according to claim 1, wherein said liquid crystal disposed in said display means is a ferroelectric liquid crystal.

5. A display control unit according to claim 1, wherein said control means comprises means for supplying access data for designating a line of said scanning electrodes to be accessed.

6. A display control unit comprising:

display means having a plurality of scanning electrodes arranged in a horizontal direction and a plurality of signal electrodes separately arranged in a vertical direction with a predetermined spacing therebetween, and a liquid crystal having a memory function and being disposed between said electrodes;

memory means for storing mode data for selecting either one of a block access mode for driving said scanning electrodes in units of blocks each comprising several scanning electrodes divided from said plurality of scanning electrodes and a line access mode for driving said scanning electrodes for every one line of scanning electrode;

supply means for supplying access data for designating a line of said scanning electrodes to be accessed; and control means, responsive to data stored in said memory means that indicates said scanning electrodes are driven in units of blocks, for erasing once all the image in the block and then driving the scanning electrodes in a block when the access data supplied by said supply means designates a head line in the block, and otherwise driving a line designated by the access data to display the image data applied to the signal electrodes.

7. A display control unit according to claim 6, further comprising latch means for storing an image signal to be supplied to signal electrodes of said display means.

8. A display control unit according to claim 6, further comprising switch means for setting mode data to be stored in said memory means.

9. A display control unit according to claim 6, wherein said liquid crystal disposed in said display means is a ferroelectric liquid crystal.

10. A display control unit comprising:

display means having a plurality of scanning electrodes arranged in a horizontal direction and a plurality of signal electrodes separately arranged in a vertical direction with a predetermined spacing, and a liquid crystal disposed between said electrodes;

memory means for storing mode data for selecting either one of a block access mode for driving said scanning electrodes in units of blocks each comprising several scanning electrodes divided from said plurality of scanning electrodes and a line access mode for driving said scanning electrodes for every one line of scanning electrode;

supply means for supplying access data for designating a line of said scanning electrodes to be accessed;

discriminating means, responsive to mode data stored in said memory means that designates the block access mode, for discriminating whether the access data supplied by said supply means designates either one of a head line in the block, a last line in the scanning electrodes of said display means and a line other than the head line and the last line;

control means for erasing once all the image in the block and then driving said scanning electrodes in the block when said discriminating means determines that the access data designates the head line in the block to display the image data applied to said signal electrodes, for driving said scanning electrode in the last line to display the image data applied to the signal electrodes and then setting the driving conditions for said display means when said discriminating means determines that the access data designates the last line in the scanning electrodes, and for driving the scanning electrode of the designated line to display the image data applied to said signal electrodes when said discriminating means determines that the access data designates a line other than the head line and the last line.

11. A display control unit according to claim 10, further comprising latch means for storing an image signal to be supplied to signal electrodes of said display means.

12. A display control unit according to claim 10, further comprising switch means for setting mode data to be stored in said memory means.

13. A display control unit according to claim 10, wherein said liquid crystal disposed in said display means is a ferroelectric liquid crystal.

* * * * *

UNITED STATES PATENT AND TRADEMARK OFFICE

CERTIFICATE OF CORRECTION

PATENT NO. : 4,964,699 Page 1 of 6

DATED : October 23, 1990

INVENTOR(S) : Hiroshi Inoue

It is certified that error appears in the above-identified patent and that said Letters Patent is hereby corrected as shown below: On the title page: Item

[56] References Cited:

Under "U.S. PATENT DOCUMENTS":

"4,511,926 4/1985 Grossland et al." should read

--4,511,926 4/1985 Crossland et al.--.

COLUMN 3:

Line 5, "tran-" should be deleted.

Line 6, "spatent" should read --transparent--.

Line 13, "molecules e4." should read --molecules e3--.

COLUMN 4:

Line 30, "stage" should read --state--.

Line 56, "phase -t1" should read --phase Δ t1--.

COLUMN 5:

Line 7, "not almost" should read --almost not--.

COLUMN 8:

Line 29, "Partia" should read --Partial--.

UNITED STATES PATENT AND TRADEMARK OFFICE
CERTIFICATE OF CORRECTION

PATENT NO. : 4,964,699

DATED : October 23, 1990

INVENTOR(S) : Hiroshi Inoue

It is certified that error appears in the above-identified patent and that said Letters Patent is hereby corrected as shown below:

Column 9:

Line 12, "power controller 900" should read --power controller 800--.

COLUMN 10:

Line 12, "wiring unit 122" should read --wiring unit 112--.

Line 49, "flexible cables 282 and 383" should read --flexible cables 282 and 382--.

COLUMN 13:

Line 23, "o" should read --on--.

COLUMN 14:

Line 10, "pulse width AT" should read --pulse width $\Delta$T--.

COLUMN 23:

Line 40, "common drive unit 00." should read --common drive unit 300.--.

UNITED STATES PATENT AND TRADEMARK OFFICE
CERTIFICATE OF CORRECTION

PATENT NO. : 4,964,699 Page 3 of 6

DATED : October 23, 1990

INVENTOR(S) : Hiroshi Inoue

It is certified that error appears in the above-identified patent and that said Letters Patent is hereby corrected as shown below:

Column 25:

Line 5, "DACT generation unit 05" should read --DACT generation unit 605--.

Line 38, "unit 63" should read --unit 630--.

COLUMN 26:

Line 35, "63B" should read --663B--.

Line 46, "4 phase ring counter 663" should read --4 phase ring counter 663B--.

Line 65, "AT" should read --$\Delta$T--.

COLUMN 27:

Line 2, "AT" should read --$\Delta$T--.

Line 64, "51." should read --951.--.

COLUMN 28:

Line 67, "D/ con-" should read --D/A con- --.

COLUMN 29:

Line 21, "7715," should read --715,--.

UNITED STATES PATENT AND TRADEMARK OFFICE
CERTIFICATE OF CORRECTION

PATENT NO. : 4,964,699 Page 4 of 6

DATED : October 23, 1990

INVENTOR(S) : Hiroshi Inoue

It is certified that error appears in the above-identified patent and that said Letters Patent is hereby corrected as shown below:

Column 30:

Line 42, "control logic unit 250." should read --control logic unit 350.--.

COLUMN 32:

Table 1, Under "Block Access Mode", "$\overline{\text{CCLR}}$" should read --$\overline{\text{SCLR}}$--, and Under "Block Erase Data in", "$\overline{\text{CCLR}}$ X 1 0 0" should read --$\overline{\text{CCLR}}$ X 1 0 1--.

COLUMN 34:

Line 6, "comand" should read --com and--.

Line 11, "voltagellevel" should read --voltage level--.

Line 51, "fame" should read --frame--.

UNITED STATES PATENT AND TRADEMARK OFFICE
CERTIFICATE OF CORRECTION

PATENT NO. : 4,964,699

DATED : October 23, 1990

INVENTOR(S) : Hiroshi Inoue

It is certified that error appears in the above-identified patent and that said Letters Patent is hereby corrected as shown below:

COLUMN 35:

Table 4, Under "Frame Segment Line Data " during Line Write Operation in Line Access Mode "$\overline{SV}$c x 0 0 1" should read --$\overline{V4}$ x 0 0 1--.

COLUMN 36:

Line 35, "LASTART" should read --LSTART--.

Column 38:

Line 18, "(time " should read (time ① --.

COLUMN 39:

Line 10, "(times and )." should read --(times ② and ③ ).--.

Line 58, "(time )." should read --(time ④ ).--.

COLUMN 40:

Line 30, "(time )." should read --(time ⑤ ).--.

Line 43, "(time )." should read --(time ⑥ ).--.

UNITED STATES PATENT AND TRADEMARK OFFICE

CERTIFICATE OF CORRECTION

PATENT NO. : 4,964,699 Page 6 of 6

DATED : October 23, 1990

INVENTOR(S) : Hiroshi Inoue

It is certified that error appears in the above-identified patent and that said Letters Patent is hereby corrected as shown below:

COLUMN 41:

Line 10, "(time 1" should read --(time (1) --.

Line 12, "time 2" should read --time (2) --.

COLUMN 42:

Line 45, "response its" should read --response to its--.

Column 43:

Line 1, "H" should be deleted.

COLUMN 44:

Line 7, "step 347," should read --step S347,--.

Signed and Sealed this

Third Day of August, 1993

Attest:

Michael K. Kirk

MICHAEL K. KIRK

Attesting Officer

Acting Commissioner of Patents and Trademarks